US012340064B2

(12) United States Patent
Amitay et al.

(10) Patent No.: US 12,340,064 B2
(45) Date of Patent: *Jun. 24, 2025

(54) MAP-BASED GRAPHICAL USER INTERFACE INDICATING GEOSPATIAL ACTIVITY METRICS

(71) Applicant: Snap Inc., Santa Monica, CA (US)

(72) Inventors: Daniel Amitay, New York, NY (US); Jonathan Brody, Marina del Rey, CA (US); Leonid Gorkin, Chappaqua, NY (US); Jeffrey Arthur Johnson, Brooklyn, NY (US); Andrew Lin, Long Island City, NY (US); Walton Lin, Chatham, NJ (US); John Rauser, Seattle, WA (US); Amer Shahnawaz, New York, NY (US); Evan Spiegel, Los Angeles, CA (US); Marcel M. Yung, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/804,771

(22) Filed: May 31, 2022

(65) Prior Publication Data

US 2022/0291812 A1 Sep. 15, 2022

Related U.S. Application Data

(63) Continuation of application No. 15/965,775, filed on Apr. 27, 2018, now Pat. No. 11,385,763.

(Continued)

(51) Int. Cl.
*G06F 3/04817* (2022.01)
*G06F 3/0482* (2013.01)
(Continued)

(52) U.S. Cl.
CPC ........ *G06F 3/04817* (2013.01); *G06F 3/0482* (2013.01); *G06F 3/04842* (2013.01);
(Continued)

(58) Field of Classification Search
CPC ......... H04L 51/04; H04L 51/20; H04L 51/32; H04L 67/306; G06Q 50/01; G06F 3/04817
See application file for complete search history.

(56) References Cited

U.S. PATENT DOCUMENTS

| 666,223 A | 1/1901 | Shedlock |
| 4,581,634 A | 4/1986 | Williams |

(Continued)

FOREIGN PATENT DOCUMENTS

| CA | 2887596 A1 | 7/2015 |
| CN | 1852126 | 10/2006 |

(Continued)

OTHER PUBLICATIONS

C. Dempsey, "What is the difference between a heat map and a hot spot map?," dated Aug. 10, 2014, downloaded from https://www.gislounge.com/difference-heat-map-hot-spot-map/ (Year: 2014).*

(Continued)

*Primary Examiner* — Eric J Yoon
(74) *Attorney, Agent, or Firm* — Schwegman Lundberg & Woessner, P.A.

(57) ABSTRACT

A map-based graphical user interface for a social media application displays to social media activity information based on submission of geo-tagged social media items to the platform. Geographical distributions of social activity is displayed on a map forming part of the application. A heatmap can represent posting density or unusualness.

20 Claims, 29 Drawing Sheets

Related U.S. Application Data

(60) Provisional application No. 62/556,134, filed on Sep. 8, 2017, provisional application No. 62/552,958, filed on Aug. 31, 2017, provisional application No. 62/491,115, filed on Apr. 27, 2017.

(51) Int. Cl.

| | | |
|---|---|---|
| *G06F 3/04842* | (2022.01) | |
| *G06F 3/0488* | (2022.01) | |
| *G06F 16/248* | (2019.01) | |
| *G06F 16/29* | (2019.01) | |
| *G06F 16/487* | (2019.01) | |
| *G06F 16/9535* | (2019.01) | |
| *G06F 16/9537* | (2019.01) | |
| *G06Q 50/00* | (2012.01) | |
| *G06T 11/20* | (2006.01) | |
| *G06T 11/60* | (2006.01) | |
| *H04L 9/40* | (2022.01) | |
| *H04L 41/22* | (2022.01) | |
| *H04L 41/28* | (2022.01) | |
| *H04L 51/52* | (2022.01) | |
| *H04L 67/12* | (2022.01) | |
| *H04L 67/306* | (2022.01) | |
| *H04L 67/50* | (2022.01) | |
| *H04L 67/52* | (2022.01) | |
| *H04W 4/02* | (2018.01) | |
| *H04W 4/029* | (2018.01) | |
| *H04W 4/18* | (2009.01) | |
| *H04W 4/21* | (2018.01) | |
| *H04W 12/02* | (2009.01) | |
| *G06F 9/54* | (2006.01) | |

(52) U.S. Cl.
CPC .......... *G06F 3/0488* (2013.01); *G06F 16/248* (2019.01); *G06F 16/29* (2019.01); *G06F 16/487* (2019.01); *G06F 16/9535* (2019.01); *G06F 16/9537* (2019.01); *G06Q 50/01* (2013.01); *G06T 11/206* (2013.01); *G06T 11/60* (2013.01); *H04L 41/22* (2013.01); *H04L 41/28* (2013.01); *H04L 51/52* (2022.05); *H04L 63/101* (2013.01); *H04L 63/107* (2013.01); *H04L 67/12* (2013.01); *H04L 67/306* (2013.01); *H04L 67/52* (2022.05); *H04L 67/535* (2022.05); *H04W 4/02* (2013.01); *H04W 4/029* (2018.02); *H04W 4/185* (2013.01); *H04W 4/21* (2018.02); *H04W 12/02* (2013.01); *G06F 9/547* (2013.01); *G06T 2200/24* (2013.01)

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,559,707 A | 9/1996 | Delorme et al. |
| 5,713,073 A | 1/1998 | Warsta |
| 5,754,939 A | 5/1998 | Herz et al. |
| 5,826,269 A | 10/1998 | Hussey |
| 5,855,008 A | 12/1998 | Goldhaber et al. |
| 5,880,731 A | 3/1999 | Liles et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,023,270 A | 2/2000 | Brush, II et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,158,044 A | 12/2000 | Tibbetts |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,223,165 B1 | 4/2001 | Lauffer |
| 6,233,318 B1 | 5/2001 | Picard et al. |
| 6,283,858 B1 | 9/2001 | Hayes, Jr. et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,374,292 B1 | 4/2002 | Srivastava et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,473,794 B1 | 10/2002 | Guheen et al. |
| 6,484,196 B1 | 11/2002 | Maurille |
| 6,487,586 B2 | 11/2002 | Ogilvie et al. |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,701,347 B1 | 3/2004 | Ogilvie |
| 6,711,608 B1 | 3/2004 | Ogilvie |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,772,195 B1 | 8/2004 | Hatlelid et al. |
| 6,832,222 B1 | 12/2004 | Zimowski |
| 6,834,195 B2 | 12/2004 | Brandenberg et al. |
| 6,836,792 B1 | 12/2004 | Chen |
| 6,839,411 B1 | 1/2005 | Saltanov et al. |
| 6,842,779 B1 | 1/2005 | Nishizawa |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,073,129 B1 | 7/2006 | Robarts et al. |
| 7,079,158 B2 | 7/2006 | Lambertsen |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,243,163 B1 | 7/2007 | Friend et al. |
| 7,269,426 B2 | 9/2007 | Kokkonen et al. |
| 7,278,168 B1 | 10/2007 | Chaudhury et al. |
| 7,280,123 B2 | 10/2007 | Bentley et al. |
| 7,280,658 B2 | 10/2007 | Amini et al. |

(56) References Cited

U.S. PATENT DOCUMENTS

| | | |
|---|---|---|
| 7,315,823 B2 | 1/2008 | Brondrup |
| 7,342,587 B2 | 3/2008 | Danzig et al. |
| 7,349,768 B2 | 3/2008 | Bruce et al. |
| 7,356,564 B2 | 4/2008 | Hartselle et al. |
| 7,376,715 B2 | 5/2008 | Cunningham et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,468,729 B1 | 12/2008 | Levinson |
| 7,478,402 B2 | 1/2009 | Christensen et al. |
| 7,496,347 B2 | 2/2009 | Puranik |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,469 B2 | 5/2009 | Kim et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,627,828 B1 | 12/2009 | Collison et al. |
| 7,636,755 B2 | 12/2009 | Blattner et al. |
| 7,639,251 B2 | 12/2009 | Gu et al. |
| 7,639,943 B1 | 12/2009 | Kalajan |
| 7,650,231 B2 | 1/2010 | Gadler |
| 7,668,537 B2 | 2/2010 | DeVries |
| 7,689,649 B2 | 3/2010 | Heikes et al. |
| 7,703,140 B2 | 4/2010 | Nath et al. |
| 7,752,251 B1 | 7/2010 | Shuster et al. |
| 7,770,137 B2 | 8/2010 | Forbes et al. |
| 7,775,885 B2 | 8/2010 | Van et al. |
| 7,778,973 B2 | 8/2010 | Choi |
| 7,779,444 B2 | 8/2010 | Glad |
| 7,787,886 B2 | 8/2010 | Markhovsky et al. |
| 7,792,789 B2 | 9/2010 | Prahlad et al. |
| 7,796,946 B2 | 9/2010 | Eisenbach |
| 7,801,954 B2 | 9/2010 | Cadiz et al. |
| 7,818,336 B1 | 10/2010 | Amidon et al. |
| 7,856,360 B2 | 12/2010 | Kramer et al. |
| 7,859,551 B2 | 12/2010 | Bulman et al. |
| 7,885,931 B2 | 2/2011 | Seo et al. |
| 7,912,896 B2 | 3/2011 | Wolovitz et al. |
| 7,925,703 B2 | 4/2011 | Dinan et al. |
| 8,001,204 B2 | 8/2011 | Burtner et al. |
| 8,032,586 B2 | 10/2011 | Challenger et al. |
| 8,077,931 B1 | 12/2011 | Chatman et al. |
| 8,082,255 B1 | 12/2011 | Carlson, Jr. et al. |
| 8,088,044 B2 | 1/2012 | Tchao et al. |
| 8,090,351 B2 | 1/2012 | Klein |
| 8,095,878 B2 | 1/2012 | Bates et al. |
| 8,098,904 B2 | 1/2012 | Ioffe et al. |
| 8,099,109 B2 | 1/2012 | Altman et al. |
| 8,108,774 B2 | 1/2012 | Finn et al. |
| 8,112,716 B2 | 2/2012 | Kobayashi |
| 8,117,281 B2 | 2/2012 | Robinson et al. |
| 8,130,219 B2 | 3/2012 | Fleury et al. |
| 8,131,597 B2 | 3/2012 | Hudetz |
| 8,135,166 B2 | 3/2012 | Rhoads |
| 8,135,800 B1 | 3/2012 | Walsh et al. |
| 8,136,028 B1 | 3/2012 | Loeb et al. |
| 8,146,001 B1 | 3/2012 | Reese |
| 8,146,005 B2 | 3/2012 | Jones et al. |
| 8,151,191 B2 | 4/2012 | Nicol |
| 8,161,115 B2 | 4/2012 | Yamamoto |
| 8,161,417 B1 | 4/2012 | Lee |
| 8,169,505 B2 | 5/2012 | Hoshi |
| 8,170,957 B2 | 5/2012 | Richard |
| 8,195,203 B1 | 6/2012 | Tseng |
| 8,195,748 B2 | 6/2012 | Hallyn |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,384,719 B2 | 2/2013 | Reville et al. |
| 8,385,950 B1 | 2/2013 | Wagner et al. |
| RE44,054 E | 3/2013 | Kim |
| 8,396,708 B2 | 3/2013 | Park et al. |
| 8,402,097 B2 | 3/2013 | Szeto |
| 8,405,773 B2 | 3/2013 | Hayashi et al. |
| 8,413,059 B2 | 4/2013 | Lee et al. |
| 8,418,067 B2 | 4/2013 | Cheng et al. |
| 8,423,409 B2 | 4/2013 | Rao |
| 8,425,322 B2 | 4/2013 | Gillo et al. |
| 8,457,367 B1 | 6/2013 | Sipe et al. |
| 8,458,601 B2 | 6/2013 | Castelli et al. |
| 8,462,198 B2 | 6/2013 | Lin et al. |
| 8,471,914 B2 | 6/2013 | Sakiyama et al. |
| 8,472,935 B1 | 6/2013 | Fujisaki |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,559,980 B2 | 10/2013 | Pujol |
| 8,560,612 B2 | 10/2013 | Kilmer et al. |
| 8,564,621 B2 | 10/2013 | Branson et al. |
| 8,564,710 B2 | 10/2013 | Nonaka et al. |
| 8,570,326 B2 | 10/2013 | Gorev |
| 8,570,907 B2 | 10/2013 | Garcia, Jr. et al. |
| 8,581,911 B2 | 11/2013 | Becker et al. |
| 8,594,680 B2 | 11/2013 | Ledlie et al. |
| 8,597,121 B2 | 12/2013 | del Valle |
| 8,601,051 B2 | 12/2013 | Wang |
| 8,601,379 B2 | 12/2013 | Marks et al. |
| 8,613,089 B1 | 12/2013 | Holloway et al. |
| 8,632,408 B2 | 1/2014 | Gillo et al. |
| 8,639,767 B1 | 1/2014 | Harris et al. |
| 8,648,865 B2 | 2/2014 | Dawson et al. |
| 8,655,389 B1 | 2/2014 | Jackson et al. |
| 8,659,548 B2 | 2/2014 | Hildreth |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,683,354 B2 | 3/2014 | Khandelwal et al. |
| 8,692,830 B2 | 4/2014 | Nelson et al. |
| 8,700,012 B2 | 4/2014 | Ferren et al. |
| 8,718,333 B2 | 5/2014 | Wolf et al. |
| 8,724,622 B2 | 5/2014 | Rojas |
| 8,730,231 B2 | 5/2014 | Snoddy et al. |
| 8,732,168 B2 | 5/2014 | Johnson |
| 8,732,193 B2 | 5/2014 | Skeen et al. |
| 8,738,719 B2 | 5/2014 | Lee et al. |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |

(56) References Cited

U.S. PATENT DOCUMENTS

| | | |
|---|---|---|
| 8,856,349 B2 | 10/2014 | Jain et al. |
| 8,874,677 B2 | 10/2014 | Rosen et al. |
| 8,886,227 B2 | 11/2014 | Schmidt et al. |
| 8,887,035 B2 | 11/2014 | Mcdonald et al. |
| 8,890,926 B2 | 11/2014 | Tandon et al. |
| 8,892,999 B2 | 11/2014 | Nims et al. |
| 8,893,010 B1 | 11/2014 | Brin et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,924,250 B2 | 12/2014 | Bates et al. |
| 8,935,656 B2 | 1/2015 | Dandia et al. |
| 8,963,926 B2 | 2/2015 | Brown et al. |
| 8,972,357 B2 | 3/2015 | Shim et al. |
| 8,989,786 B2 | 3/2015 | Feghali |
| 8,995,433 B2 | 3/2015 | Rojas |
| 9,002,643 B2 | 4/2015 | Xu |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,083,770 B1 | 7/2015 | Drose et al. |
| 9,086,776 B2 | 7/2015 | Ye et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,148,424 B1 | 9/2015 | Yang |
| 9,152,477 B1 | 10/2015 | Campbell et al. |
| 9,191,776 B2 | 11/2015 | Root et al. |
| 9,204,252 B2 | 12/2015 | Root |
| 9,224,220 B2 | 12/2015 | Toyoda et al. |
| 9,225,805 B2 | 12/2015 | Kujawa et al. |
| 9,225,897 B1 | 12/2015 | Sehn et al. |
| 9,237,202 B1 | 1/2016 | Sehn |
| 9,241,184 B2 | 1/2016 | Weerasinghe |
| 9,247,377 B2 | 1/2016 | Pai et al. |
| 9,256,860 B2 | 2/2016 | Herger et al. |
| 9,258,459 B2 | 2/2016 | Hartley |
| 9,264,463 B2 | 2/2016 | Rubinstein et al. |
| 9,276,886 B1 | 3/2016 | Samaranayake |
| 9,294,425 B1 | 3/2016 | Son |
| 9,298,257 B2 | 3/2016 | Hwang et al. |
| 9,314,692 B2 | 4/2016 | Konoplev et al. |
| 9,330,174 B1 * | 5/2016 | Zhang .................. G06F 16/95 |
| 9,330,483 B2 | 5/2016 | Du et al. |
| 9,344,606 B2 | 5/2016 | Hartley et al. |
| 9,357,174 B2 | 5/2016 | Li et al. |
| 9,361,510 B2 | 6/2016 | Yao et al. |
| 9,369,422 B1 | 6/2016 | Ozog |
| 9,378,576 B2 | 6/2016 | Bouaziz et al. |
| 9,385,983 B1 | 7/2016 | Sehn |
| 9,392,308 B2 | 7/2016 | Ahmed et al. |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,460,541 B2 | 10/2016 | Li et al. |
| 9,482,882 B1 | 11/2016 | Hanover et al. |
| 9,482,883 B1 | 11/2016 | Meisenholder |
| 9,485,747 B1 | 11/2016 | Rodoper et al. |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,628,950 B1 | 4/2017 | Noeth et al. |
| 9,635,195 B1 | 4/2017 | Green et al. |
| 9,641,870 B1 | 5/2017 | Cormie et al. |
| 9,648,376 B2 | 5/2017 | Chang et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,710,821 B2 | 7/2017 | Heath |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,773,284 B2 | 9/2017 | Huang et al. |
| 9,785,796 B1 | 10/2017 | Murphy et al. |
| 9,792,714 B2 | 10/2017 | Li et al. |
| 9,824,463 B2 | 11/2017 | Ingrassia et al. |
| 9,825,898 B2 | 11/2017 | Sehn |
| 9,839,844 B2 | 12/2017 | Dunstan et al. |
| 9,854,219 B2 | 12/2017 | Sehn |
| 9,883,838 B2 | 2/2018 | Kaleal, III et al. |
| 9,894,476 B2 | 2/2018 | Fraccaroli |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,961,520 B2 | 5/2018 | Brooks et al. |
| 9,980,100 B1 | 5/2018 | Charlton et al. |
| 9,990,373 B2 | 6/2018 | Fortkort |
| 9,990,653 B1 | 6/2018 | Lewis et al. |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,146,748 B1 | 12/2018 | Barndollar et al. |
| 10,155,168 B2 | 12/2018 | Blackstock et al. |
| 10,158,589 B2 | 12/2018 | Collet et al. |
| 10,178,507 B1 | 1/2019 | Roberts |
| 10,194,270 B2 | 1/2019 | Yokoyama et al. |
| 10,212,541 B1 | 2/2019 | Brody et al. |
| 10,237,692 B2 | 3/2019 | Shan et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,375,519 B2 | 8/2019 | Pai et al. |
| 10,382,378 B2 | 8/2019 | Garcia et al. |
| 10,432,498 B1 | 10/2019 | Mcclendon |
| 10,475,225 B2 | 11/2019 | Park et al. |
| 10,496,661 B2 | 12/2019 | Morgan et al. |
| 10,504,266 B2 | 12/2019 | Blattner et al. |
| 10,573,048 B2 | 2/2020 | Ni et al. |
| 10,599,291 B2 | 3/2020 | Cheung et al. |
| 10,657,701 B2 | 5/2020 | Osman et al. |
| 10,748,206 B1 | 8/2020 | Cooper et al. |
| 10,938,758 B2 | 3/2021 | Allen et al. |
| 10,952,013 B1 | 3/2021 | Brody et al. |
| 10,963,529 B1 | 3/2021 | Amitay et al. |
| 11,385,763 B2 | 7/2022 | Amitay et al. |
| 11,392,264 B1 | 7/2022 | Amitay et al. |
| 11,409,407 B2 | 8/2022 | Amitay et al. |
| 11,418,906 B2 | 8/2022 | Brody et al. |
| 11,451,956 B1 | 9/2022 | Amitay et al. |
| 11,474,663 B2 | 10/2022 | Amitay et al. |
| 11,556,221 B2 | 1/2023 | Amitay et al. |
| 11,747,663 B2 | 9/2023 | Kang et al. |
| 11,782,574 B2 | 10/2023 | Amitay et al. |
| 11,842,411 B2 | 12/2023 | Amitay et al. |

(56) References Cited

U.S. PATENT DOCUMENTS

| | | |
|---|---|---|
| 11,893,647 B2 | 2/2024 | Brody et al. |
| 11,995,288 B2 | 5/2024 | Amitay et al. |
| 12,058,583 B2 | 8/2024 | Brody et al. |
| 12,086,381 B2 | 9/2024 | Amitay et al. |
| 12,112,013 B2 | 10/2024 | Amitay et al. |
| 12,131,003 B2 | 10/2024 | Amitay et al. |
| 2002/0035607 A1 | 3/2002 | Checkoway et al. |
| 2002/0047868 A1 | 4/2002 | Miyazawa |
| 2002/0059193 A1 | 5/2002 | Decime et al. |
| 2002/0067362 A1 | 6/2002 | Agostino Nocera et al. |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2002/0169644 A1 | 11/2002 | Greene |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0206171 A1 | 11/2003 | Kim et al. |
| 2003/0217106 A1 | 11/2003 | Adar et al. |
| 2003/0229607 A1 | 12/2003 | Zellweger et al. |
| 2004/0025180 A1 | 2/2004 | Begeja et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0144241 A1 | 6/2005 | Stata et al. |
| 2005/0162419 A1 | 7/2005 | Kim et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0206610 A1 | 9/2005 | Cordelli |
| 2005/0223066 A1 | 10/2005 | Buchheit et al. |
| 2005/0270299 A1 | 12/2005 | Rasmussen et al. |
| 2005/0280660 A1 | 12/2005 | Seo et al. |
| 2005/0288954 A1 | 12/2005 | McCarthy et al. |
| 2006/0026067 A1 | 2/2006 | Nicholas et al. |
| 2006/0031412 A1 | 2/2006 | Adams et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0145944 A1 | 7/2006 | Tarlton et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2006/0294465 A1 | 12/2006 | Ronen et al. |
| 2007/0004426 A1 | 1/2007 | Pfleging et al. |
| 2007/0011270 A1 | 1/2007 | Klein et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0113181 A1 | 5/2007 | Blattner et al. |
| 2007/0118520 A1 | 5/2007 | Bliss et al. |
| 2007/0136228 A1 | 6/2007 | Petersen |
| 2007/0168863 A1 | 7/2007 | Blattner et al. |
| 2007/0176921 A1 | 8/2007 | Iwasaki et al. |
| 2007/0192128 A1 | 8/2007 | Celestini |
| 2007/0196033 A1 | 8/2007 | Russo |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0218987 A1 | 9/2007 | Luchene et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0258656 A1 | 11/2007 | Aarabi et al. |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0070593 A1 | 3/2008 | Altman et al. |
| 2008/0076505 A1 | 3/2008 | Ngyen et al. |
| 2008/0084429 A1 | 4/2008 | Wissinger |
| 2008/0092233 A1 | 4/2008 | Tian et al. |
| 2008/0094387 A1 | 4/2008 | Chen |
| 2008/0097979 A1 | 4/2008 | Heidloff et al. |
| 2008/0104503 A1 | 5/2008 | Beall et al. |
| 2008/0109159 A1 | 5/2008 | Shi et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158222 A1 | 7/2008 | Li et al. |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0201638 A1 | 8/2008 | Nair |
| 2008/0207176 A1 | 8/2008 | Brackbill et al. |
| 2008/0208692 A1 | 8/2008 | Garaventi et al. |
| 2008/0209329 A1 | 8/2008 | Defranco et al. |
| 2008/0214210 A1 | 9/2008 | Rasanen et al. |
| 2008/0216092 A1 | 9/2008 | Serlet |
| 2008/0222108 A1 | 9/2008 | Prahlad et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0309617 A1 | 12/2008 | Kong et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0013268 A1 | 1/2009 | Amit |
| 2009/0015703 A1 | 1/2009 | Kim et al. |

(56) References Cited

U.S. PATENT DOCUMENTS

| | | |
|---|---|---|
| 2009/0016617 A1 | 1/2009 | Bregman-Amitai et al. |
| 2009/0024956 A1 | 1/2009 | Kobayashi |
| 2009/0030774 A1 | 1/2009 | Rothschild et al. |
| 2009/0030884 A1 | 1/2009 | Pulfer et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0044113 A1 | 2/2009 | Jones et al. |
| 2009/0047972 A1 | 2/2009 | Neeraj |
| 2009/0055484 A1 | 2/2009 | Vuong et al. |
| 2009/0058822 A1 | 3/2009 | Chaudhri |
| 2009/0070688 A1 | 3/2009 | Gyorfi et al. |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0099925 A1 | 4/2009 | Mehta et al. |
| 2009/0100367 A1 | 4/2009 | Dargahi et al. |
| 2009/0106672 A1 | 4/2009 | Burstrom |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0134968 A1 | 5/2009 | Girgensohn et al. |
| 2009/0144639 A1 | 6/2009 | Nims et al. |
| 2009/0148045 A1 | 6/2009 | Lee et al. |
| 2009/0150778 A1 | 6/2009 | Nicol |
| 2009/0153492 A1 | 6/2009 | Popp |
| 2009/0153552 A1 | 6/2009 | Fidaleo et al. |
| 2009/0157450 A1 | 6/2009 | Athsani et al. |
| 2009/0157752 A1 | 6/2009 | Gonzalez |
| 2009/0158170 A1 | 6/2009 | Narayanan et al. |
| 2009/0160970 A1 | 6/2009 | Fredlund et al. |
| 2009/0163182 A1 | 6/2009 | Gatti et al. |
| 2009/0164459 A1 | 6/2009 | Jennings et al. |
| 2009/0177299 A1 | 7/2009 | Van De Sluis |
| 2009/0177976 A1 | 7/2009 | Bokor et al. |
| 2009/0192900 A1 | 7/2009 | Collision |
| 2009/0198767 A1 | 8/2009 | Jakobson et al. |
| 2009/0199242 A1 | 8/2009 | Johnson et al. |
| 2009/0202114 A1 | 8/2009 | Morin et al. |
| 2009/0215469 A1 | 8/2009 | Fisher et al. |
| 2009/0228811 A1 | 9/2009 | Adams et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0254840 A1 | 10/2009 | Churchill et al. |
| 2009/0265604 A1 | 10/2009 | Howard et al. |
| 2009/0265647 A1 | 10/2009 | Martin et al. |
| 2009/0284551 A1 | 11/2009 | Stanton |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0300525 A1 | 12/2009 | Jolliff et al. |
| 2009/0303984 A1 | 12/2009 | Clark et al. |
| 2009/0319178 A1 | 12/2009 | Khosravy et al. |
| 2009/0319607 A1 | 12/2009 | Belz et al. |
| 2009/0327073 A1 | 12/2009 | Li |
| 2009/0328122 A1 | 12/2009 | Amento et al. |
| 2010/0011422 A1 | 1/2010 | Mason et al. |
| 2010/0023885 A1 | 1/2010 | Reville et al. |
| 2010/0058212 A1 | 3/2010 | Belitz et al. |
| 2010/0062794 A1 | 3/2010 | Han |
| 2010/0073487 A1 | 3/2010 | Sogoh et al. |
| 2010/0082427 A1 | 4/2010 | Burgener et al. |
| 2010/0082693 A1 | 4/2010 | Hugg et al. |
| 2010/0083140 A1 | 4/2010 | Dawson et al. |
| 2010/0083148 A1 | 4/2010 | Finn et al. |
| 2010/0100568 A1 | 4/2010 | Papin et al. |
| 2010/0100828 A1 | 4/2010 | Khandelwal et al. |
| 2010/0113065 A1 | 5/2010 | Narayan et al. |
| 2010/0115407 A1 | 5/2010 | Kim et al. |
| 2010/0115426 A1 | 5/2010 | Liu et al. |
| 2010/0121915 A1 | 5/2010 | Wang |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0179953 A1 | 7/2010 | Kan et al. |
| 2010/0179991 A1 | 7/2010 | Lorch et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0203968 A1 | 8/2010 | Gill et al. |
| 2010/0205242 A1 | 8/2010 | Marchioro et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0227682 A1 | 9/2010 | Reville et al. |
| 2010/0250109 A1 | 9/2010 | Johnston et al. |
| 2010/0257196 A1 | 10/2010 | Waters et al. |
| 2010/0257454 A1 | 10/2010 | Lee et al. |
| 2010/0259386 A1 | 10/2010 | Holley et al. |
| 2010/0262915 A1 | 10/2010 | Bocking et al. |
| 2010/0273509 A1 | 10/2010 | Sweeney et al. |
| 2010/0274724 A1 | 10/2010 | Bible, Jr. et al. |
| 2010/0279665 A1 | 11/2010 | Hardin et al. |
| 2010/0279713 A1 | 11/2010 | Dicke |
| 2010/0281045 A1 | 11/2010 | Dean |
| 2010/0290756 A1 | 11/2010 | Karaoguz et al. |
| 2010/0299060 A1 | 11/2010 | Snavely et al. |
| 2010/0306669 A1 | 12/2010 | Della Pasqua |
| 2010/0332980 A1 | 12/2010 | Sun et al. |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0047404 A1 | 2/2011 | Metzler et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066664 A1 | 3/2011 | Goldman et al. |
| 2011/0066743 A1 | 3/2011 | Hurley et al. |
| 2011/0083101 A1 | 4/2011 | Sharon et al. |
| 2011/0093780 A1 | 4/2011 | Dunn |
| 2011/0099507 A1 | 4/2011 | Nesladek et al. |
| 2011/0102630 A1 | 5/2011 | Rukes |
| 2011/0115798 A1 | 5/2011 | Nayar et al. |
| 2011/0119133 A1 | 5/2011 | Igelman et al. |
| 2011/0126096 A1 | 5/2011 | Ohashi et al. |
| 2011/0137881 A1 | 6/2011 | Cheng et al. |
| 2011/0145564 A1 | 6/2011 | Moshir et al. |
| 2011/0148864 A1 | 6/2011 | Lee et al. |
| 2011/0149332 A1 | 6/2011 | Cho |
| 2011/0153759 A1 | 6/2011 | Rathod |
| 2011/0159890 A1 | 6/2011 | Fortescue et al. |
| 2011/0161076 A1 | 6/2011 | Davis et al. |
| 2011/0164163 A1 | 7/2011 | Bilbrey et al. |
| 2011/0167125 A1 | 7/2011 | Achlioptas |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0211764 A1 | 9/2011 | Krupka et al. |
| 2011/0213716 A1* | 9/2011 | Ocko ............... A63F 13/30 |
| | | 705/304 |

(56) References Cited

U.S. PATENT DOCUMENTS

| | | |
|---|---|---|
| 2011/0213845 A1 | 9/2011 | Logan et al. |
| 2011/0215966 A1 | 9/2011 | Kim et al. |
| 2011/0225048 A1 | 9/2011 | Nair |
| 2011/0238755 A1 | 9/2011 | Khan et al. |
| 2011/0238762 A1 | 9/2011 | Soni et al. |
| 2011/0238763 A1 | 9/2011 | Shin et al. |
| 2011/0239136 A1 | 9/2011 | Goldman et al. |
| 2011/0239143 A1 | 9/2011 | Ye et al. |
| 2011/0246330 A1 | 10/2011 | Tikku et al. |
| 2011/0249891 A1 | 10/2011 | Li |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0285703 A1 | 11/2011 | Jin |
| 2011/0286586 A1 | 11/2011 | Saylor et al. |
| 2011/0292051 A1 | 12/2011 | Nelson et al. |
| 2011/0300837 A1 | 12/2011 | Misiag |
| 2011/0314419 A1 | 12/2011 | Dunn et al. |
| 2011/0320373 A1 | 12/2011 | Lee et al. |
| 2012/0013770 A1 | 1/2012 | Stafford et al. |
| 2012/0015673 A1 | 1/2012 | Klassen et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0059826 A1 | 3/2012 | Mate et al. |
| 2012/0062805 A1 | 3/2012 | Candelore |
| 2012/0069028 A1 | 3/2012 | Bouguerra |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113106 A1 | 5/2012 | Choi et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0130717 A1 | 5/2012 | Xu et al. |
| 2012/0131507 A1 | 5/2012 | Sparandara et al. |
| 2012/0131512 A1 | 5/2012 | Takeuchi et al. |
| 2012/0139830 A1 | 6/2012 | Hwang et al. |
| 2012/0141046 A1 | 6/2012 | Chen et al. |
| 2012/0143760 A1 | 6/2012 | Abulafia et al. |
| 2012/0144452 A1 | 6/2012 | Dyor et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0188247 A1 | 7/2012 | Cheung et al. |
| 2012/0197724 A1 | 8/2012 | Kendall |
| 2012/0200743 A1 | 8/2012 | Blanchflower et al. |
| 2012/0209921 A1 | 8/2012 | Adafin et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0221687 A1 | 8/2012 | Hunter et al. |
| 2012/0226748 A1 | 9/2012 | Bosworth et al. |
| 2012/0229506 A1 | 9/2012 | Nishikawa |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0253858 A1 | 10/2012 | Glissmann et al. |
| 2012/0254325 A1 | 10/2012 | Majeti et al. |
| 2012/0271883 A1 | 10/2012 | Montoya et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0290977 A1 | 11/2012 | Devecka |
| 2012/0295639 A1 | 11/2012 | Fitoussi et al. |
| 2012/0299954 A1 | 11/2012 | Wada et al. |
| 2012/0302256 A1 | 11/2012 | Pai et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0315987 A1 | 12/2012 | Walling |
| 2012/0319904 A1 | 12/2012 | Lee et al. |
| 2012/0323933 A1 | 12/2012 | He et al. |
| 2012/0323938 A1 | 12/2012 | Skeen et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0031180 A1 | 1/2013 | Abendroth et al. |
| 2013/0036165 A1 | 2/2013 | Tseng et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0073970 A1 | 3/2013 | Piantino et al. |
| 2013/0073971 A1 | 3/2013 | Huang et al. |
| 2013/0073984 A1 | 3/2013 | Lessin et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0103760 A1 | 4/2013 | Golding et al. |
| 2013/0103766 A1 | 4/2013 | Gupta |
| 2013/0104053 A1 | 4/2013 | Thornton et al. |
| 2013/0110631 A1 | 5/2013 | Mitchell et al. |
| 2013/0110641 A1 | 5/2013 | Ormont et al. |
| 2013/0110885 A1 | 5/2013 | Brundrett, III |
| 2013/0111354 A1 | 5/2013 | Marra et al. |
| 2013/0111514 A1 | 5/2013 | Slavin et al. |
| 2013/0117353 A1 | 5/2013 | Wong et al. |
| 2013/0124091 A1 | 5/2013 | Matas et al. |
| 2013/0128059 A1 | 5/2013 | Kristensson |
| 2013/0129084 A1 | 5/2013 | Appleton |
| 2013/0129252 A1 | 5/2013 | Lauper |
| 2013/0132477 A1 | 5/2013 | Bosworth et al. |
| 2013/0141463 A1 | 6/2013 | Barnett et al. |
| 2013/0145286 A1 | 6/2013 | Feng et al. |
| 2013/0151988 A1 | 6/2013 | Sorin et al. |
| 2013/0152000 A1 | 6/2013 | Liu et al. |
| 2013/0155169 A1 | 6/2013 | Hoover et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0174059 A1 | 7/2013 | Van Wie et al. |
| 2013/0179520 A1 | 7/2013 | Lee et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0201187 A1 | 8/2013 | Tong et al. |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0239019 A1 | 9/2013 | Pike et al. |

(56) References Cited

U.S. PATENT DOCUMENTS

| | | |
|---|---|---|
| 2013/0249948 A1 | 9/2013 | Reitan |
| 2013/0254900 A1 | 9/2013 | Sathish et al. |
| 2013/0257877 A1 | 10/2013 | Davis |
| 2013/0258040 A1 | 10/2013 | Kaytaz et al. |
| 2013/0260800 A1 | 10/2013 | Asakawa et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0311452 A1 | 11/2013 | Jacoby |
| 2013/0325964 A1 | 12/2013 | Berberat |
| 2013/0332068 A1 | 12/2013 | Kesar et al. |
| 2013/0339868 A1 | 12/2013 | Sharpe et al. |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0011576 A1 | 1/2014 | Barbalet et al. |
| 2014/0019264 A1 | 1/2014 | Wachman et al. |
| 2014/0032682 A1 | 1/2014 | Prado et al. |
| 2014/0039842 A1 | 2/2014 | Yuen et al. |
| 2014/0040371 A1 | 2/2014 | Gurevich et al. |
| 2014/0043204 A1 | 2/2014 | Basnayake et al. |
| 2014/0043329 A1 | 2/2014 | Wang et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0055554 A1 | 2/2014 | Du et al. |
| 2014/0057550 A1 | 2/2014 | Alen |
| 2014/0057660 A1 | 2/2014 | Wager |
| 2014/0082651 A1 | 3/2014 | Sharifi |
| 2014/0085293 A1 | 3/2014 | Konoplev et al. |
| 2014/0089771 A1 | 3/2014 | Pilskalns |
| 2014/0089816 A1 | 3/2014 | Dipersia et al. |
| 2014/0092130 A1 | 4/2014 | Anderson et al. |
| 2014/0096029 A1 | 4/2014 | Schultz |
| 2014/0099880 A1 | 4/2014 | Thistoll et al. |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0125678 A1 | 5/2014 | Wang et al. |
| 2014/0129343 A1 | 5/2014 | Finster et al. |
| 2014/0129953 A1 | 5/2014 | Spiegel |
| 2014/0143143 A1 | 5/2014 | Fasoli et al. |
| 2014/0143241 A1 | 5/2014 | Barello et al. |
| 2014/0149519 A1 | 5/2014 | Redfern et al. |
| 2014/0155102 A1 | 6/2014 | Cooper et al. |
| 2014/0157139 A1 | 6/2014 | Coroy et al. |
| 2014/0160149 A1 | 6/2014 | Blackstock et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0199970 A1 | 7/2014 | Klotz |
| 2014/0201527 A1 | 7/2014 | Krivorot |
| 2014/0207679 A1 | 7/2014 | Cho |
| 2014/0214471 A1 | 7/2014 | Schreiner, III |
| 2014/0218394 A1 | 8/2014 | Hochmuth et al. |
| 2014/0221089 A1 | 8/2014 | Fortkort |
| 2014/0222564 A1 | 8/2014 | Kranendonk et al. |
| 2014/0223372 A1 | 8/2014 | Dostie et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280005 A1 | 9/2014 | Powers |
| 2014/0280058 A1 | 9/2014 | St. Clair |
| 2014/0280180 A1 | 9/2014 | Edecker et al. |
| 2014/0280318 A1 | 9/2014 | Simms et al. |
| 2014/0280537 A1 | 9/2014 | Pridmore et al. |
| 2014/0282096 A1 | 9/2014 | Rubinstein et al. |
| 2014/0287779 A1 | 9/2014 | O'Keefe et al. |
| 2014/0289216 A1 | 9/2014 | Voellmer et al. |
| 2014/0289249 A1 | 9/2014 | Davis |
| 2014/0289833 A1 | 9/2014 | Briceno |
| 2014/0306884 A1 | 10/2014 | Sano et al. |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0347368 A1 | 11/2014 | Kishore et al. |
| 2014/0359024 A1 | 12/2014 | Spiegel |
| 2014/0359032 A1 | 12/2014 | Spiegel et al. |
| 2014/0362091 A1 | 12/2014 | Bouaziz et al. |
| 2014/0372420 A1 | 12/2014 | Slep |
| 2014/0380195 A1 | 12/2014 | Graham et al. |
| 2014/0380511 A1 | 12/2014 | Faaborg et al. |
| 2015/0019651 A1 | 1/2015 | Kazi et al. |
| 2015/0020086 A1 | 1/2015 | Chen et al. |
| 2015/0046278 A1 | 2/2015 | Pei et al. |
| 2015/0058345 A1 | 2/2015 | Mishra et al. |
| 2015/0067880 A1 | 3/2015 | Ward et al. |
| 2015/0071619 A1 | 3/2015 | Brough |
| 2015/0084892 A1 | 3/2015 | Shirota et al. |
| 2015/0086087 A1 | 3/2015 | Ricanek, Jr. et al. |
| 2015/0087263 A1 | 3/2015 | Branscomb et al. |
| 2015/0088464 A1 | 3/2015 | Yuen et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0120237 A1 | 4/2015 | Gouda et al. |
| 2015/0121216 A1 | 4/2015 | Brown et al. |
| 2015/0121251 A1 | 4/2015 | Kadirvel et al. |
| 2015/0123967 A1 | 5/2015 | Quinn et al. |
| 2015/0128020 A1 | 5/2015 | Chávez et al. |
| 2015/0153934 A1 | 6/2015 | Zherebtsov et al. |
| 2015/0155007 A1 | 6/2015 | Barfield, Jr. et al. |
| 2015/0160832 A1 | 6/2015 | Walkin et al. |
| 2015/0169139 A1 | 6/2015 | Leva et al. |
| 2015/0169142 A1 | 6/2015 | Longo et al. |
| 2015/0169827 A1 | 6/2015 | Laborde |
| 2015/0169938 A1 | 6/2015 | Yao et al. |
| 2015/0172393 A1 | 6/2015 | Oplinger et al. |
| 2015/0172534 A1 | 6/2015 | Miyakawa et al. |
| 2015/0178260 A1 | 6/2015 | Brunson |
| 2015/0181380 A1 | 6/2015 | Altman et al. |
| 2015/0186531 A1 | 7/2015 | Agarwal et al. |
| 2015/0186977 A1 | 7/2015 | Leonard et al. |
| 2015/0187100 A1 | 7/2015 | Berry et al. |
| 2015/0193522 A1 | 7/2015 | Choi et al. |
| 2015/0193585 A1 | 7/2015 | Sunna |
| 2015/0193819 A1 | 7/2015 | Chang |
| 2015/0195235 A1 | 7/2015 | Trussel et al. |
| 2015/0199082 A1 | 7/2015 | Scholler et al. |
| 2015/0201030 A1 | 7/2015 | Longo et al. |
| 2015/0206349 A1 | 7/2015 | Rosenthal et al. |
| 2015/0213604 A1 | 7/2015 | Li et al. |
| 2015/0220774 A1 | 8/2015 | Ebersman et al. |
| 2015/0222814 A1 | 8/2015 | Li et al. |
| 2015/0227602 A1 | 8/2015 | Ramu et al. |
| 2015/0232065 A1 | 8/2015 | Ricci et al. |
| 2015/0234942 A1 | 8/2015 | Harmon |
| 2015/0237473 A1 | 8/2015 | Koepke |
| 2015/0245168 A1 | 8/2015 | Martin |
| 2015/0261917 A1 | 9/2015 | Smith |
| 2015/0264432 A1 | 9/2015 | Cheng |
| 2015/0268830 A1 | 9/2015 | Martynov |
| 2015/0295866 A1 | 10/2015 | Collet et al. |
| 2015/0301579 A1 | 10/2015 | Vaccari et al. |
| 2015/0304806 A1 | 10/2015 | Vincent |
| 2015/0312184 A1 | 10/2015 | Langholz et al. |
| 2015/0334077 A1 | 11/2015 | Feldman |
| 2015/0339027 A1 | 11/2015 | Al-moosawi |

(56) References Cited

U.S. PATENT DOCUMENTS

| | | |
|---|---|---|
| 2015/0339710 A1 | 11/2015 | Landscheidt et al. |
| 2015/0347519 A1 | 12/2015 | Hornkvist et al. |
| 2015/0350136 A1 | 12/2015 | Flynn, III et al. |
| 2015/0350262 A1 | 12/2015 | Rainisto et al. |
| 2015/0365795 A1 | 12/2015 | Allen et al. |
| 2015/0369623 A1 | 12/2015 | Blumenberg et al. |
| 2015/0370830 A1 | 12/2015 | Murphy-Chutorian et al. |
| 2015/0378502 A1 | 12/2015 | Hu et al. |
| 2016/0006927 A1 | 1/2016 | Sehn |
| 2016/0012066 A1 | 1/2016 | Ning et al. |
| 2016/0014063 A1 | 1/2016 | Hogeg et al. |
| 2016/0021153 A1 | 1/2016 | Hull et al. |
| 2016/0028471 A1 | 1/2016 | Boss et al. |
| 2016/0035111 A1 | 2/2016 | Ingrassia et al. |
| 2016/0045834 A1 | 2/2016 | Burns |
| 2016/0055164 A1 | 2/2016 | Cantarero et al. |
| 2016/0063537 A1 | 3/2016 | Kumar Goel |
| 2016/0063828 A1 | 3/2016 | Moussette et al. |
| 2016/0078095 A1 | 3/2016 | Man et al. |
| 2016/0080438 A1 | 3/2016 | Liang |
| 2016/0085773 A1 | 3/2016 | Chang et al. |
| 2016/0085863 A1 | 3/2016 | Allen et al. |
| 2016/0086500 A1 | 3/2016 | Kaleal, III |
| 2016/0086670 A1 | 3/2016 | Gross et al. |
| 2016/0093078 A1 | 3/2016 | Davis et al. |
| 2016/0099901 A1 | 4/2016 | Allen et al. |
| 2016/0134840 A1 | 5/2016 | Mcculloch |
| 2016/0158600 A1 | 6/2016 | Rolley |
| 2016/0163084 A1 | 6/2016 | Corazza et al. |
| 2016/0164823 A1 | 6/2016 | Nordstrom et al. |
| 2016/0171655 A1 | 6/2016 | Homma |
| 2016/0179823 A1 | 6/2016 | Yang |
| 2016/0180887 A1 | 6/2016 | Sehn |
| 2016/0182422 A1 | 6/2016 | Sehn et al. |
| 2016/0182875 A1 | 6/2016 | Sehn |
| 2016/0188997 A1 | 6/2016 | Desnoyer et al. |
| 2016/0189310 A1 | 6/2016 | O'Kane |
| 2016/0210500 A1 | 7/2016 | Feng et al. |
| 2016/0212071 A1 | 7/2016 | Hannah et al. |
| 2016/0217292 A1 | 7/2016 | Faaborg et al. |
| 2016/0234060 A1 | 8/2016 | Pai et al. |
| 2016/0234149 A1 | 8/2016 | Tsuda et al. |
| 2016/0239248 A1 | 8/2016 | Sehn |
| 2016/0241504 A1 | 8/2016 | Raji et al. |
| 2016/0275721 A1 | 9/2016 | Park et al. |
| 2016/0277419 A1 | 9/2016 | Allen et al. |
| 2016/0286244 A1 | 9/2016 | Chang et al. |
| 2016/0292273 A1 | 10/2016 | Murphy et al. |
| 2016/0292905 A1 | 10/2016 | Nehmadi et al. |
| 2016/0294891 A1 | 10/2016 | Miller |
| 2016/0298982 A1 | 10/2016 | Bailiang |
| 2016/0313957 A1 | 10/2016 | Ebert et al. |
| 2016/0321708 A1 | 11/2016 | Sehn |
| 2016/0343160 A1 | 11/2016 | Blattner et al. |
| 2016/0350297 A1 | 12/2016 | Riza |
| 2016/0356617 A1 | 12/2016 | Verosub et al. |
| 2016/0359957 A1 | 12/2016 | Laliberte |
| 2016/0359987 A1 | 12/2016 | Laliberte |
| 2016/0359993 A1 | 12/2016 | Hendrickson et al. |
| 2016/0378278 A1 | 12/2016 | Sirpal |
| 2017/0006094 A1 | 1/2017 | Abou Mahmoud et al. |
| 2017/0006322 A1 | 1/2017 | Dury et al. |
| 2017/0010768 A1 | 1/2017 | Watson et al. |
| 2017/0027528 A1 | 2/2017 | Kaleal, III et al. |
| 2017/0034173 A1 | 2/2017 | Miller et al. |
| 2017/0039452 A1 | 2/2017 | Osindero et al. |
| 2017/0039752 A1 | 2/2017 | Quinn et al. |
| 2017/0061308 A1 | 3/2017 | Chen et al. |
| 2017/0061476 A1 | 3/2017 | Manouchehri et al. |
| 2017/0064240 A1 | 3/2017 | Mangat et al. |
| 2017/0067748 A1 | 3/2017 | Glover et al. |
| 2017/0076217 A1 | 3/2017 | Krumm et al. |
| 2017/0076328 A1 | 3/2017 | Suzuki |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0124116 A1 | 5/2017 | League |
| 2017/0126592 A1 | 5/2017 | El |
| 2017/0132649 A1 | 5/2017 | Oliva et al. |
| 2017/0161382 A1 | 6/2017 | Ouimet et al. |
| 2017/0161745 A1 | 6/2017 | Hawkins |
| 2017/0192637 A1 | 7/2017 | Ren et al. |
| 2017/0199855 A1 | 7/2017 | Fishbeck |
| 2017/0206470 A1 | 7/2017 | Marculescu et al. |
| 2017/0235848 A1 | 8/2017 | Van Dusen et al. |
| 2017/0263029 A1 | 9/2017 | Yan et al. |
| 2017/0286752 A1 | 10/2017 | Gusarov et al. |
| 2017/0287006 A1 | 10/2017 | Azmoodeh et al. |
| 2017/0293673 A1 | 10/2017 | Purumala et al. |
| 2017/0295250 A1 | 10/2017 | Samaranayake et al. |
| 2017/0297201 A1 | 10/2017 | Shionozaki et al. |
| 2017/0310934 A1 | 10/2017 | Du et al. |
| 2017/0312634 A1 | 11/2017 | Ledoux et al. |
| 2017/0324688 A1 | 11/2017 | Collet et al. |
| 2017/0336960 A1 | 11/2017 | Chaudhri et al. |
| 2017/0339006 A1 | 11/2017 | Austin et al. |
| 2017/0352179 A1 | 12/2017 | Hardee et al. |
| 2017/0353477 A1 | 12/2017 | Faigon et al. |
| 2017/0371883 A1 | 12/2017 | Bailiang et al. |
| 2017/0374003 A1 | 12/2017 | Allen et al. |
| 2017/0374508 A1 | 12/2017 | Davis et al. |
| 2018/0005420 A1 | 1/2018 | Bondich et al. |
| 2018/0024726 A1 | 1/2018 | Hviding |
| 2018/0025367 A1 | 1/2018 | Jain |
| 2018/0032212 A1 | 2/2018 | Choi et al. |
| 2018/0047200 A1 | 2/2018 | O'Hara et al. |
| 2018/0060363 A1 | 3/2018 | Ko et al. |
| 2018/0068019 A1 | 3/2018 | Novikoff et al. |
| 2018/0069817 A1* | 3/2018 | Constantinides ..... H04L 67/306 |
| 2018/0088777 A1 | 3/2018 | Daze et al. |
| 2018/0091732 A1 | 3/2018 | Wilson et al. |
| 2018/0097762 A1 | 4/2018 | Garcia et al. |
| 2018/0113587 A1 | 4/2018 | Allen et al. |
| 2018/0115503 A1 | 4/2018 | Baldwin et al. |
| 2018/0129962 A1 | 5/2018 | Mathew et al. |
| 2018/0205681 A1 | 7/2018 | Gong et al. |
| 2018/0308023 A1 | 10/2018 | Bansal et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0335311 A1 | 11/2018 | Van Os et al. |
| 2019/0001223 A1 | 1/2019 | Blackstock et al. |
| 2019/0057616 A1 | 2/2019 | Cohen et al. |
| 2019/0114554 A1 | 4/2019 | Chen et al. |
| 2019/0188920 A1 | 6/2019 | Mcphee et al. |
| 2019/0220932 A1 | 7/2019 | Amitay et al. |
| 2020/0117339 A1 | 4/2020 | Amitay et al. |
| 2020/0117340 A1 | 4/2020 | Amitay et al. |
| 2020/0120097 A1 | 4/2020 | Amitay et al. |
| 2020/0120170 A1 | 4/2020 | Amitay et al. |
| 2020/0160571 A1 | 5/2020 | Burrows et al. |
| 2020/0404464 A1 | 12/2020 | Constantinides |
| 2021/0243548 A1 | 8/2021 | Brody et al. |
| 2021/0266277 A1 | 8/2021 | Allen et al. |
| 2021/0286840 A1 | 9/2021 | Amitay et al. |
| 2021/0357104 A1 | 11/2021 | Amitay et al. |
| 2023/0021727 A1 | 1/2023 | Amitay et al. |
| 2023/0033214 A1 | 2/2023 | Brody et al. |
| 2023/0051468 A1 | 2/2023 | Amitay et al. |
| 2023/0067248 A1 | 3/2023 | Amitay et al. |
| 2023/0113334 A1 | 4/2023 | Amitay et al. |
| 2023/0280879 A1 | 9/2023 | Amitay et al. |
| 2024/0095264 A1 | 3/2024 | Amitay et al. |
| 2024/0281114 A1 | 8/2024 | Amitay et al. |
| 2024/0302936 A1 | 9/2024 | Amitay et al. |
| 2024/0314515 A1 | 9/2024 | Brody et al. |

FOREIGN PATENT DOCUMENTS

| | | |
|---|---|---|
| CN | 101127109 A | 2/2008 |
| CN | 101363743 | 2/2009 |
| CN | 102037716 | 4/2011 |
| CN | 102450031 | 5/2012 |

(56) References Cited

FOREIGN PATENT DOCUMENTS

| | | |
|---|---|---|
| CN | 102461218 | 5/2012 |
| CN | 102664819 A | 9/2012 |
| CN | 103081491 | 5/2013 |
| CN | 103116853 A | 5/2013 |
| CN | 103124894 A | 5/2013 |
| CN | 103154994 | 6/2013 |
| CN | 104054077 A | 9/2014 |
| CN | 104137128 | 11/2014 |
| CN | 104205854 | 12/2014 |
| CN | 104508426 | 4/2015 |
| CN | 104616540 A | 5/2015 |
| CN | 104854615 | 8/2015 |
| CN | 105075282 | 11/2015 |
| CN | 105554311 A | 5/2016 |
| CN | 105893579 A | 8/2016 |
| CN | 105897565 | 8/2016 |
| CN | 106066990 A | 11/2016 |
| CN | 106157155 A | 11/2016 |
| CN | 106530008 A | 3/2017 |
| CN | 107210948 A | 9/2017 |
| CN | 108885795 A | 11/2018 |
| CN | 109863532 A | 6/2019 |
| CN | 110168478 A | 8/2019 |
| CN | 110799937 A | 2/2020 |
| CN | 110800018 A | 2/2020 |
| CN | 110832538 A | 2/2020 |
| CN | 110945555 A | 3/2020 |
| CN | 111010882 A | 4/2020 |
| CN | 111343075 A | 6/2020 |
| CN | 111489264 A | 8/2020 |
| CN | 111343075 | 9/2022 |
| CN | 111010882 | 11/2023 |
| CN | 117520684 | 2/2024 |
| CN | 110799937 | 5/2024 |
| CN | 111489264 | 5/2024 |
| CN | 118445437 | 8/2024 |
| CN | 110832538 | 10/2024 |
| EP | 2051480 A1 | 4/2009 |
| EP | 2151797 A1 | 2/2010 |
| EP | 2184092 A2 | 5/2010 |
| EP | 3616079 | 7/2024 |
| GB | 2399928 A | 9/2004 |
| JP | 2001230801 A | 8/2001 |
| JP | 2010288024 | 12/2010 |
| JP | 2011158385 | 8/2011 |
| JP | 2014006881 A | 1/2014 |
| JP | 5497931 B2 | 3/2014 |
| JP | 2014191414 A | 10/2014 |
| KR | 19990073076 A | 10/1999 |
| KR | 20010078417 A | 8/2001 |
| KR | 20040063436 A | 7/2004 |
| KR | 1020050036963 A | 4/2005 |
| KR | 20060124865 A | 12/2006 |
| KR | 20110014224 A | 2/2011 |
| KR | 20110054492 A | 5/2011 |
| KR | 101060961 B1 | 8/2011 |
| KR | 101134883 B1 | 4/2012 |
| KR | 1020120070898 A | 7/2012 |
| KR | 20130075380 A | 7/2013 |
| KR | 20130089819 | 8/2013 |
| KR | 20130111868 A | 10/2013 |
| KR | 201301112040 A | 10/2013 |
| KR | 20140015725 A | 2/2014 |
| KR | 20140095525 A | 8/2014 |
| KR | 101445263 B1 | 9/2014 |
| KR | 20150082440 | 7/2015 |
| KR | 101548880 B1 | 9/2015 |
| KR | 20150132487 | 11/2015 |
| KR | 20160001847 A | 1/2016 |
| KR | 20160018954 A | 2/2016 |
| KR | 101604654 B1 | 3/2016 |
| KR | 20160028636 A | 3/2016 |
| KR | 20160051536 A | 5/2016 |
| KR | 20160082915 A | 7/2016 |
| KR | 20160087222 A | 7/2016 |
| KR | 20160103398 A | 9/2016 |
| KR | 101664941 B1 | 10/2016 |
| KR | 20160140700 A | 12/2016 |
| KR | 101698031 B1 | 1/2017 |
| KR | 101721114 B1 | 3/2017 |
| KR | 20170025454 A | 3/2017 |
| KR | 20170035657 A | 3/2017 |
| KR | 20170037655 | 4/2017 |
| KR | 102434361 | 8/2022 |
| KR | 102449545 | 10/2022 |
| KR | 102455041 | 10/2022 |
| KR | 102486490 | 1/2023 |
| KR | 102515132 | 3/2023 |
| KR | 102623290 | 1/2024 |
| KR | 102664838 | 5/2024 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2003094072 A1 | 11/2003 |
| WO | 2004079530 | 9/2004 |
| WO | WO-2004095308 A1 | 11/2004 |
| WO | WO-2006107182 A1 | 10/2006 |
| WO | WO-2006118755 A2 | 11/2006 |
| WO | WO-2007092668 A2 | 8/2007 |
| WO | WO-2007134402 A1 | 11/2007 |
| WO | WO-2009043020 A2 | 4/2009 |
| WO | WO-2011040821 A1 | 4/2011 |
| WO | WO-2011119407 A1 | 9/2011 |
| WO | WO-2012000107 A1 | 1/2012 |
| WO | WO-2012139276 A1 | 10/2012 |
| WO | WO-2013008238 A1 | 1/2013 |
| WO | WO-2013008251 A2 | 1/2013 |
| WO | WO-2013027893 A1 | 2/2013 |
| WO | WO-2013045753 A1 | 4/2013 |
| WO | WO-2013152454 A1 | 10/2013 |
| WO | WO-2013166588 A1 | 11/2013 |
| WO | WO-2014006129 A1 | 1/2014 |
| WO | WO-2014031899 A1 | 2/2014 |
| WO | WO-2014068573 A1 | 5/2014 |
| WO | WO-2014115136 A1 | 7/2014 |
| WO | WO-2014194262 A2 | 12/2014 |
| WO | WO-2014194439 A1 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016090605 A1 | 6/2016 |
| WO | WO-2016100318 A2 | 6/2016 |
| WO | WO-2016100318 A3 | 6/2016 |
| WO | WO-2016100342 A1 | 6/2016 |
| WO | WO-2016/112299 A1 | 7/2016 |
| WO | WO-2016149594 A1 | 9/2016 |
| WO | WO-2016179166 A1 | 11/2016 |
| WO | WO-2016179235 A1 | 11/2016 |
| WO | 2017034309 | 3/2017 |
| WO | WO-2017173319 A1 | 10/2017 |
| WO | WO-2017176739 A1 | 10/2017 |
| WO | WO-2017176992 A1 | 10/2017 |
| WO | WO-2018005644 A1 | 1/2018 |
| WO | WO-2018006053 A1 | 1/2018 |
| WO | WO-2018081013 A1 | 5/2018 |
| WO | WO-2018102562 A1 | 6/2018 |
| WO | WO-2018129531 A1 | 7/2018 |
| WO | WO-2018200042 A1 | 11/2018 |
| WO | WO-2018200043 A1 | 11/2018 |
| WO | WO-2018201102 A1 | 11/2018 |
| WO | WO-2018201104 A1 | 11/2018 |
| WO | WO-2018201106 A1 | 11/2018 |
| WO | WO-2018201107 A1 | 11/2018 |
| WO | WO-2018201108 A1 | 11/2018 |
| WO | WO-2018201109 A1 | 11/2018 |
| WO | WO-2019089613 A1 | 5/2019 |

(56) References Cited

OTHER PUBLICATIONS

CUNY website, "What is interpolation?," dated May 8, 2016 by waybackmachine.org, downloaded from http://www.geography.hunter.cuny.edu/~jochen/gtech361/lectures/lecture11/concepts/What%20is%20interpolation.htm (Year: 2016).*

U.S. Appl. No. 17/879,607, filed Aug. 2, 2022, Map-Based Graphical User Interface Indicating Geospatial Activity Metrics.

U.S. Appl. No. 17/946,337, filed Sep. 16, 2022, Location Privacy Management on Map-Based Social Media Platforms.

U.S. Appl. No. 17/818,896, filed Aug. 10, 2022, Selective Location-Based Identity Communication.

"U.S. Appl. No. 15/369,499, Examiner Interview Summary mailed Oct. 9, 2020", 2 pgs.

"U.S. Appl. No. 16/115,259, Response filed Oct. 22, 2020 to Final Office Action mailed Jul. 22, 2020", 10 pgs.

"U.S. Appl. No. 15/369,499, Notice of Allowance mailed Oct. 26, 2020", 17 pgs.

"U.S. Appl. No. 16/115,259, Non Final Office Action mailed Jan. 11, 2021", 17 pgs.

"U.S. Appl. No. 15/369,499, Corrected Notice of Allowability mailed Jan. 28, 2021", 3 pgs.

"U.S. Appl. No. 16/115,259, Response filed May 11, 2021 to Non Final Office Action mailed Jan. 11, 2021", 14 pgs.

"U.S. Appl. No. 16/115,259, Final Office Action mailed Jul. 13, 2021", 18 pgs.

"U.S. Appl. No. 16/115,259, Response filed Oct. 13, 2021 to Final Office Action mailed Jul. 13, 2021", 10 pgs.

"U.S. Appl. No. 16/115,259, Non Final Office Action mailed Nov. 8, 2021", 17 pgs.

"U.S. Appl. No. 17/314,963, Non Final Office Action mailed Feb. 2, 2022", 24 pgs.

"U.S. Appl. No. 16/115,259, Response filed Feb. 8, 2022 to Non Final Office Action mailed Nov. 8, 2021", 9 pgs.

"U.S. Appl. No. 16/115,259, Final Office Action mailed Apr. 4, 2022", 18 pgs.

"U.S. Appl. No. 17/314,963, Response filed May 2, 2022 to Non Final Office Action mailed Feb. 2, 2022", 10 pgs.

"U.S. Appl. No. 17/249,201, Non Final Office Action mailed May 26, 2022", 5 pgs.

"U.S. Appl. No. 17/249,201, Response filed May 27, 2022 to Non Final Office Action mailed May 26, 2022", 10 pgs.

"U.S. Appl. No. 15/965,775, Corrected Notice of Allowability mailed Jun. 1, 2022", 3 pgs.

"U.S. Appl. No. 17/249,201, Notice of Allowance mailed Jun. 9, 2022", 7 pgs.

"U.S. Appl. No. 15/628,408, Final Office Action mailed Jun. 10, 2022", 33 pgs.

"U.S. Appl. No. 15/965,775, Corrected Notice of Allowability mailed Jun. 15, 2022", 2 pgs.

"U.S. Appl. No. 15/965,466, Response filed Jun. 15, 2022 to Non Final Office Action mailed Dec. 15, 2021", 13 pgs.

"U.S. Appl. No. 15/965,749, Corrected Notice of Allowability mailed Jun. 16, 2022", 2 pgs.

"U.S. Appl. No. 15/965,811, Notice of Allowability mailed Jun. 17, 2022", 2 pgs.

"U.S. Appl. No. 16/232,824, Final Office Action mailed Jun. 23, 2022", 26 pgs.

"U.S. Appl. No. 17/249,201, Corrected Notice of Allowability mailed Jun. 24, 2022", 2 pgs.

"U.S. Appl. No. 15/965,764, Corrected Notice of Allowability mailed Jun. 28, 2022", 2 pgs.

"Korean Application Serial No. 10-2019-7035443, Response filed May 6, 2022 to Office Action mailed Apr. 12, 2022", w English Claims, 17 pgs.

"Chinese Application Serial No. 202010079763.5, Response filed Jun. 1, 2022 to Office Action mailed Apr. 12, 2022", w English Claims, 12 pgs.

"U.S. Appl. No. 15/965,744, Response filed Jul. 5, 2022 to Non Final Office Action mailed Mar. 4, 2022", 13 pgs.

"Korean Application Serial No. 10-2019-7034751, Response filed Jun. 7, 2022 to Office Action mailed Mar. 7, 2022", w English Claims, 27 pgs.

"Korean Application Serial No. 10-2019-7034715, Response filed Jun. 7, 2022 to Office Action mailed Mar. 7, 2022", w English Claims, 18 pgs.

"Korean Application Serial No. 10-2019-7034715, Response filed Nov. 22, 2021 to Office Action mailed May 21, 2021", w English Claims, 22 pgs.

"Korean Application Serial No. 10-2019-7034751, Response filed Nov. 22, 2021 to Office Action mailed May 21, 2021", w English Claims, 28 pgs.

"Korean Application Serial No. 10-2019-7034596, Response filed Nov. 18, 2021 to Office Action mailed May 18, 2021", w English Claims, 23 pgs.

"U.S. Appl. No. 15/965,811, PTO Response to Rule 312 Communication mailed Jul. 12, 2022", 2 pgs.

"U.S. Appl. No. 17/248,841, Notice of Allowability mailed Jul. 18, 2022", 2 pgs.

"European Application Serial No. 22165083.1, Extended European Search Report mailed Jul. 12, 2022", 7 pgs.

"Tiled web map—Wikipedia", URL:https: en.wikipedia.org w index.php?title=Tiled_web_mapandoldid=758691778, (Jan. 6, 2017), 1-3.

"U.S. Appl. No. 16/365,300, Response filed Jul. 25, 2022 to Final Office Action mailed Mar. 25, 2022", 13 pgs.

"U.S. Appl. No. 15/628,408, Examiner Interview Summary mailed Jul. 27, 2022", 2 pgs.

"U.S. Appl. No. 16/365,300, Examiner Interview Summary mailed Jul. 29, 2022", 2 pgs.

"U.S. Appl. No. 15/965,756, Response filed Aug. 1, 2022 to Non Final Office Action mailed Mar. 31, 2022", 12 pgs.

"U.S. Appl. No. 15/628,408, Response filed Aug. 10, 2022 to Final Office Action mailed Jun. 10, 2022", 14 pgs.

"U.S. Appl. No. 15/965,764, PTO Response to Rule 312 Communication mailed Aug. 16, 2022", 2 pgs.

"U.S. Appl. No. 16/365,300, Non Final Office Action mailed Aug. 18, 2022", 31 pgs.

"U.S. Appl. No. 15/965,466, Notice of Allowance mailed Sep. 2, 2022", 10 pgs.

"European Application Serial No. 22173072.4, Extended European Search Report mailed Aug. 26, 2022", 6 pgs.

"U.S. Appl. No. 17/249,201, Corrected Notice of Allowability mailed Sep. 22, 2022", 2 pgs.

"Korean Application Serial No. 10-2019-7034715, Office Action mailed Jun. 27, 2022", w English Translation, 7 pgs.

"Korean Application Serial No. 10-2019-7034596, Response filed Sep. 7, 2022 to Office Action filed Mar. 7, 2022", w English Claims, 32 pgs.

"U.S. Appl. No. 17/131,598, Non Final Office Action mailed Sep. 27, 2022", 27 pgs.

"U.S. Appl. No. 17/879,607, Preliminary Amendment filed Oct. 19, 2022", 9 pgs.

"U.S. Appl. No. 15/965,744, Final Office Action mailed Oct. 21, 2022", 31 pgs.

"U.S. Appl. No. 17/818,896, Preliminary Amendment filed Oct. 24, 2022", 6 pgs.

"U.S. Appl. No. 15/965,466, Corrected Notice of Allowability mailed Oct. 26, 2022", 3 pgs.

"U.S. Appl. No. 17/946,337, Preliminary Amendment Filed Oct. 31, 2022", 7 pgs.

"U.S. Appl. No. 18/047,213, Preliminary Amendment filed Oct. 31, 2022", 8 pgs.

"U.S. Appl. No. 17/805,127, Preliminary Amendment Filed Nov. 8, 2022", 10 pgs.

"European Application Serial No. 18791363.7, Response filed Aug. 5, 2022 to Summons to attend oral proceedings mailed Apr. 4, 2022", 10 pgs.

"U.S. Appl. No. 15/965,756, Non Final Office Action mailed Nov. 14, 2022", 16 pgs.

"U.S. Appl. No. 16/232,824, Response filed Nov. 22, 2022 to Final Office Action mailed Jun. 23, 2022", 12 pgs.

"U.S. Appl. No. 15/965,466, 312 Amendment filed Dec. 2, 2022", 11 pgs.

(56) References Cited

OTHER PUBLICATIONS

"U.S. Appl. No. 15/965,466, PTO Response to Rule 312 Communication mailed Dec. 14, 2022", 12 pgs.
"U.S. Appl. No. 15/965,466, Corrected Notice of Allowability mailed Dec. 14, 2022", 3 pgs.
"U.S. Appl. No. 16/365,300, Response filed Dec. 19, 2022 to Non Final Office Action mailed Aug. 18, 2022", 11 pgs.
"U.S. Appl. No. 15/628,408, Non Final Office Action mailed Dec. 27, 2022", 36 pgs.
"U.S. Appl. No. 16/365,300, Final Office Action mailed Dec. 30, 2022", 31 pgs.
"A Whole New Story", Snap, Inc., [Online] Retrieved from the Internet: <URL: https://www.snap.com/en-US/news/>, (2017), 13 pgs.
"Adding photos to your listing", eBay, [Online] Retrieved from the Internet: <URL: http://pages.ebay.com/help/sell/pictures.html>, (accessed May 24, 2017), 4 pgs.
"U.S. Appl. No. 12/471,811, Advisory Action mailed Mar. 28, 2012", 6 pgs.
"U.S. Appl. No. 12/471,811, Examiner Interview Summary mailed Feb. 2, 2012", 3 pgs.
"U.S. Appl. No. 12/471,811, Examiner Interview Summary mailed Apr. 18, 2011", 3 pgs.
"U.S. Appl. No. 12/471,811, Examiner Interview Summary mailed May 27, 2014", 2 pgs.
"U.S. Appl. No. 12/471,811, Final Office Action mailed Dec. 23, 2011", 20 pgs.
"U.S. Appl. No. 12/471,811, Non Final Office Action mailed Jan. 13, 2011", 15 pgs.
"U.S. Appl. No. 12/471,811, Non Final Office Action mailed Jun. 28, 2011", 26 pgs.
"U.S. Appl. No. 12/471,811, Non Final Office Action mailed Oct. 24, 2014", 21 pgs.
"U.S. Appl. No. 12/471,811, Notice of Allowance mailed Apr. 1, 2015", 6 pgs.
"U.S. Appl. No. 12/471,811, Response filed Jan. 26, 2015 to Non Final Office Action mailed Oct. 24, 2014", 18 pgs.
"U.S. Appl. No. 12/471,811, Response filed Feb. 23, 2012 to Final Office Action mailed Dec. 23, 2011", 12 pgs.
"U.S. Appl. No. 12/471,811, Response filed Mar. 28, 2012 to Advisory Action mailed Mar. 28, 2012", 14 pgs.
"U.S. Appl. No. 12/471,811, Response filed Apr. 13, 2011 to Non Final Office Action mailed Jan. 13, 2011", 5 pgs.
"U.S. Appl. No. 12/471,811, Response filed Sep. 28, 2011 to Non Final Office Action mailed Jun. 28, 2011", 19 pgs.
"U.S. Appl. No. 13/979,974, Corrected Notice of Allowability mailed Nov. 19, 2018", 2 pgs.
"U.S. Appl. No. 13/979,974, Examiner Interview Summary mailed Jun. 29, 2017", 3 pgs.
"U.S. Appl. No. 13/979,974, Examiner Interview Summary mailed Sep. 15, 2017", 3 pgs.
"U.S. Appl. No. 13/979,974, Final Office Action mailed Apr. 25, 2018", 18 pgs.
"U.S. Appl. No. 13/979,974, Final Office Action mailed Jun. 9, 2017", 20 pgs.
"U.S. Appl. No. 13/979,974, Final Office Action mailed Oct. 12, 2016", 13 pgs.
"U.S. Appl. No. 13/979,974, Non Final Office Action mailed Feb. 22, 2017", 17 pgs.
"U.S. Appl. No. 13/979,974, Non Final Office Action mailed Apr. 27, 2016", 16 pgs.
"U.S. Appl. No. 13/979,974, Non Final Office Action mailed Oct. 3, 2017", 17 pgs.
"U.S. Appl. No. 13/979,974, Notice of Allowance mailed Aug. 10, 2018", 9 pgs.
"U.S. Appl. No. 13/979,974, Response filed Jan. 3, 2018 to Non Final Office Action mailed Oct. 3, 2017", 8 pgs.
"U.S. Appl. No. 13/979,974, Response filed May 22, 2017 to Non Final Office Action mailed Feb. 22, 2017", 10 pgs.
"U.S. Appl. No. 13/979,974, Response filed Jul. 25, 2018 to Final Office Action mailed Apr. 25, 2018", 10 pgs.
"U.S. Appl. No. 13/979,974, Response filed Jul. 26, 2016 to Non Final Office Action mailed Apr. 27, 2016", 8 pgs.
"U.S. Appl. No. 13/979,974, Response filed Sep. 11, 2017 to Final Office Action mailed Jun. 9, 2017", 8 pgs.
"U.S. Appl. No. 13/979,974, Response filed Jan. 12, 2017 to Non Final Office Action mailed Apr. 27, 2016", 8 pgs.
"U.S. Appl. No. 14/753,200, Non Final Office Action mailed Oct. 11, 2016", 6 pgs.
"U.S. Appl. No. 14/753,200, Notice of Allowance mailed Apr. 27, 2017", 7 pgs.
"U.S. Appl. No. 14/753,200, Response filed Feb. 13, 2017 to Non Final Office Action mailed Oct. 11, 2016", 9 pgs.
"U.S. Appl. No. 15/086,749, Final Office Action mailed Oct. 31, 2017", 15 pgs.
"U.S. Appl. No. 15/086,749, Final Office Action mailed Dec. 31, 2018", 14 pgs.
"U.S. Appl. No. 15/086,749, Non Final Office Action mailed Mar. 13, 2017", 12 pgs.
"U.S. Appl. No. 15/086,749, Non Final Office Action mailed Apr. 30, 2018", 14 pgs.
"U.S. Appl. No. 15/086,749, Notice of Allowance mailed Feb. 26, 2019", 7 pgs.
"U.S. Appl. No. 15/086,749, Response filed Feb. 11, 2019 to Final Office Action mailed Dec. 31, 2018", 10 pgs.
"U.S. Appl. No. 15/086,749, Response filed Apr. 2, 2018 to Final Office Action mailed Oct. 31, 2017", 14 pgs.
"U.S. Appl. No. 15/086,749, Response filed Aug. 29, 2018 to Non Final Office Action mailed Apr. 30, 2018", 12 pgs.
"U.S. Appl. No. 15/199,472, Final Office Action mailed Mar. 1, 2018", 31 pgs.
"U.S. Appl. No. 15/199,472, Final Office Action mailed Nov. 15, 2018", 37 pgs.
"U.S. Appl. No. 15/199,472, Non Final Office Action mailed Jul. 25, 2017", 30 pgs.
"U.S. Appl. No. 15/199,472, Non Final Office Action mailed Sep. 21, 2018", 33 pgs.
"U.S. Appl. No. 15/199,472, Notice of Allowance mailed Mar. 18, 2019", 23 pgs.
"U.S. Appl. No. 15/199,472, Response filed Jan. 15, 2019 to Final Office Action mailed Nov. 15, 2018", 14 pgs.
"U.S. Appl. No. 15/199,472, Response filed Jan. 25, 2018 to Non Final Office Action mailed Jul. 25, 2017", 13 pgs.
"U.S. Appl. No. 15/199,472, Response filed Aug. 31, 2018 to Final Office Action mailed Mar. 1, 2018", 14 pgs.
"U.S. Appl. No. 15/199,472, Response filed Oct. 17, 2018 to Non Final Office Action mailed Sep. 31, 2018", 11 pgs.
"U.S. Appl. No. 15/365,046, Non Final Office Action mailed Dec. 20, 2018", 36 pgs.
"U.S. Appl. No. 15/365,046, Response filed Mar. 20, 2019 to Non Final Office Action mailed Dec. 20, 2018", 20 pgs.
"U.S. Appl. No. 15/369,499, Examiner Interview Summary mailed Sep. 21, 2020", 3 pgs.
"U.S. Appl. No. 15/369,499, Final Office Action mailed Jan. 31, 2019", 22 pgs.
"U.S. Appl. No. 15/369,499, Final Office Action mailed Jun. 15, 2020", 17 pgs.
"U.S. Appl. No. 15/369,499, Final Office Action mailed Oct. 1, 2019", 17 pgs.
"U.S. Appl. No. 15/369,499, Non Final Office Action mailed Mar. 2, 2020", 17 pgs.
"U.S. Appl. No. 15/369,499, Non Final Office Action mailed Jun. 17, 2019", 17 pgs.
"U.S. Appl. No. 15/369,499, Non Final Office Action mailed Aug. 15, 2018", 22 pgs.
"U.S. Appl. No. 15/369,499, Response filed Feb. 3, 2020 to Final Office Action mailed Oct. 1, 2019", 10 pgs.
"U.S. Appl. No. 15/369,499, Response filed Mar. 14, 2019 to Final Office Action mailed Jan. 31, 2019", 12 pgs.
"U.S. Appl. No. 15/369,499, Response filed Jun. 2, 2020 to Non Final Office Action mailed Mar. 2, 2020", 9 pgs.

(56) References Cited

OTHER PUBLICATIONS

"U.S. Appl. No. 15/369,499, Response filed Sep. 15, 2020 to Final Office Action mailed Jun. 15, 2020", 10 pgs.
"U.S. Appl. No. 15/369,499, Response filed Nov. 15, 2018 to Non Final Office Action mailed Aug. 15, 2018", 10 pgs.
"U.S. Appl. No. 15/369,499, Response filed Sep. 10, 2019 to Non-Final Office Action mailed Jun. 17, 2019", 9 pgs.
"U.S. Appl. No. 15/583,142, Jan. 28, 2019 to Response Filed Non Final Office Action mailed Oct. 25, 2018", 19 pgs.
"U.S. Appl. No. 15/583,142, Final Office Action mailed Mar. 22, 2019", 11 pgs.
"U.S. Appl. No. 15/583,142, Non Final Office Action mailed Oct. 25, 2018", 14 pgs.
"U.S. Appl. No. 15/628,408, Corrected Notice of Allowability mailed Jul. 21, 2021", 7 pgs.
"U.S. Appl. No. 15/628,408, Final Office Action mailed Apr. 13, 2020", 45 pgs.
"U.S. Appl. No. 15/628,408, Final Office Action mailed Jun. 10, 2019", 44 pgs.
"U.S. Appl. No. 15/628,408, Non Final Office Action mailed Jan. 2, 2019", 28 pgs.
"U.S. Appl. No. 15/628,408, Non Final Office Action mailed Feb. 4, 2022", 30 pgs.
"U.S. Appl. No. 15/628,408, Non Final Office Action mailed Oct. 30, 2019", 45 pgs.
"U.S. Appl. No. 15/628,408, Notice of Allowance mailed Jul. 8, 2021", 11 pgs.
"U.S. Appl. No. 15/628,408, Notice of Allowance mailed Sep. 29, 2020", 13 pgs.
"U.S. Appl. No. 15/628,408, Response filed Jan. 30, 2020 to Non Final Office Action mailed Oct. 30, 2019", 17 pgs.
"U.S. Appl. No. 15/628,408, Response filed Apr. 2, 2019 to Non Final Office Action mailed Jan. 2, 2019", 15 pgs.
"U.S. Appl. No. 15/628,408, Response filed May 4, 2022 to Non Final Office Action mailed Feb. 4, 2022", 9 pgs.
"U.S. Appl. No. 15/628,408, Response filed Jul. 13, 2020 to Final Office Action mailed Apr. 13, 2020", 20 pgs.
"U.S. Appl. No. 15/628,408, Response filed Aug. 12, 2019 to Final Office Action mailed Jun. 10, 2019", 12 pgs.
"U.S. Appl. No. 15/628,408, Supplemental Amendment filed Apr. 4, 2019 to Non Final Office Action mailed Jan. 2, 2019", 12 pgs.
"U.S. Appl. No. 15/628,408, Supplemental Notice of Allowability mailed Oct. 21, 2021", 2 pgs.
"U.S. Appl. No. 15/661,953, Examiner Interview Summary mailed Nov. 13, 2018", 3 pgs.
"U.S. Appl. No. 15/661,953, Non Final Office Action mailed Mar. 26, 2018", 6 pgs.
"U.S. Appl. No. 15/661,953, Notice of Allowance mailed Aug. 10, 2018", 7 pgs.
"U.S. Appl. No. 15/661,953, PTO Response to Rule 312 Communication mailed Oct. 30, 2018", 2 pgs.
"U.S. Appl. No. 15/661,953, PTO Response to Rule 312 Communication mailed Nov. 7, 2018", 2 pgs.
"U.S. Appl. No. 15/661,953, Response Filed Jun. 26, 2018 to Non Final Office Action mailed Mar. 26, 2018", 13 pgs.
"U.S. Appl. No. 15/859,101, Examiner Interview Summary mailed Sep. 18, 2018", 3 pgs.
"U.S. Appl. No. 15/859,101, Non Final Office Action mailed Jun. 15, 2018", 10 pgs.
"U.S. Appl. No. 15/859,101, Notice of Allowance mailed Oct. 4, 2018", 9 pgs.
"U.S. Appl. No. 15/859,101, Response filed Sep. 17, 2018 to Non Final Office Action mailed Jun. 15, 2018", 17 pgs.
"U.S. Appl. No. 15/901,387, Non Final Office Action mailed Oct. 30, 2019", 40 pgs.
"U.S. Appl. No. 15/965,361, Non Final Office Action mailed Jun. 22, 2020", 35 pgs.
"U.S. Appl. No. 15/965,466, Final Office Action mailed May 18, 2021", 18 pgs.
"U.S. Appl. No. 15/965,466, Non Final Office Action mailed Nov. 20, 2020", 17 pgs.
"U.S. Appl. No. 15/965,466, Non Final Office Action mailed Dec. 15, 2021", 15 pgs.
"U.S. Appl. No. 15/965,466, Response filed Mar. 22, 2021 to Non Final Office Action mailed Nov. 20, 2020", 13 pgs.
"U.S. Appl. No. 15/965,466, Response filed Oct. 18, 2021 to Final Office Action mailed May 18, 2021", 12 pgs.
"U.S. Appl. No. 15/965,744, Examiner Interview Summary mailed Feb. 21, 2020", 3 pgs.
"U.S. Appl. No. 15/965,744, Final Office Action mailed Feb. 6, 2020", 19 pgs.
"U.S. Appl. No. 15/965,744, Final Office Action mailed Jul. 28, 2021", 29 pgs.
"U.S. Appl. No. 15/965,744, Non Final Office Action mailed Feb. 1, 2021", 29 pgs.
"U.S. Appl. No. 15/965,744, Non Final Office Action mailed Mar. 4, 2022", 31 pgs.
"U.S. Appl. No. 15/965,744, Non Final Office Action mailed Jun. 12, 2019", 18 pgs.
"U.S. Appl. No. 15/965,744, Response filed Jun. 1, 2021 to Non Final Office Action mailed Feb. 1, 2021", 11 pgs.
"U.S. Appl. No. 15/965,744, Response filed Jun. 8, 2020 to Final Office Action mailed Feb. 6, 2020", 11 pgs.
"U.S. Appl. No. 15/965,744, Response filed Nov. 12, 2019 to Non Final Office Action mailed Jun. 12, 2019", 10 pgs.
"U.S. Appl. No. 15/965,744, Response filed Nov. 29, 2021 to Final Office Action mailed Jul. 28, 2021", 13 pgs.
"U.S. Appl. No. 15/965,749, Examiner Interview Summary mailed Jul. 29, 2020", 3 pgs.
"U.S. Appl. No. 15/965,749, Final Office Action mailed Jun. 11, 2020", 12 pgs.
"U.S. Appl. No. 15/965,749, Non Final Office Action mailed Jan. 27, 2020", 9 pgs.
"U.S. Appl. No. 15/965,749, Non Final Office Action mailed Jul. 9, 2021", 14 pgs.
"U.S. Appl. No. 15/965,749, Non Final Office Action mailed Jul. 10, 2019", 8 pgs.
"U.S. Appl. No. 15/965,749, Non Final Office Action mailed Nov. 30, 2020", 13 pgs.
"U.S. Appl. No. 15/965,749, Notice of Allowance mailed Feb. 2, 2022", 25 pgs.
"U.S. Appl. No. 15/965,749, Response filed Feb. 28, 2020 to Non Final Office Action mailed Jan. 27, 2020", 12 pgs.
"U.S. Appl. No. 15/965,749, Response filed Mar. 30, 2021 to Non Final Office Action mailed Nov. 30, 2020", 13 pgs.
"U.S. Appl. No. 15/965,749, Response filed Oct. 10, 2019 to Non-Final Office Action mailed Jul. 10, 2019", 11 pgs.
"U.S. Appl. No. 15/965,749, Response filed Oct. 12, 2020 to Final Office Action mailed Jun. 11, 2020", 14 pgs.
"U.S. Appl. No. 15/965,749, Response filed Nov. 9, 2021 to Non Final Office Action mailed Jul. 9, 2021", 14 pgs.
"U.S. Appl. No. 15/965,749, Supplemental Notice of Allowability mailed Apr. 7, 2022", 3 pgs.
"U.S. Appl. No. 15/965,749, Supplemental Notice of Allowability mailed May 5, 2022", 3 pgs.
"U.S. Appl. No. 15/965,754, Corrected Notice of Allowability mailed Jan. 6, 2021", 2 pgs.
"U.S. Appl. No. 15/965,754, Corrected Notice of Allowability mailed Mar. 1, 2021", 2 pgs.
"U.S. Appl. No. 15/965,754, Final Office Action mailed Jul. 17, 2020", 14 pgs.
"U.S. Appl. No. 15/965,754, Non Final Office Action mailed Mar. 30, 2020", 13 pgs.
"U.S. Appl. No. 15/965,754, Notice of Allowance mailed Nov. 16, 2020", 7 pgs.
"U.S. Appl. No. 15/965,754, Response filed Jun. 30, 2020 to Non Final Office Action mailed Mar. 30, 2020", 12 pgs.
"U.S. Appl. No. 15/965,754, Response filed Oct. 19, 2020 to Final Office Action mailed Jul. 17, 2020", 14 pgs.
"U.S. Appl. No. 15/965,754, Supplemental Notice of Allowability mailed Dec. 16, 2020", 2 pgs.

(56) References Cited

OTHER PUBLICATIONS

"U.S. Appl. No. 15/965,756, Final Office Action mailed Aug. 19, 2021", 17 pgs.
"U.S. Appl. No. 15/965,756, Non Final Office Action mailed Jan. 13, 2021", 16 pgs.
"U.S. Appl. No. 15/965,756, Non Final Office Action mailed Mar. 31, 2022", 17 pgs.
"U.S. Appl. No. 15/965,756, Non Final Office Action mailed Jun. 24, 2020", 16 pgs.
"U.S. Appl. No. 15/965,756, Response filed May 13, 2021 to Non Final Office Action mailed Jan. 13, 2021", 12 pgs.
"U.S. Appl. No. 15/965,756, Response filed Sep. 24, 2020 to Non Final Office Action mailed Jun. 24, 2020", 11 pgs.
"U.S. Appl. No. 15/965,756, Response filed Dec. 20, 2021 to Final Office Action mailed Aug. 19, 2021", 13 pgs.
"U.S. Appl. No. 15/965,764, Corrected Notice of Allowability mailed Mar. 30, 2022", 1 pg.
"U.S. Appl. No. 15/965,764, Corrected Notice of Allowability mailed Apr. 20, 2022", 2 pgs.
"U.S. Appl. No. 15/965,764, Examiner Interview Summary mailed Aug. 6, 2020", 3 pgs.
"U.S. Appl. No. 15/965,764, Final Office Action mailed May 14, 2020", 18 pgs.
"U.S. Appl. No. 15/965,764, Final Office Action mailed Jun. 15, 2021", 19 pgs.
"U.S. Appl. No. 15/965,764, Non Final Office Action mailed Jan. 2, 2020", 18 pgs.
"U.S. Appl. No. 15/965,764, Non Final Office Action mailed Feb. 22, 2021", 18 pgs.
"U.S. Appl. No. 15/965,764, Notice of Allowance mailed Mar. 9, 2022", 8 pgs.
"U.S. Appl. No. 15/965,764, Response filed Apr. 2, 2020 to Non Final Office Action mailed Jan. 2, 2020", 11 pgs.
"U.S. Appl. No. 15/965,764, Response filed May 24, 2021 to Non Final Office Action mailed Feb. 22, 2021", 13 pgs.
"U.S. Appl. No. 15/965,764, Response filed Oct. 14, 2020 to Final Office Action mailed May 14, 2020", 11 pgs.
"U.S. Appl. No. 15/965,764, Response filed Nov. 15, 2021 to Final Office Action mailed Jun. 15, 2021", 12 pgs.
"U.S. Appl. No. 15/965,775, Corrected Notice of Allowability mailed Apr. 7, 2022", 3 pgs.
"U.S. Appl. No. 15/965,775, Final Office Action mailed Jan. 30, 2020", 10 pgs.
"U.S. Appl. No. 15/965,775, Final Office Action mailed Jul. 6, 2021", 12 pgs.
"U.S. Appl. No. 15/965,775, Non Final Office Action mailed Jun. 19, 2020", 12 pgs.
"U.S. Appl. No. 15/965,775, Non Final Office Action mailed Jul. 29, 2019", 8 pgs.
"U.S. Appl. No. 15/965,775, Non Final Office Action mailed Oct. 16, 2020", 11 pgs.
"U.S. Appl. No. 15/965,775, Notice of Allowance mailed Feb. 22, 2022", 19 pgs.
"U.S. Appl. No. 15/965,775, Response filed Mar. 16, 2021 to Non Final Office Action mailed Oct. 16, 2020", 10 pgs.
"U.S. Appl. No. 15/965,775, Response filed Jun. 1, 2020 to Final Office Action mailed Jan. 30, 2020", 10 pgs.
"U.S. Appl. No. 15/965,775, Response filed Jul. 7, 2020 to Non Final Office Action mailed Jun. 19, 2020", 9 pgs.
"U.S. Appl. No. 15/965,775, Response filed Oct. 6, 2021 to Final Office Action mailed Jul. 6, 2021", 11 pgs.
"U.S. Appl. No. 15/965,775, Response filed Oct. 29, 2019 to Non Final Office Action mailed Jul. 29, 2019", 10 pgs.
"U.S. Appl. No. 15/965,811, Final Office Action mailed Feb. 12, 2020", 16 pgs.
"U.S. Appl. No. 15/965,811, Final Office Action mailed Apr. 14, 2021", 19 pgs.
"U.S. Appl. No. 15/965,811, Non Final Office Action mailed Jun. 26, 2020", 20 pgs.

"U.S. Appl. No. 15/965,811, Non Final Office Action mailed Aug. 8, 2019", 15 pgs.
"U.S. Appl. No. 15/965,811, Non Final Office Action mailed Oct. 4, 2021", 20 pgs.
"U.S. Appl. No. 15/965,811, Notice of Allowability mailed Mar. 25, 2022", 10 pgs.
"U.S. Appl. No. 15/965,811, Notice of Allowability mailed May 11, 2022", 2 pgs.
"U.S. Appl. No. 15/965,811, Notice of Allowance mailed Mar. 9, 2022", 9 pgs.
"U.S. Appl. No. 15/965,811, Response filed Feb. 4, 2022 to Non Final Office Action mailed Oct. 4, 2021", 14 pgs.
"U.S. Appl. No. 15/965,811, Response filed Jun. 12, 2020 to Final Office Action mailed Feb. 12, 2020", 13 pgs.
"U.S. Appl. No. 15/965,811, Response filed Sep. 14, 2021 to Final Office Action mailed Apr. 14, 2021", 14 pgs.
"U.S. Appl. No. 15/965,811, Response filed Nov. 8, 2019 to Non Final Office Action mailed Aug. 8, 2019", 14 pgs.
"U.S. Appl. No. 15/965,811, Response filed Dec. 28, 2020 to Non Final Office Action mailed Jun. 26, 2020", 13 pgs.
"U.S. Appl. No. 16/115,259, Final Office Action mailed Jul. 22, 2020", 20 pgs.
"U.S. Appl. No. 16/115,259, Final Office Action mailed Dec. 16, 2019", 23 pgs.
"U.S. Appl. No. 16/115,259, Non Final Office Action mailed Apr. 9, 2020", 18 pgs.
"U.S. Appl. No. 16/115,259, Non Final Office Action mailed Jul. 30, 2019", 21 pgs.
"U.S. Appl. No. 16/115,259, Preliminary Amendment filed Oct. 18, 2018 t", 6 pgs.
"U.S. Appl. No. 16/115,259, Response filed Mar. 13, 2020 to Final Office Action mailed Dec. 16, 2019", 9 pgs.
"U.S. Appl. No. 16/115,259, Response filed Jul. 9, 2020 to Non Final Office Action mailed Apr. 9, 2020", 8 pgs.
"U.S. Appl. No. 16/115,259, Response filed Oct. 30, 2019 to Non Final Office Action mailed Jul. 30, 2019", 9 pgs.
"U.S. Appl. No. 16/193,938, Preliminary Amendment filed Nov. 27, 2018", 7 pgs.
"U.S. Appl. No. 16/232,824, Examiner Interview Summary mailed Jul. 24, 2020", 3 pgs.
"U.S. Appl. No. 16/232,824, Final Office Action mailed Apr. 30, 2020", 19 pgs.
"U.S. Appl. No. 16/232,824, Final Office Action mailed Nov. 2, 2021", 25 pgs.
"U.S. Appl. No. 16/232,824, Non Final Office Action mailed Feb. 19, 2021", 28 pgs.
"U.S. Appl. No. 16/232,824, Non Final Office Action mailed Oct. 21, 2019", 18 pgs.
"U.S. Appl. No. 16/232,824, Response filed Feb. 21, 2020 to Non Final Office Action mailed Oct. 21, 2019", 9 pgs.
"U.S. Appl. No. 16/232,824, Response filed May 2, 2022 to Final Office Action mailed Nov. 2, 2021".
"U.S. Appl. No. 16/232,824, Response filed Jul. 15, 2020 to Final Office Action mailed Apr. 30, 2020", 11 pgs.
"U.S. Appl. No. 16/232,824, Response filed Aug. 19, 2021 to Non Final Office Action mailed Feb. 19, 2021", 12 pgs.
"U.S. Appl. No. 16/245,660, Final Office Action mailed Feb. 6, 2020", 12 pgs.
"U.S. Appl. No. 16/245,660, Non Final Office Action mailed Jun. 27, 2019", 11 pgs.
"U.S. Appl. No. 16/245,660, Notice of Allowability mailed Nov. 18, 2020", 2 pgs.
"U.S. Appl. No. 16/245,660, Notice of Allowance mailed Jul. 8, 2020", 8 pgs.
"U.S. Appl. No. 16/245,660, Notice of Allowance mailed Nov. 3, 2020", 8 pgs.
"U.S. Appl. No. 16/245,660, Response filed Jun. 8, 2020 to Final Office Action mailed Feb. 6, 2020", 16 pgs.
"U.S. Appl. No. 16/245,660, Response filed Nov. 6, 2019 to Non Final Office Action mailed Jun. 27, 2019", 11 pgs.
"U.S. Appl. No. 16/365,300, Examiner Interview Summary mailed Nov. 29, 2021", 2 pgs.

(56) References Cited

OTHER PUBLICATIONS

"U.S. Appl. No. 16/365,300, Final Office Action mailed Mar. 25, 2022", 29 pgs.
"U.S. Appl. No. 16/365,300, Final Office Action mailed Apr. 15, 2021", 31 pgs.
"U.S. Appl. No. 16/365,300, Final Office Action mailed May 13, 2020", 44 pgs.
"U.S. Appl. No. 16/365,300, Non Final Office Action mailed Aug. 3, 2021", 29 pgs.
"U.S. Appl. No. 16/365,300, Non Final Office Action mailed Sep. 28, 2020", 40 pgs.
"U.S. Appl. No. 16/365,300, Non Final Office Action mailed Oct. 30, 2019", 40 pgs.
"U.S. Appl. No. 16/365,300, Response filed Jan. 28, 2021 to Non Final Office Action mailed Sep. 28, 2020", 17 pgs.
"U.S. Appl. No. 16/365,300, Response filed Jan. 30, 2020 to Non Final Office Action mailed Oct. 30, 2019", 16 pgs.
"U.S. Appl. No. 16/365,300, Response filed Jul. 15, 2021 to Final Office Action mailed Apr. 15, 2021", 11 pgs.
"U.S. Appl. No. 16/365,300, Response filed Aug. 13, 2020 to Final Office Action mailed May 13, 2020", 16 pgs.
"U.S. Appl. No. 16/365,300, Response filed Dec. 2, 2021 to Non Final Office Action mailed Aug. 3, 2021", 10 pgs.
"U.S. Appl. No. 17/131,598, Preliminary Amendment filed Jun. 8, 2021", 10 pages.
"U.S. Appl. No. 17/248,841, Notice of Allowance mailed Apr. 7, 2022", 9 pgs.
"U.S. Appl. No. 17/248,841, Preliminary Amendment filed Apr. 22, 2021", 7 pgs.
"U.S. Appl. No. 17/249,201, Preliminary Amendment filed Oct. 6, 2021", 9 pgs.
"BlogStomp", StompSoftware, [Online] Retrieved from the Internet: <URL: http://stompsoftware.com/blogstomp>, (accessed May 24, 2017), 12 pgs.
"Chinese Application Serial No. 202010079763.5, Office Action mailed Apr. 12, 2022", W/English Translation, 14 pgs.
"Chinese Application Serial No. 202010079763.5, Office Action mailed Aug. 27, 2021", w/ English Translation, 15 pgs.
"Chinese Application Serial No. 202010079763.5, Response Filed Jan. 11, 2022 to Office Action mailed Aug. 27, 2021", w/ English Claims, 13 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"European Application Serial No. 19206595.1, Extended European Search Report mailed Mar. 31, 2020", 6 pgs.
"European Application Serial No. 17776809.0, Extended European Search Report mailed Feb. 27, 2019", 7 pgs.
"European Application Serial No. 18789872.1, Communication Pursuant to Article 94(3) EPC mailed Aug. 11, 2020", 6 pgs.
"European Application Serial No. 18789872.1, Extended European Search Report mailed Jan. 2, 2020", 8 pgs.
"European Application Serial No. 18789872.1, Response filed Feb. 18, 2021 to Communication Pursuant to Article 94(3) EPC mailed Aug. 11, 2020", 15 pgs.
"European Application Serial No. 18789872.1, Summons to Attend Oral Proceedings mailed Jun. 23, 2021", 9 pgs.
"European Application Serial No. 18789872.1, Summons to Attend Oral Proceedings mailed Sep. 13, 2021", 9 pgs.
"European Application Serial No. 18790189.7, Communication Pursuant to Article 94(3) EPC mailed Jul. 30, 2020", 9 pgs.
"European Application Serial No. 18790189.7, Extended European Search Report mailed Jan. 2, 2020", 7 pgs.
"European Application Serial No. 18790189.7, Response filed Feb. 9, 2021 to Communication Pursuant to Article 94(3) EPC mailed Jul. 30, 2020", 11 pgs.
"European Application Serial No. 18790189.7, Response Filed Jul. 14, 2020 to Extended European Search Report mailed Jan. 2, 2020", 21 pgs.
"European Application Serial No. 18790189.7, Summons to attend oral proceedings mailed Jul. 8, 2021", 13 pgs.
"European Application Serial No. 18790319.0, Communication Pursuant to Article 94(3) EPC mailed Jul. 21, 2021", 7 pgs.
"European Application Serial No. 18790319.0, Extended European Search Report mailed Feb. 12, 2020", 6 pgs.
"European Application Serial No. 18790319.0, Response Filed Jan. 28, 2022 to Communication Pursuant to Article 94(3) EPC mailed Jul. 21, 2021", 16 pgs.
"European Application Serial No. 18790319.0, Response filed Aug. 27, 2020 to Extended European Search Report mailed Feb. 12, 2020", 19 pgs.
"European Application Serial No. 18791363.7, Communication Pursuant to Article 94(3) EPC mailed Aug. 11, 2020", 9 pgs.
"European Application Serial No. 18791363.7, Extended European Search Report mailed Jan. 2, 2020", 8 pgs.
"European Application Serial No. 18791363.7, Response filed Jul. 14, 2020 to Extended European Search Report mailed Jan. 2, 2020", 31 pgs.
"European Application Serial No. 18791363.7, Summons to attend oral proceedings mailed Apr. 4, 2022", 11 pgs.
"European Application Serial No. 18791363.7, Response Filed Feb. 22, 2021 to Communication Pursuant to Article 94(3) EPC mailed Aug. 11, 2020", 35 pgs.
"European Application Serial No. 18791925.3, Communication Pursuant to Article 94(3) EPC mailed May 11, 2021", 7 pgs.
"European Application Serial No. 18791925.3, Extended European Search Report mailed Jan. 2, 2020", 6 pgs.
"European Application Serial No. 18791925.3, Response Filed Jul. 27, 2020 to Extended European Search Report mailed Jan. 2, 2020", 19 pgs.
"European Application Serial No. 19206595.1, Communication Pursuant to Article 94(3) EPC mailed Jul. 22, 2021", 7 pgs.
"European Application Serial No. 19206595.1, Response filed Jan. 28, 2022 to Communication Pursuant to Article 94(3) EPC mailed Jul. 22, 2021", 18 pgs.
"European Application Serial No. 19206595.1, Response filed Dec. 16, 2020 to Extended European Search Report mailed Mar. 31, 2020", 43 pgs.
"European Application Serial No. 19206610.8, Communication Pursuant to Article 94(3) EPC mailed Jul. 21, 2021", 8 pgs.
"European Application Serial No. 19206610.8, Extended European Search Report mailed Feb. 12, 2020", 6 pgs.
"European Application Serial No. 19206610.8, Response filed Jan. 26, 2022 to Communication Pursuant to Article 94(3) EPC mailed Jul. 21, 2021", 23 pgs.
"European Application Serial No. 19206610.8, Response filed Sep. 23, 2020 to Extended European Search Report mailed Feb. 12, 2020", 109 pgs.
"InstaPlace Photo App Tell the Whole Story", [Online] Retrieved from the Internet: <URL: youtu.be/uF_gFkg1hBM>, (Nov. 8, 2013), 113 pgs., 1:02 min.
"International Application Serial No. PCT/CA2013/000454, International Preliminary Report on Patentability mailed Nov. 20, 2014", 9 pgs.
"International Application Serial No. PCT/CA2013/000454, International Search Report mailed Aug. 20, 2013", 3 pgs.
"International Application Serial No. PCT/CA2013/000454, Written Opinion mailed Aug. 20, 2013", 7 pgs.
"International Application Serial No. PCT/US2015/037251, International Search Report mailed Sep. 29, 2015", 2 pgs.
"International Application Serial No. PCT/US2017/025460, International Preliminary Report on Patentability mailed Oct. 11, 2018", 9 pgs.
"International Application Serial No. PCT/US2017/025460, International Search Report mailed Jun. 20, 2017", 2 pgs.
"International Application Serial No. PCT/US2017/025460, Written Opinion mailed Jun. 20, 2017", 7 pgs.

(56) References Cited

OTHER PUBLICATIONS

"International Application Serial No. PCT/US2017/040447, International Preliminary Report on Patentability mailed Jan. 10, 2019", 8 pgs.
"International Application Serial No. PCT/US2017/040447, International Search Report mailed Oct. 2, 2017", 4 pgs.
"International Application Serial No. PCT/US2017/040447, Written Opinion mailed Oct. 2, 2017", 6 pgs.
"International Application Serial No. PCT/US2017/057918, International Search Report mailed Jan. 19, 2018", 3 pgs.
"International Application Serial No. PCT/US2017/057918, Written Opinion mailed Jan. 19, 2018", 7 pgs.
"International Application Serial No. PCT/US2017/063981, International Search Report mailed Mar. 22, 2018", 3 pgs.
"International Application Serial No. PCT/US2017/063981, Written Opinion mailed Mar. 22, 2018", 8 pgs.
"International Application Serial No. PCT/US2018/000112, International Preliminary Report on Patentability mailed Nov. 7, 2019", 6 pgs.
"International Application Serial No. PCT/US2018/000112, International Search Report mailed Jul. 20, 2018", 2 pgs.
"International Application Serial No. PCT/US2018/000112, Written Opinion mailed Jul. 20, 2018", 4 pgs.
"International Application Serial No. PCT/US2018/000113, International Preliminary Report on Patentability mailed Nov. 7, 2019", 6 pgs.
"International Application Serial No. PCT/US2018/000113, International Search Report mailed Jul. 13, 2018", 2 pgs.
"International Application Serial No. PCT/US2018/000113, Written Opinion mailed Jul. 13, 2018", 4 pgs.
"International Application Serial No. PCT/US2018/030039, International Preliminary Report on Patentability mailed Nov. 7, 2019", 6 pgs.
"International Application Serial No. PCT/US2018/030039, International Search Report mailed Jul. 11, 2018", 2 pgs.
"International Application Serial No. PCT/US2018/030039, Written Opinion mailed Jul. 11, 2018", 4 pgs.
"International Application Serial No. PCT/US2018/030041, International Preliminary Report on Patentability mailed Nov. 7, 2019", 5 pgs.
"International Application Serial No. PCT/US2018/030041, International Search Report mailed Jul. 11, 2018", 2 pgs.
"International Application Serial No. PCT/US2018/030041, Written Opinion mailed Jul. 11, 2018", 3 pgs.
"International Application Serial No. PCT/US2018/030043, International Preliminary Report on Patentability mailed Nov. 7, 2019", 7 pgs.
"International Application Serial No. PCT/US2018/030043, International Search Report mailed Jul. 23, 2018", 2 pgs.
"International Application Serial No. PCT/US2018/030043, Written Opinion mailed Jul. 23, 2018", 5 pgs.
"International Application Serial No. PCT/US2018/030044, International Preliminary Report on Patentability mailed Nov. 7, 2019", 8 pgs.
"International Application Serial No. PCT/US2018/030044, International Search Report mailed Jun. 26, 2018", 2 pgs.
"International Application Serial No. PCT/US2018/030044, Written Opinion mailed Jun. 26, 2018", 6 pgs.
"International Application Serial No. PCT/US2018/030045, International Preliminary Report on Patentability mailed Nov. 7, 2019", 8 pgs.
"International Application Serial No. PCT/US2018/030045, International Search Report mailed Jul. 3, 2018", 2 pgs.
"International Application Serial No. PCT/US2018/030045, Written Opinion mailed Jul. 3, 2018", 6 pgs.
"International Application Serial No. PCT/US2018/030046, International Preliminary Report on Patentability mailed Nov. 7, 2019", 8 pgs.
"International Application Serial No. PCT/US2018/030046, International Search Report mailed Jul. 6, 2018", 2 pgs.
"International Application Serial No. PCT/US2018/030046, Written Opinion mailed Jul. 6, 2018", 6 pgs.
"Introducing Google Latitude", Google UK, [Online] Retrieved from the Internet: <URL: https://www.youtube.com/watch?v=XecGMKqiA5A>, [Retrieved on: Oct. 23, 2019], (Feb. 3, 2009), 1 pg.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Korean Application Serial No. 10-2019-7034512, Notice of Preliminary Rejection mailed May 17, 2021", With English translation, 15 pgs.
"Korean Application Serial No. 10-2019-7034512, Notice of Preliminary Rejection mailed Nov. 2, 2021", w/ English translation, 8 pgs.
"Korean Application Serial No. 10-2019-7034512, Response Filed Jan. 3, 2022 to Notice of Preliminary Rejection mailed Nov. 2, 2021", w/ English Claims, 18 pgs.
"Korean Application Serial No. 10-2019-7034596, Notice of Preliminary Rejection mailed Mar. 7, 2022", w/ English translation, 21 pgs.
"Korean Application Serial No. 10-2019-7034596, Notice of Preliminary Rejection mailed May 18, 2021", With English translation, 20 pgs.
"Korean Application Serial No. 10-2019-7034598, Notice of Preliminary Rejection mailed Jan. 10, 2022", w/ English translation, 13 pgs.
"Korean Application Serial No. 10-2019-7034598, Notice of Preliminary Rejection mailed Jun. 3, 2021", With English translation, 10 pgs.
"Korean Application Serial No. 10-2019-7034598, Response filed Sep. 3, 2021 to Notice of Preliminary Rejection mailed Jun. 3, 2021", w/ English Claims, 27 pgs.
"Korean Application Serial No. 10-2019-7034598, Response Filed Mar. 10, 2022 to Notice of Preliminary Rejection mailed Jan. 10, 2022", W/ English Claims, 24 pgs.
"Korean Application Serial No. 10-2019-7034715, Final Office Action mailed Mar. 7, 2022", w/ English translation, 9 pgs.
"Korean Application Serial No. 10-2019-7034715, Notice of Preliminary Rejection mailed May 21, 2021", With English translation, 15 pgs.
"Korean Application Serial No. 10-2019-7034751, Final Office Action mailed Mar. 7, 2022", w/ English translation, 11 pgs.
"Korean Application Serial No. 10-2019-7034751, Notice of Preliminary Rejection mailed May 21, 2021", With English translation, 18 pgs.
"Korean Application Serial No. 10-2019-7034899, Final Office Action mailed Dec. 3, 2021", w/ English translation, 10 pgs.
"Korean Application Serial No. 10-2019-7034899, Notice of Preliminary Rejection mailed May 27, 2021", With English translation, 17 pgs.
"Korean Application Serial No. 10-2019-7034899, Response filed Aug. 11, 2021 to Notice of Preliminary Rejection mailed May 27, 2021", With English claims, 26 pgs.
"Korean Application Serial No. 10-2019-7035443, Notice of Preliminary Rejection mailed Apr. 11, 2022", w/ English translation, 8 pgs.
"Korean Application Serial No. 10-2019-7035443, Notice of Preliminary Rejection mailed May 26, 2021", With English translation, 14 pgs.
"Korean Application Serial No. 10-2019-7034899, Office Action mailed Jan. 24, 2022", w/ English Translation, 12 pgs.
"Korean Application Serial No. 10-2019-7034899, Response filed Jan. 5, 2022 to Office Action mailed Dec. 3, 2021", w/ English Translation of Claims, 12 pgs.
"List of IBM Patents or Patent Applications Treated as Related; {Appendix P)", IBM, (Sep. 14, 2018), 2 pgs.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

(56) References Cited

OTHER PUBLICATIONS

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RGOw>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

"The One Million Tweet Map: Using Maptimize to Visualize Tweets in a World Map | PowerPoint Presentation", fppt.com, [Online] Retrieved form the Internet: <URL: https://web.archive.org/web/20121103231906/http://www.freepower-point-templates.com/articles/the-one-million-tweet-mapusing-maptimize-to-visualize-tweets-in-a-world-map/>, (Nov. 3, 2012), 6 pgs.

Birchall, Andrew Alexander, "The delivery of notifications that user perceives,", IP.com English Translation of CN 107210948 A Filed Dec. 16, 2014, (2014), 28 pgs.

Broderick, Ryan, "Every thing You Need to Know About Japan's Amazing Photo Booths", [Online] Retrieved from the Internet: <URL: https://www.buzzfeed.com/ryanhatesthis/look-how-kawaii-i-am?utm_term=.kra5QwGNZ#.muYoVB7qJ>, (Jan. 22, 2016), 30 pgs.

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Castelluccia, Claude, et al., "EphPub: Toward robust Ephemeral Publishing", 19th IEEE International Conference on Network Protocols (ICNP), (Oct. 17, 2011), 18 pgs.

Chan, Connie, "The Elements of Stickers", [Online] Retrieved from the Internet: <URL: https://a16z.com/2016/06/17/stickers/>, (Jun. 20, 2016), 15 pgs.

Collet, Jean Luc, et al., "Interactive avatar in messaging environment", U.S. Appl. No. 12/471,811, filed May 26, 2009, (May 26, 2009), 31 pgs.

Dillet, Romain, "Zenly proves that location sharing isn't dead", [Online] Retrieved from the Internet: <URL: https://techcrunch.com/2016/05/19/zenly-solomoyolo/>, (accessed Jun. 27, 2018), 6 pgs.

Fajman, "An Extensible Message Format for Message Disposition Notifications", Request for Comments: 2298, National Institutes of Health, (Mar. 1998), 28 pgs.

Finn, Greg, "Miss Google Latitude? Google Plus With Location Sharing Is Now a Suitable Alternative", Cypress North, [Online] Retrieved from the Internet: <URL: https://cypressnorth.com/social-media/miss-google-latitude-google-location-sharing-now-suitable-alternative/>, [Retrieved on: Oct. 24, 2019], (Nov. 27, 2013), 10 pgs.

Gundersen, Eric, "Foursquare Switches to MapBox Streets, Joins the OpenStreetMap Movement", [Online] Retrieved from the Internet: <URL: https://blog.mapbox.com/foursquare-switches-to-mapbox-streets-joins-the-openstreetmap-movement-29e6a17f4464>, (Mar. 6, 2012), 4 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Lapenna, Joe, "The Official Google Blog. Check in with Google Latitude", Google Blog, [Online] Retrieved from the Internet: <https://web.archive.org/web/20110201201006/https://googleblog.blogspot.com/2011/02/check-in-with-google-latitude.html>, [Retrieved on: Oct. 23, 2019], (Feb. 1, 2011), 6 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Neis, Pascal, "The OpenStreetMap Contributors Map aka Who's around me?", [Online] Retrieved from the Internet by the examiner on Jun. 5, 2019: <URL: https://neis-one.org/2013/01/000c/>, (Jan. 6, 2013), 7 pgs.

Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, a Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Perez, Sarah, "Life 360, The Family Locator With More Users Than Foursquare, Raises a $10 Million Series B", [Online] Retrieved from the Internet: <URL: https://techcrunch.com/2013/07/10/life360-the-family-locator-with-more-users-than-foursquare-raises-10-million-series-b/>, (Jul. 10, 2013), 2 pgs.

Petovello, Mark, "How does a GNSS receiver estimate velocity?", InsideGNSS, [Online] Retrieved from the Internet: <URL: http://insidegnss.com/wp-content/uploads/2018/01/marapr15-SOLUTIONS.pdf>., (Mar.-Apr. 2015), 3 pgs.

Rhee, Chi-Hyoung, et al., "Cartoon-like Avatar Generation Using Facial Component Matching", International Journal of Multimedia and Ubiquitous Engineering, (Jul. 30, 2013), 69-78.

Sawers, Paul, "Snapchat for iOS Lets You Send Photos to Friends and Set How long They're Visible for", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Sulleyman, Aatif, "Google Maps Could Let Strangers Track Your Real-Time Location for Days at a Time", The Independent, [Online] Retrieved from the Internet: <URL: https://www.independent.co.uk/life-style/gadgets-and-tech/news/google-maps-track-location-real-time-days-privacy-security-stalk-gps-days-a7645721.html>, (Mar. 23, 2017), 5 pgs.

Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.

Vaas, Lisa, "Stealth Text, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

Wilmott, Clancy, et al., "Playful Mapping in the Digital Age", Playful Mapping Collective, Institute of Network Cultures, Amsterdam, (2016), 158 pgs.

Zibreg, "How to share your real time location on Google Maps", idownloadblog.com, [Online] Retrieved from the Internet: <URL: https://www.idownloadblog.com/2017/04/12/how-to-share-location-google-maps/>, [Retrieved on: Oct. 23, 2019], (Apr. 12, 2017), 23 pgs.

"U.S. Appl. No. 17/131,598, Response filed Jan. 27, 2023 to Non Final Office Action mailed Sep. 27, 2022", 15 pgs.

(56) References Cited

OTHER PUBLICATIONS

"Korean Application Serial No. 10-2022-7013956, Notice of Preliminary Rejection mailed Jan. 13, 2023", w English Translation, 22 pgs.
"Korean Application Serial No. 10-2019-7034715, Office Action mailed Jan. 30, 2023", With English machine translation, 3 pgs.
"U.S. Appl. No. 15/965,756, Response filed Feb. 14, 2023 to Non Final Office Action mailed Nov. 14, 2022", 13 pgs.
"U.S. Appl. No. 15/965,744, Response filed Feb. 21, 2023 to Final Office Action mailed Oct. 21, 2022", 14 pgs.
"U.S. Appl. No. 16/365,300, Response filed Feb. 28, 2023 to Final Office Action mailed Dec. 30, 2022", 13 pgs.
"U.S. Appl. No. 17/879,607, Notice of Allowance mailed Mar. 6, 2023", 10 pgs.
"U.S. Appl. No. 16/365,300, Advisory Action mailed Mar. 9, 2023", 3 pgs.
"Korean Application Serial No. 10-2019-7034715, Office Action mailed Feb. 27, 2023", w English Machine Translation, 46 pgs.
"U.S. Appl. No. 17/818,896, Non Final Office Action mailed Mar. 16, 2023", 13 pgs.
"U.S. Appl. No. 15/965,744, Non Final Office Action mailed Mar. 30, 2023", 34 pgs.
"U.S. Appl. No. 16/232,824, Non Final Office Action mailed Mar. 30, 2023", 27 pgs.
"Chinese Application Serial No. 201880042674.4, Office Action mailed Feb. 20, 2023", w English Translation, 13 pgs.
"Chinese Application Serial No. 201880043144.1, Office Action mailed Feb. 17, 2023", w English Translation, 12 pgs.
"Chinese Application Serial No. 201880043121.0, Office Action mailed Feb. 20, 2023", W English Translation, 12 pgs.
"Chinese Application Serial No. 201880043068.4, Office Action mailed Mar. 1, 2023", W English Translation, 22 pgs.
"Chinese Application Serial No. 201880043199.2, Office Action mailed Mar. 31, 2023", w English Translation, 12 pgs.
"U.S. Appl. No. 17/805,127, Non Final Office Action mailed Apr. 27, 2023", 98 pgs.
"Korean Application Serial No. 10-2022-7028257, Notice of Preliminary Rejection mailed Apr. 5, 2023", W English Translation, 6 pgs.
"U.S. Appl. No. 15/628,408, Response filed Apr. 27, 2023 to Non Final Office Action mailed Dec. 27, 2022", 13 pgs.
"U.S. Appl. No. 16/365,300, Response filed May 1, 2023 to Advisory Action mailed Mar. 9, 2023", 13 pgs.
"U.S. Appl. No. 17/131,598, Final Office Action mailed May 11, 2023", 26 pgs.
"U.S. Appl. No. 15/965,756, Final Office Action mailed May 12, 2023", 18 pgs.
"Chinese Application Serial No. 202010086283.1, Office Action mailed Mar. 16, 2023", W English Translation, 12 pgs.
"U.S. Appl. No. 17/879,607, Notice of Allowability mailed Jun. 12, 2023", 2 pgs.
"U.S. Appl. No. 17/818,896, Examiner Interview Summary mailed Jun. 12, 2023", 2 pgs.
"Chinese Application Serial No. 201880042674.4, Response filed Mar. 5, 2024 to Office Action mailed Dec. 21, 2023", With English Machine Translation, 10 pgs.
"Korean Application Serial No. 10-2023-7000455, Response filed Mar. 8, 2024 to Notice of Preliminary Rejection mailed Sep. 11, 2023", w current English claims, 21 pgs.
"U.S. Appl. No. 18/196,915, Response filed Mar. 21, 2024 to Non Final Office Action mailed Dec. 21, 2023", 10 pgs.
"U.S. Appl. No. 18/047,213, Corrected Notice of Allowability mailed Mar. 25, 2024", 2 pgs.
"Korean Application Serial No. 10-2023-7010121, Response filed Mar. 19, 2024 to Notice of Preliminary Rejection mailed Oct. 19, 2023", w current English claims, 24 pgs.
"Chinese Application Serial No. 202010086283.1, Response filed Mar. 21, 2024 to Office Action mailed Jan. 15, 2024", w current English claims, 14 pgs.

"U.S. Appl. No. 17/131,598, Response filed Mar. 26, 2024 to Non Final Office Action mailed Dec. 26, 2023", 13 pgs.
"U.S. Appl. No. 15/965,744, Non Final Office Action mailed Mar. 27, 2024", 35 pgs.
"Chinese Application Serial No. 201880043144.1, Decision of Rejection mailed Feb. 21, 2024", w English Translation, 11 pgs.
"Korean Application Serial No. 10-2022-7013956, Notice of Preliminary Rejection mailed Mar. 14, 2024", w English translation, 7 pgs.
"U.S. Appl. No. 18/047,213 Amendment Under 37 CFR 1.312 Filed Apr. 10, 2024", 9 pgs.
"U.S. Appl. No. 17/131,598, Final Office Action mailed Apr. 10, 2024", 30 pgs.
"U.S. Appl. No. 16/232,824, Non Final Office Action mailed Apr. 10, 2024", 28 pgs.
"How to combine several images into one document using GIMP", Useful Graphic Design Tutorials, [Online]. Retrieved from the Internet: https: www.youtube.com watch?v=-h4Lu7Agbw0, (Jan. 6, 2013), 2 pgs.
"U.S. Appl. No. 18/047,213, 312 Amendment filed Apr. 10, 2024", 9 pgs.
"Chinese Application Serial No. 201880042674.4, Decision of Rejection mailed Mar. 12, 2024", W English Translation, 10 pgs.
"U.S. Appl. No. 18/196,915, Notice of Allowance mailed Apr. 18, 2024", 10 pgs.
"U.S. Appl. No. 17/946,337, Response filed Apr. 22, 2024 to Non Final Office Action mailed Nov. 20, 2023", 15 pgs.
"U.S. Appl. No. 18/047,213, PTO Response to Rule 312 Communication mailed Apr. 24, 2024", 3 pgs.
"U.S. Appl. No. 15/965,756, Response filed Apr. 29, 2024 to Non Final Office Action mailed Jan. 31, 2024", 14 pgs.
"U.S. Appl. No. 17/805,127, Supplemental Notice of Allowability mailed May 1, 2024", 3 pgs.
"U.S. Appl. No. 18/196,915, Notice of Allowability mailed May 6, 2024", 2 pgs.
"Chinese Application Serial No. 201880043121.0, Decision of Rejection mailed Mar. 12, 2024", W English Translation, 12 pgs.
"U.S. Appl. No. 18/078,268, Response filed May 10, 2024 to Non Final Office Action mailed Dec. 15, 2023", 13 pgs.
"U.S. Appl. No. 17/946,337, Notice of Allowance mailed May 15, 2024", 12 pgs.
Fan, Zhang, "Research on Heatmap for Big Data Based on Spark", Journal of Computer-Aided Design and Computer Graphics vol. 28 No. 11—English abstract included., (Nov. 2016), 6 pgs.
Jiayao, Hu, "Self Presentation in Location Based Social Networks", New Media and Society—English abstract included., (Nov. 2015), 14 pgs.
U.S. Appl. No. 18/671,603, filed May 22, 2024, Selective Location-Based Identity Communication.
"U.S. Appl. No. 15/628,408, Notice of Allowance mailed Aug. 3, 2023", 9 pgs.
"U.S. Appl. No. 15/965,744, Response filed Jul. 31, 2023 to Non Final Office Action mailed Mar. 30, 2023", 11 pgs.
"U.S. Appl. No. 15/965,756, Response filed Sep. 12, 2023 to Final Office Action mailed May 12, 2023", 13 pgs.
"U.S. Appl. No. 16/232,824, Response filed Jul. 31, 2023 to Non Final Office Action mailed Mar. 30, 2023", 13 pgs.
"U.S. Appl. No. 16/365,300, Notice of Allowance mailed Jul. 17, 2023", 19 pgs.
"U.S. Appl. No. 17/131,598, Response filed Jul. 18, 2023 to Final Office Action mailed May 11, 2023", 16 pgs.
"U.S. Appl. No. 17/805,127, Response filed Sep. 27, 2023 to Non Final Office Action mailed Apr. 27, 2023", 15 pgs.
"U.S. Appl. No. 17/818,896, Response filed Jun. 16, 2023 to Non Final Office Action mailed Mar. 16, 2023", 8 pgs.
"U.S. Appl. No. 17/879,607, Notice of Allowability mailed Aug. 14, 2023", 2 pgs.
"U.S. Appl. No. 18/047,213, Non Final Office Action mailed Sep. 13, 2023", 14 pgs.
"Chinese Application Serial No. 201880043144.1, Response filed Apr. 22, 2023 to Office Action mailed Feb. 17, 2023", With English claims, 13 pgs.

(56) References Cited

OTHER PUBLICATIONS

"Chinese Application Serial No. 202010086283.1, Response filed Jul. 31, 2023 to Office Action mailed Mar. 16, 2023", With English claims, 16 pgs.

"European Application Serial No. 18790319.0, Invitation pursuant to Article 94(3) and Rule 71(1) EPC mailed Oct. 9, 2023", 9 pgs.

"European Application Serial No. 18791363.7, EPO Written Decision to Refuse mailed Aug. 16, 2023", 17 pgs.

"European Application Serial No. 19206595.1, Communication Pursuant to Article 94(3) EPC mailed Aug. 29, 2023", 7 pgs.

"European Application Serial No. 19206610.8, Invitation pursuant to Article 94(3) and Rule 71(1) EPC mailed Oct. 9, 2023", 7 pgs.

"Korean Application Serial No. 10-2022-7013956, Final Office Action mailed Sep. 11, 2023", w/ English Translation, 11 pgs.

"Korean Application Serial No. 10-2022-7033556, Response filed Aug. 8, 2023 to Notice of Preliminary Rejection mailed Jun. 8, 2023", With English claims, 25 pgs.

"Korean Application Serial No. 10-2022-7033840, Notice of Preliminary Rejection mailed Jun. 9, 2023", W/English Translation, 20 pgs.

"Korean Application Serial No. 10-2022-7035335, Notice of Preliminary Rejection mailed Jun. 7, 2023", W/English Translation, 24 pgs.

"Korean Application Serial No. 10-2023-7000455, Notice of Preliminary Rejection mailed Sep. 11, 2023", W/ English Translation, 14 pgs.

Grubert, "Towards pervasive augmented reality context awareness in Augmented reality", (2017), 20 pgs.

Kim, Seokyeon, et al., "the visualization of spatial temporal data using the gravity model", information science society paper electuary 43 Keown second call, Journal of KIISE, vol. 43, No. 2, (Feb. 2016), 8 pgs.

"U.S. Appl. No. 17/805,127, Notice of Allowance mailed Oct. 24, 2023", 20 pgs.

"U.S. Appl. No. 15/965,744, Final Office Action mailed Oct. 24, 2023", 35 pgs.

"U.S. Appl. No. 17/818,896, Final Office Action mailed Oct. 24, 2023", 17 pgs.

"U.S. Appl. No. 16/232,824, Final Office Action mailed Oct. 25, 2023", 27 pgs.

"U.S. Appl. No. 16/365,300, Notice of Allowability mailed Nov. 6, 2023", 3 pgs.

"Korean Application Serial No. 10-2023-7010121, Notice of Preliminary Rejection mailed Oct. 19, 2023", w English Translation, 12 pgs.

"Korean Application Serial No. 10-2022-7035335, Response filed Nov. 7, 2023 to Notice of Preliminary Rejection mailed Jun. 7, 2023", W English Claims, 26 pgs.

"U.S. Appl. No. 15/628,408, Corrected Notice of Allowability mailed Nov. 15, 2023", 2 pgs.

"U.S. Appl. No. 17/946,337, Non Final Office Action mailed Nov. 20, 2023", 19 pgs.

"Chinese Application Serial No. 202010086283.1, Office Action mailed Oct. 28, 2023", w English Translation, 5 pgs.

"U.S. Appl. No. 15/628,408, Corrected Notice of Allowability mailed Nov. 24, 2023", 2 pgs.

"U.S. Appl. No. 18/047,213, Response filed Dec. 13, 2023 to Non Final Office Action mailed Sep. 13, 2023", 14 pgs.

"U.S. Appl. No. 18/078,268, Non Final Office Action mailed Dec. 15, 2023", 21 pgs.

"U.S. Appl. No. 18/196,915, Non Final Office Action mailed Dec. 21, 2023", 16 pgs.

"Korean Application Serial No. 10-2022-7033556, Notice of Preliminary Rejection mailed Dec. 8, 2023", w English Translation, 16 pgs.

"U.S. Appl. No. 17/131,598, Non Final Office Action mailed Dec. 26, 2023", 29 pgs.

"Chinese Application Serial No. 201880043144.1, Office Action mailed Nov. 28, 2023", w English Translation, 9 pgs.

U.S. Appl. No. 18/649,372, filed Apr. 29, 2024, Map-Based Graphical User Interface for Multi-Type Social Media Galleries.

U.S. Appl. No. 18/667,050, filed May 17, 2024, Location-Based Search Mechanism in a Graphical User Interface.

"U.S. Appl. No. 17/805,127, Supplemental Notice of Allowability mailed May 20, 2024", 2 pgs.

"U.S. Appl. No. 17/946,337, Corrected Notice of Allowability mailed May 23, 2024", 2 pgs.

"Chinese Application Serial No. 201880043144.1, Request for Reexamination filed May 21, 2024", w current English claims, 20 pgs.

"Korean Application Serial No. 10-2022-7035335, Final Office Action mailed May 14, 2024", w English translation, 10 pgs.

"U.S. Appl. No. 18/078,268, Final Office Action mailed Jun. 7, 2024", 22 pgs.

"Korean Application Serial No. 10-2022-7033556, Response filed Jun. 10, 2024 to Notice of Preliminary Rejection mailed Dec. 8, 2023", w current English claims, 37 pgs.

"Chinese Application Serial No. 201880043121.0, Request for Reexamination filed Jun. 12, 2024", W English Claims, 15 pgs.

"Chinese Application Serial No. 201880042674.4, Request for Reexamination filed Jun. 12, 2024", W English Claims, 16 pgs.

"U.S. Appl. No. 15/965,756, Non Final Office Action mailed Jun. 18, 2024".

"U.S. Appl. No. 17/818,896, Notice of Allowability mailed Jun. 27, 2024", 2 pgs.

"U.S. Appl. No. 17/818,896, Notice of Allowability mailed Jul. 9, 2024", 2 pgs.

"European Application Serial No. 24183559.4, Extended European Search Report mailed Jul. 16, 2024", 6 pgs.

"U.S. Appl. No. 18/196,915, Notice of Allowability mailed Jul. 26, 2024", 2 pgs.

"U.S. Appl. No. 15/965,744, Response filed Jul. 29, 2024 to Non Final Office Action mailed Mar. 27, 2024", 15 pgs.

"Chinese Application Serial No. 202010086283.1, Response filed Dec. 13, 2023 to Office Action mailed Oct. 28, 2023", w English claims, 12 pgs.

"U.S. Appl. No. 17/818,896, Examiner Interview Summary mailed Jan. 9, 2024", 2 pgs.

"U.S. Appl. No. 18/047,213, Notice of Allowance mailed Jan. 11, 2024", 8 pgs.

"Chinese Application Serial No. 201880042674.4, Office Action mailed Dec. 21, 2023", w English Translation, 10 pgs.

"U.S. Appl. No. 17/818,896, Response filed Jan. 23, 2024 to Final Office Action mailed Oct. 24, 2023", 10 pgs.

"Chinese Application Serial No. 201880043199.2, Office Action mailed Dec. 18, 2023", w English Translation, 15 pgs.

"U.S. Appl. No. 18/047,213, Corrected Notice of Allowability mailed Jan. 30, 2024", 2 pgs.

"U.S. Appl. No. 15/965,756, Non Final Office Action mailed Jan. 31, 2024".

"Chinese Application Serial No. 201880043121.0, Office Action mailed Dec. 21, 2023", w English Translation, 9 pgs.

"Chinese Application Serial No. 202010086283.1, Office Action mailed Jan. 15, 2024", w English Translation, 10 pgs.

"U.S. Appl. No. 17/805,127, Notice of Allowance mailed Feb. 14, 2024", 7 pgs.

"U.S. Appl. No. 17/818,896, Notice of Allowance mailed Feb. 22, 2024", 9 pgs.

"European Application Serial No. 19206595.1, Response filed Feb. 20, 2024 to Communication Pursuant to Article 94(3) EPC mailed Aug. 29, 2023", 19 pgs.

"U.S. Appl. No. 15/965,744, Response filed Feb. 26, 2024 to Final Office Action mailed Oct. 24, 2023", 12 pgs.

"U.S. Appl. No. 16/232,824, Response filed Feb. 26, 2024 to Final Office Action mailed Oct. 25, 2023", 12 pgs.

"Chinese Application Serial No. 201880043199.2, Response filed Feb. 28, 2024 to Office Action mailed Dec. 18, 2023", w English Claims, 12 pgs.

"European Application Serial No. 23203327.4, Extended European Search Report mailed Mar. 5, 2024", 10 pgs.

(56) References Cited

OTHER PUBLICATIONS

"Chinese Application Serial No. 201880043121.0, Response filed Mar. 5, 2024 to Office Action mailed Dec. 21, 2023", W English Claims, 15 pgs.

U.S. Appl. No. 18/800,534, filed Aug. 12, 2024, Map-Based Graphical User Interface Indicating Geospatial Activity Metrics.

U.S. Appl. No. 18/898,433, filed Sep. 26, 2024, Acivity Metric-Based Visual Variation of Selectable GUI Elements.

"U.S. Appl. No. 18/078,268, Response filed Aug. 7, 2024 to Final Office Action mailed Jun. 7, 2024", 15 pgs.

"U.S. Appl. No. 17/946,337, 312 Amendment filed Aug. 13, 2024", 7 pgs.

"U.S. Appl. No. 17/946,337, PTO Response to Rule 312 Communication mailed Aug. 22, 2024", 2 pgs.

"Korean Application Serial No. 10-2023-7010121, Final Office Action mailed Aug. 16, 2024", w English Translation, 9 pgs.

"U.S. Appl. No. 15/965,744, Final Office Action mailed Aug. 27, 2024", 38 pgs.

"Korean Application Serial No. 10-2023-7000455, Notice of Preliminary Rejection mailed Aug. 19, 2024", w English translation, 15 pgs.

"U.S. Appl. No. 16/232,824, Response filed Sep. 10, 2024 to Non Final Office Action mailed Apr. 10, 2024", 14 pgs.

"U.S. Appl. No. 17/946,337, Corrected Notice of Allowability mailed Sep. 11, 2024", 2 pgs.

"U.S. Appl. No. 18/078,268, Notice of Allowance mailed Sep. 12, 2024", 8 pgs.

"U.S. Appl. No. 18/196,915, Notice of Allowability mailed Sep. 25, 2024", 2 pgs.

"U.S. Appl. No. 17/131,598, Response filed Oct. 10, 2024 to Final Office Action mailed Apr. 10, 2024", 13 pgs.

"European Application Serial No. 24199320.3, Extended European Search Report mailed Oct. 14, 2024", 7 pgs.

Gang, Shi, "A Brief Analysis of GIS based Video Surveillance Command Platform", With English Machine Translation, (Nov. 2013), 9 pgs.

Ning, Chen, "Analysis of Tourist Attraction Popularity Based on Social Media Geographic Big Data", English abstract included., (Dec. 2016), 6 pgs.

"U.S. Appl. No. 17/131,598, Notice of Allowance mailed Nov. 27, 2024", 5 pgs.

"U.S. Appl. No. 16/232,824, Final Office Action mailed Nov. 29, 2024", 31 pgs.

"U.S. Appl. No. 18/078,268, 312 Amendment filed Dec. 10, 2024", 9 pgs.

"U.S. Appl. No. 15/965,756, Response filed Dec. 16, 2024 to Non Final Office Action mailed Jun. 18, 2024", 12 pgs.

"U.S. Appl. No. 18/667,050, Non Final Office Action mailed Dec. 17, 2024", 16 pgs.

"U.S. Appl. No. 18/078,268, PTO Response to Rule 312 Communication mailed Dec. 18, 2024", 2 pgs.

"Chinese Application Serial No. 202411372451.8, Notification to Make Rectification (210302) mailed Oct. 30, 2024", With English Machine Translation, 3 pgs.

"Chinese Application Serial No. 202411372451.8, Response filed Nov. 22, 2024 to Notification to Make Rectification (210302) mailed Oct. 30, 2024", With English Machine Translation, 110 pgs.

"Chinese Application Serial No. 201880042674.4, Office Action mailed Oct. 22, 2024", W English Translation, 13 pgs.

"Korean Application Serial No. 10-2022-7013956, Response filed May 13, 2024 to Notice of Preliminary Rejection mailed Mar. 14, 2024", w English claims, 14 pgs.

\* cited by examiner

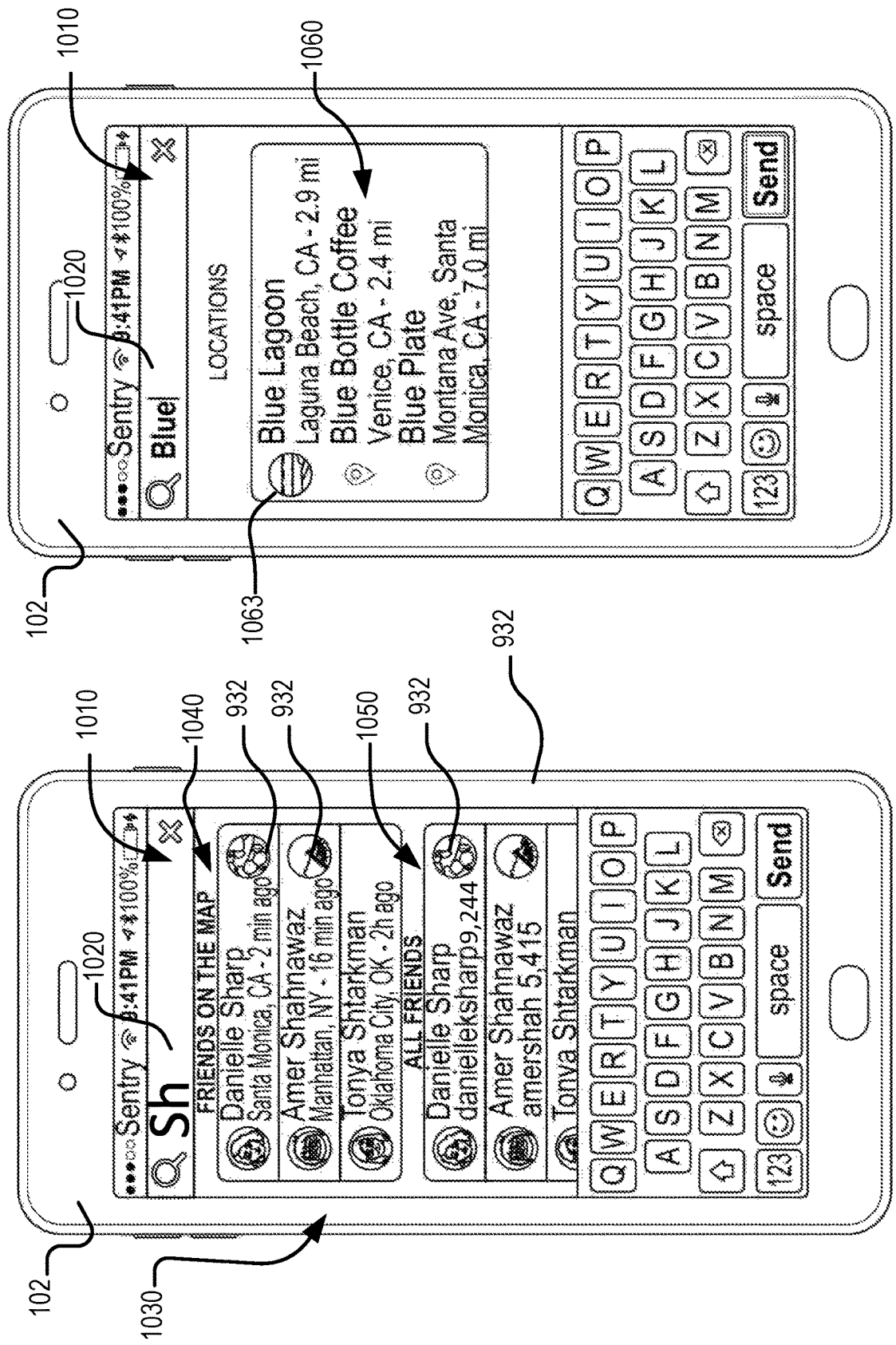

MAP-BASED GRAPHICAL USER INTERFACE INDICATING GEOSPATIAL ACTIVITY METRICS

PRIORITY APPLICATIONS

This application is a continuation of U.S. patent application Ser. No. 15/965,775, filed Apr. 27, 2018, which claims the benefit of priority to U.S. Provisional Application Ser. No. 62/556,134, filed Sep. 8, 2017; U.S. Provisional Application Ser. No. 62/552,958, filed Aug. 31, 2017; and U.S. Provisional Application Ser. No. 62/491,115, filed Apr. 27, 2017, the contents of each of which are incorporated herein by reference in their entireties.

BACKGROUND

Social media applications implement computer-mediated technologies allowing for the creating and sharing of content that communicates information, ideas, career interests, and other forms of expression via virtual communities and networks. Social media platforms use web-based technologies, desktop computers, and mobile technologies (e.g., smart phones and tablet computers) to create highly interactive platforms through which individuals, communities, and organizations can share, co-create, discuss, and modify user-generated content or pre-made content posted online.

Mobile electronic devices on which end-user social media applications can be executed typically provide geolocation services that determine the geographic location of the mobile electronic device, by extension indicating the geographic location of the associated user. Social media content posted by users is often geo-tagged based on the geolocation of a mobile electronic device (such as a mobile phone) by use of which the social media content is captured and/or posted to the social media platform. In other embodiments, social media content may explicitly be geo-tagged by a user using a computer device that does not have activated geo-location services and/or that is not a mobile device (such as a desktop PC).

In many social media platforms, the total number of individual social media items that are available for viewing by any particular user can be very large. Search mechanisms that enable users to locate social media content that may be of interest to them can consume significant server-side resources and often provide less than satisfactory search results.

BRIEF DESCRIPTION OF THE DRAWINGS

Some aspects of the disclosure are illustrated in the appended drawings. Note that the appended drawings illustrate example embodiments of the present disclosure and cannot be considered as limiting the scope of the disclosure.

FIG. 10A-10D are a series of screenshots of search interfaces provided as part of a map-based graphical user interface, according to respective example embodiments.

Figure 1:
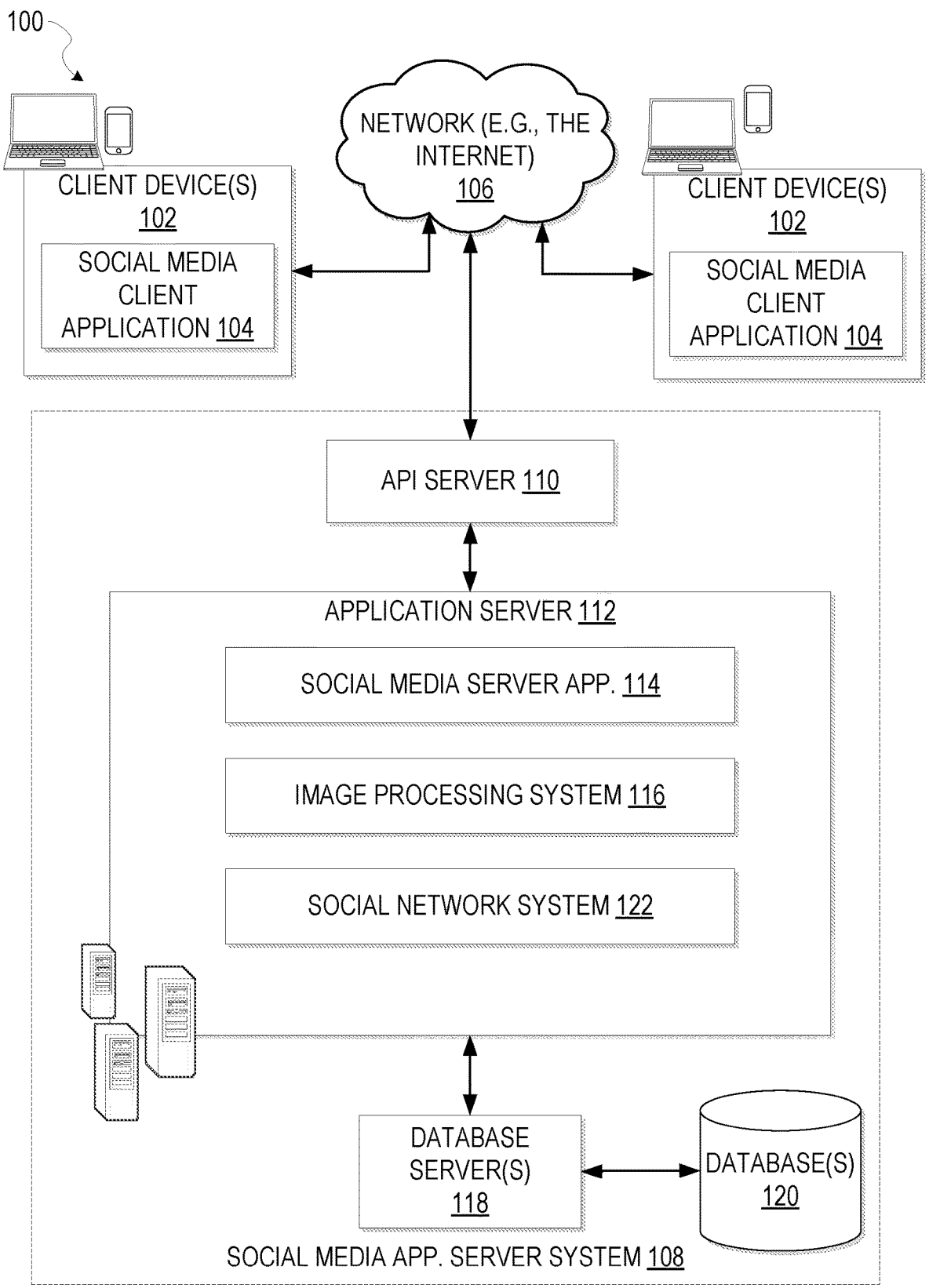
FIG. 1 is a block diagram showing an example social media platform system for exchanging, posting, and consuming social media data (e.g., messages and associated content) over a network.

The headings provided herein are merely for convenience and do not necessarily affect the scope or meaning of the terms used.

DESCRIPTION

One aspect of the disclosure provides a geographical map-based graphical user interface (GUI) for a social media platform or application, to allow user access via the map-based GUI to ephemeral social media content. Such an interface is also referred to herein as a "map GUI."

As will be described in greater detail below, ephemeral social media content comprises social media items that are available for viewing via the social media application for only a limited period. For example, an ephemeral social media item or message (also referred to herein as a "snap") submitted by a user to the social media application may be available for viewing by other users via the map GUI of the social media application for only a predefined period subsequent to submission. In one example embodiment, each ephemeral item or snap has an availability lifetime (also referred to herein as a "gallery participation timer") of 24 hours after submission, after which the ephemeral item "disappears" and is no longer available for viewing by other users via the map GUI. Such ephemeral social media items (also referred to herein as ephemeral messages) typically comprise photographic or video content, which may be submitted with or without augmentations made by the user to the underlying photographic or video content.

Ephemeral messages submitted by multiple different users may be available on a map forming part of the map GUI based at least in part on respective location information (e.g., geotag information) of the ephemeral messages. In some embodiments, the map GUI may provide location-based access to one or more collections of ephemeral social media items (also known as and referred to herein as galleries or "stories"). In some example embodiments, a plurality of ephemeral messages submitted by different users are included in a common geo-anchored gallery or story based at least in part on respective geotagging information of the plurality of ephemeral messages. Such a location-based gallery or story is in some embodiments represented on the map GUI by a respective gallery icon displayed at a corresponding map location, the gallery icon being selectable by the user to trigger automated sequential display of the plurality of ephemeral messages in the gallery on the user device on which the map GUI is rendered.

In some embodiments, such a map GUI includes representations (e.g. by means of friend icons or bitmojis) of at least approximate respective positions of a user's friends in a social network graph accessed by the social media application, with the social media application enabling the user to explore the world around friends' locations by use of the GUI. Thus, the map GUI can in some embodiments enable the user to explore uploaded social media content (e.g., individual photos or video clips/snaps, or social media galleries such as stories comprising respective collections of photos, messages, or snaps).

Figure 19:
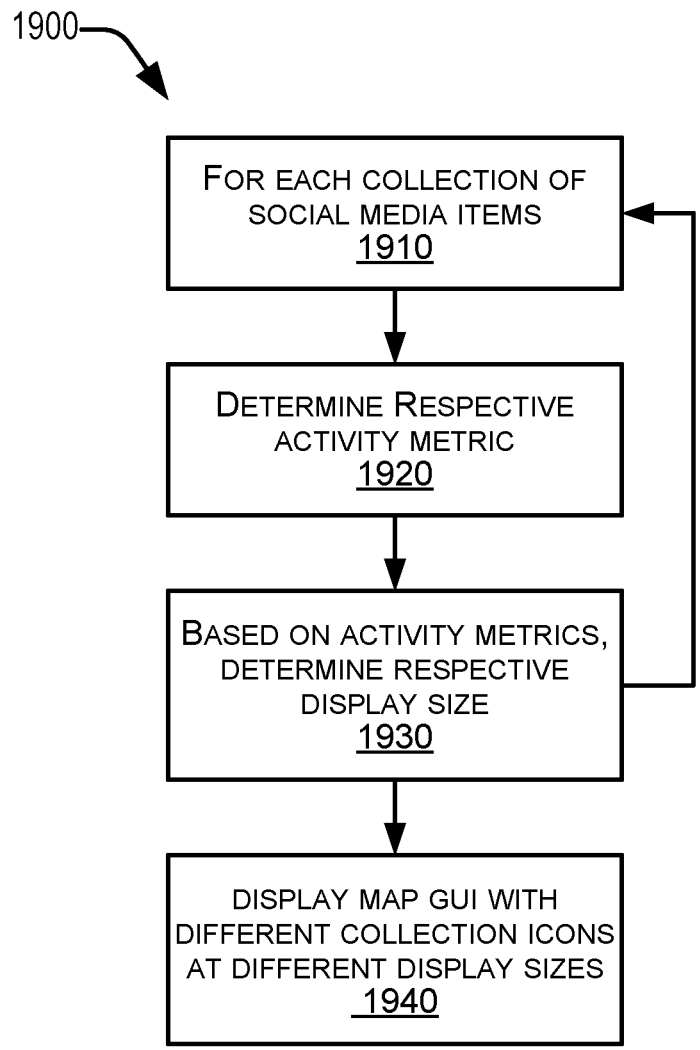
FIG. 19 is a flowchart illustrating a method of providing a map-based graphical user interface in which collection icons have visual attributes that are variable based on an underlying social media activity metric, according to an example embodiment.
Figure 20:
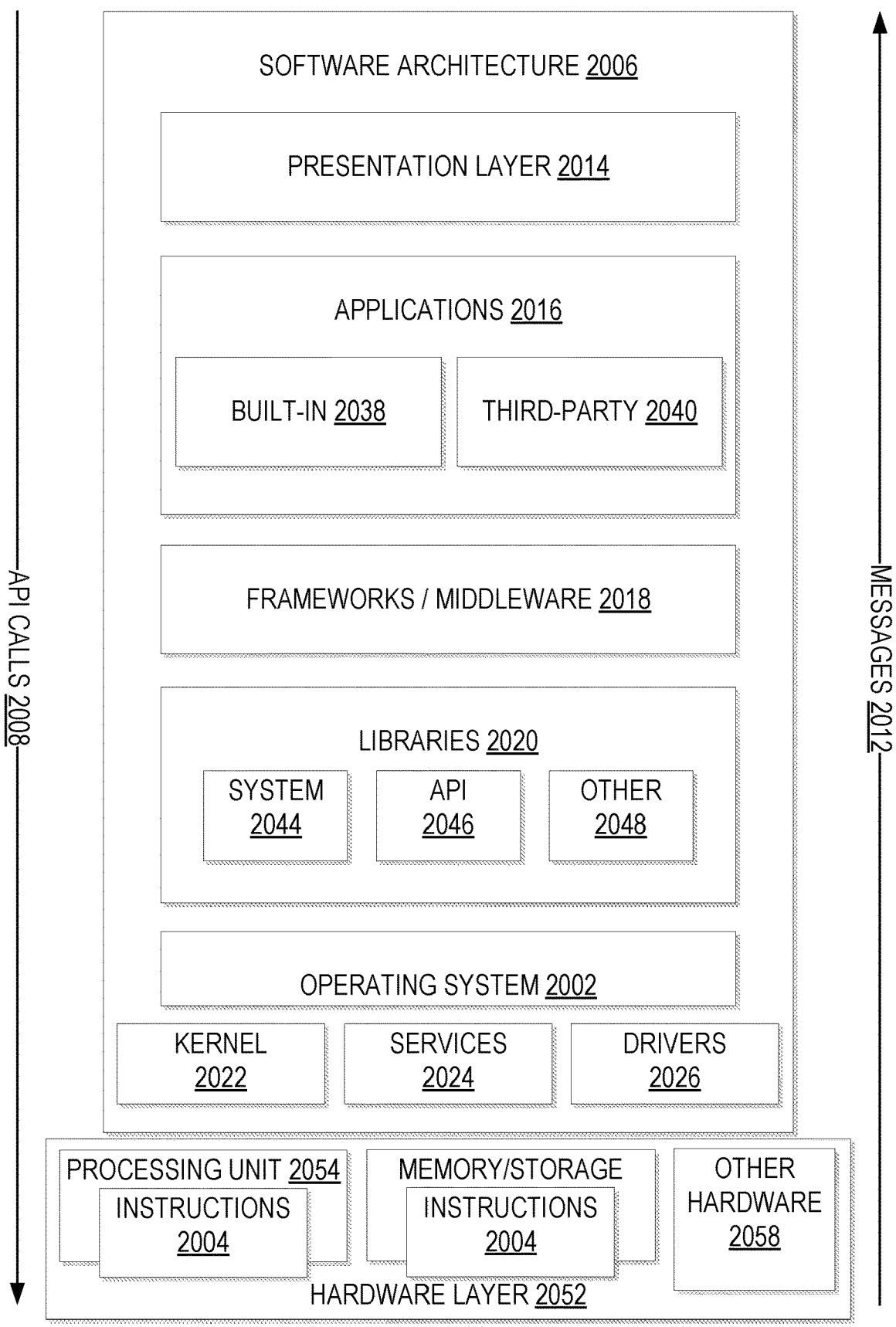
FIG. 20 is a block diagram illustrating a representative software architecture, which may be used in conjunction with various hardware architectures herein described.
Figure 21:
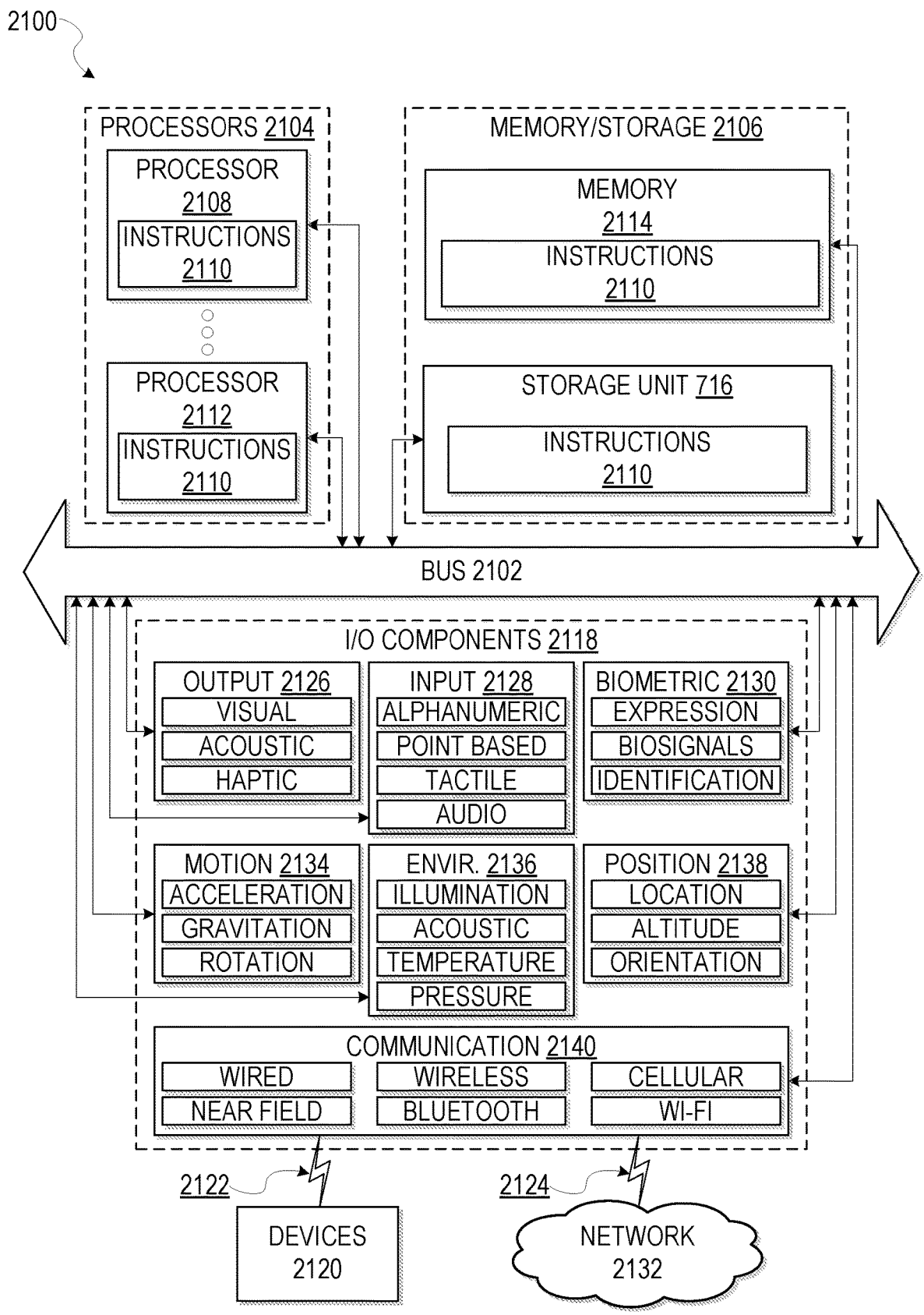
FIG. 21 is a block diagram illustrating components of a machine, according to some example embodiments, able to read instructions from a machine-readable medium (e.g., a machine-readable storage medium) and perform any one or more of the methodologies discussed herein.

These and additional aspects of the disclosure will be described below with reference to specific example embodiments. First, platform architecture and a technical background to implementation of the various embodiments will be described with reference to FIGS. 1-5. Thereafter, specific example embodiments are described with reference to FIGS. 6A-19. FIGS. 20-21 finally describe aspects of software and hardware components that are in some instances used in the implementation of the described example embodiments.

DETAILED DESCRIPTION

The description that follows includes systems, methods, devices, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the disclosed subject matter may be practiced without these specific details. In general, well-known instruction instances, protocols, structures, and techniques are not necessarily shown in detail.

System Architecture and Operating Environment

FIG. 1 is a block diagram showing an example social media platform system 100 for exchanging data (e.g., social media items or messages and associated content) over a network. In this description, items communicated from one user to one or more other users via a social media application or platform, as well as items uploaded or provided by users to a social media application or platform for availability to or consumption by other users via the social media application or platform, are referred to as "messages." Thus, the term "messages" as used herein is not limited to communications from one user to specified recipient users, but includes messages made available for public consumption via the relevant social media platform.

The social media platform system 100 includes multiple client devices 102, each of which hosts a number of applications including a social media client application 104. Each social media client application 104 is communicatively coupled to other instances of the social media client application 104 and a social media application server system 108 via a network 106 (e.g., the Internet).

Accordingly, each social media client application 104 is able to communicate and exchange data with another social media client application 104 and with the social media application server system 108 via the network 106. The data exchanged between social media client applications 104, and between a social media client application 104 and the social media application server system 108, includes functions (e.g., commands to invoke functions) as well as payload data (e.g., text, audio, video, or other multimedia data).

The social media application server system 108 provides server-side functionality via the network 106 to a particular social media client application 104. While certain functions of the social media platform system 100 are described herein as being performed by either a social media client application 104 or by the social media application server system 108, it will be appreciated that the location of certain functionality either within the social media client application 104 or the social media application server system 108 is a design choice. For example, it may be technically expedient to initially deploy certain technology and functionality within the social media application server system 108, but to later migrate this technology and functionality to the social media client application 104 where a client device 102 has a sufficient processing capacity.

The social media application server system 108 supports various services and operations that are provided to the social media client application 104. Such operations include transmitting data to, receiving data from, and processing data generated by the social media client application 104. This data may include message content, client device information, geolocation information, media annotations and overlays, message content persistence conditions, social network information, and live event information, as examples. Data exchanges within the social media platform system 100 are invoked and controlled through functions available via user interfaces (UIs) of the social media client application 104.

Turning now specifically to the social media application server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the social media client application 104 in order to invoke functionality of the application server 112. The API server 110 exposes various functions supported by the application server 112, including account registration; login functionality; the sending of messages, via the application server 112, from a particular social media client application 104 to another social media client application 104; the sending of media files (e.g., images or video) from a social media client application 104 to a social media server application 114, for possible access by another social media client application 104; the setting of a collection of media data (e.g., a story or gallery); the retrieval of such collections; the retrieval of a list of friends of a user of a client device 102; the retrieval of messages and content; the adding and deletion of friends to and from a social graph; the location of friends within a social graph; opening an application event (e.g., relating to the social media client application 104); and so forth.

The application server 112 hosts a number of applications and subsystems, including the social media server application 114, an image processing system 116, and a social network system 122. The social media server application 114 implements a number of message processing technologies and functions, particularly related to the aggregation and other processing of content (e.g., textual and multimedia content) included in messages received from multiple instances of the social media client application 104. As will be described in further detail, the text and media content from multiple sources may be aggregated into collections of content (e.g., called "stories" or "galleries"). These collections are then made available, by the social media server application 114, to the social media client application 104. Other processor- and memory-intensive processing of data may also be performed server-side by the social media server application 114, in view of the hardware requirements for such processing.

The application server 112 also includes the image processing system 116, which is dedicated to performing various image processing operations, typically with respect to images or video received within the payload of a message at the social media server application 114.

The social network system 122 supports various social networking functions and services, and makes these functions and services available to the social media server application 114. To this end, the social network system 122 maintains and accesses an entity graph 304 (described below with reference to FIG. 3) within the database 120. Examples of functions and services supported by the social network system 122 include the identification of other users of the social media platform system 100 with whom a particular user has relationships or whom the particular user is "following," and also the identification of other attributes and interests of a particular user. In some embodiments, the social network system 122 includes an identification of other users whose location is available for viewing by a particular user via a map-based GUI displayable on a client device 102 using the corresponding social media client application 104.

Figure 2:
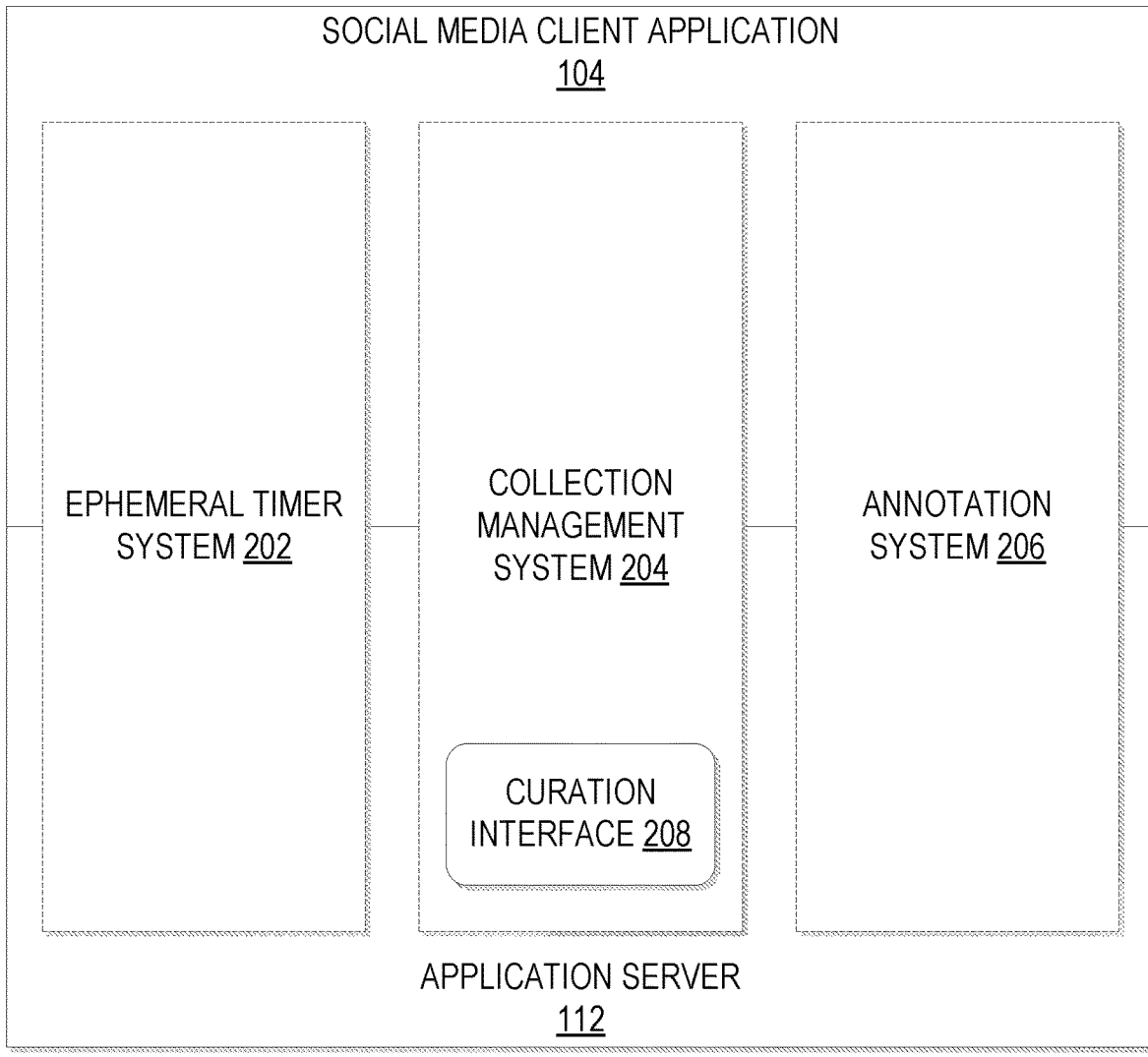
FIG. 2 is a block diagram illustrating further details regarding a social media platform system, according to example embodiments.

FIG. 2 is a block diagram illustrating further details regarding the social media platform system 100, according to example embodiments. Specifically, the social media platform system 100 is shown to comprise the social media client application 104 and the application server 112, which in turn embody a number of some subsystems, namely an ephemeral timer system 202, a collection management system 204, and an annotation system 206.

The ephemeral timer system 202 is responsible for enforcing the temporary access to content permitted by the social media client application 104 and the social media server application 114. To this end, the ephemeral timer system 202 incorporates a number of timers that, based on duration and display parameters associated with a message, or collection/gallery of messages (e.g., a SNAPCHAT story), selectively display and enable access to messages and associated content via the social media client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates, or until expiry of a last message or snap in the gallery. For example, content relating to a music concert may be made available as a "story" for the duration of that music concert. The collection management system 204 may also be responsible for publishing an icon that provides notification of the existence of a particular collection to the user interface of the social media client application 104. As will be described in greater detail with reference to the specific example embodiments that follow, the collection management system 204 may also be responsible for compiling and managing multiple location-based social media galleries based at least in part on geo-tag data of social media items or messages uploaded to the social media platform by multiple users. Other types of galleries that may be provided by the collection management system 204 include a "place story" that collects ephemeral messages having geotag data indicating a location within a predefined associated geographical area; and an ad-hoc story or spike story that is dynamically surfaced on a map GUI as described herein based on underlying location-based social media activity, e.g., based on geo-temporal volume or anomality/unusualness of social media items submitted by users for public consumption (e.g., for inclusion in a "Live Story" or "Our Story"). With "anomaly" is meant is metric indicating a how anomalous something is.

The collection management system 204 furthermore includes a curation interface 208 that allows a human operator (e.g., a collection manager) to manage and curate a particular collection of content. For example, the curation interface 208 enables an event organizer to curate a collection of content relating to a specific event (e.g., to delete inappropriate content or redundant messages). Instead, or in addition, the collection management system 204 may employ machine vision (or image recognition technology), geotag data, and/or content rules to automatically compile and/or curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise augment, modify, or edit media content associated with a message. For example, the annotation system 206 provides functions related to the generation and publishing of media overlays for messages processed by the social media platform system 100. The annotation system 206 operatively supplies a media overlay (e.g., a SNAPCHAT filter) to the social media client application 104 based on a geolocation of the client device 102. In another example, the annotation system 206 operatively supplies a media overlay to the social media client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph taken by the client device 102. In another example, the media overlay includes an identification of a location overlay (e.g., Venice Beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
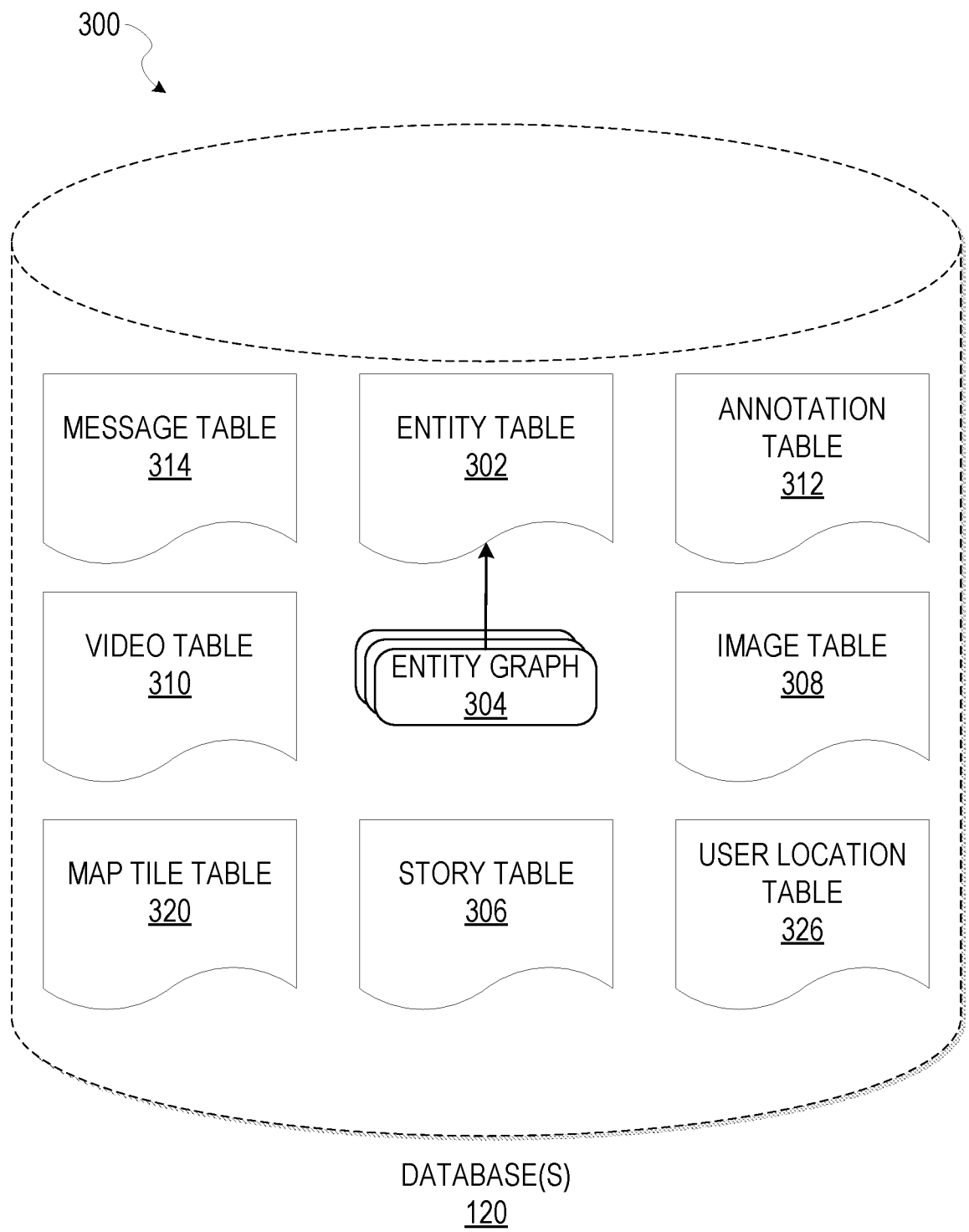
FIG. 3 is a schematic diagram illustrating data which may be stored in a database of the social media platform system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time FIG. 3 is a schematic diagram illustrating data 300 which may be stored in the database 120 of the social media application server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the social media application server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, including in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the social media client application 104 when the sending user is composing a message. Other types of filters include geolocation filters (also known as geo-filters), which may be presented to a sending user based on geographic location. For example, geolocation filters specific to a neighborhood or special location may be presented within a user interface by the social media client application 104, based on geolocation information determined by a Global Positioning System (GPS) unit of the client device 102. Another type of filter is a data filter, which may be selectively presented to a sending user by the social media client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

Yet further annotation data that may be stored within the annotation table 312 is user-generated annotations or augmentations provided by the user to overlay an underlying photographic image or video. Such augmentations/annotations can include, for example, text annotations and drawing annotations or augmentations provided by the user, e.g., via a client device touchscreen.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT story or a gallery). The creation of a particular collection may be initiated by a particular user (e.g., any user for whom a record is maintained in the entity table 302). A user may create a "personal story" in the form of a collection of content that has been created and sent/broadcast by that user. To this end, the user interface of the social media client application 104 may include an icon that is user selectable to enable a sending user to add specific content to his or her personal story. In the context of this description, such messages and stories/galleries are understood to be for private consumption, being limited for viewing via the social media application to particular users identified by the submitting user or to users who are members of a social network of the submitting user. This is to be contrasted with social media items provided for public or non-private consumption via the social media application, not being limited to a user-specific or user-specified subset of all users of the social media application. An example of a publicly viewable collection or gallery is a "Live Story" or "Our Story."

As mentioned, a collection may also constitute a "Live Story," which is a collection of content from multiple users that is created manually, automatically, or using a combination of manual and automatic techniques. For example, a "Live Story" may constitute a curated stream of user-submitted content from various locations and events. Users whose client devices have location services enabled and are at a common event location at a particular time may, for example, be presented with an option, via a user interface of the social media client application 104, to contribute content to a particular Live Story. The Live Story may be identified to the user by the social media client application 104, based on his or her location. The end result is a "Live Story" told from a community perspective. In accordance with some example embodiments of this disclosure, a submitting user can submit social media items or messages to a non-specific common Live Story. Such content is accessible to other users via a map-based graphical user interface, with such social media items or messages being accessible via the map GUI based on a respective location indicated by corresponding geo-tag data, either by forming part of a location-based gallery or story, or by such other users using location-based search mechanisms forming part of the map GUI.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus). In some embodiments of this disclosure, a message uploaded to a Live Story or Our Story generally, without the user specifying a particular location story in which the message is to be included, can automatically or semi-automatically be included in a location story based at least in part on geo-tag data of the message.

A map tile table 320 stores multiple map tiles that can be used for presenting a map in a map viewport of a map-based GUI, according to some embodiments of this disclosure. In a particular example embodiment, each map view is composed of 9 or 16 map tiles stitched together. A plurality of sets of map tiles may be maintained for different map zoom levels. In some example embodiments, a superset of map tiles is maintained server-side, being forwarded to a requesting client device 102 for composing a map representation of specific requested areas.

A user location table 326 stores current or most recent user location data for multiple users of the social media application. The user location data may be based on location data received from respective client devices 102 associated with the respective users. Such user location data is in some example embodiments used to display in a map-based GUI respective locations of a plurality of users who form part of the social network of the requesting user and/or who have provided permission for the requesting user to view their locations. Each such user may be represented on a map forming part of the map GUI by a respective user icon or bitmoji.

Figure 4:
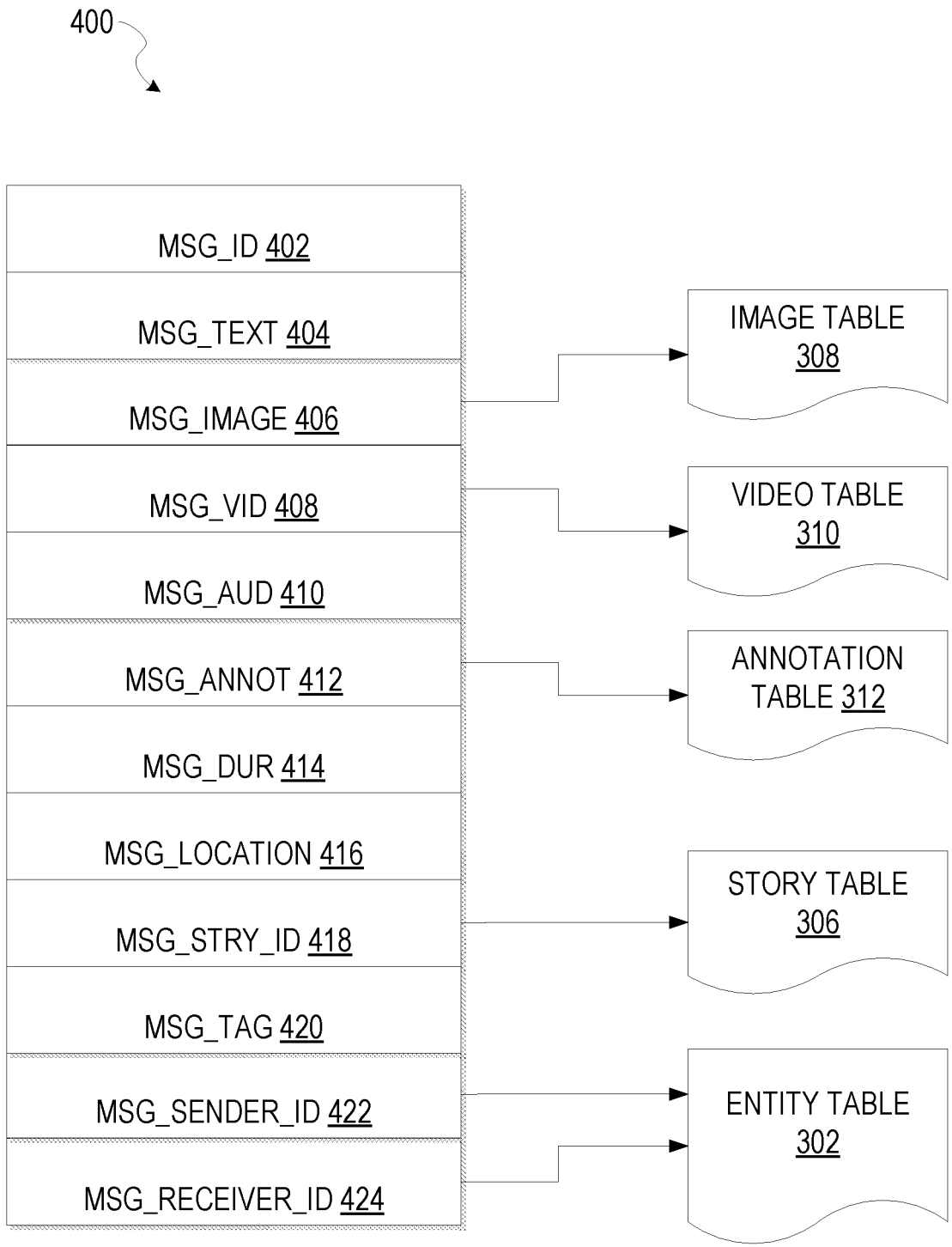
FIG. 4 is a schematic diagram illustrating a structure of a message, according to some embodiments, generated by a social media client application according to example embodiments.

FIG. 4 is a schematic diagram illustrating a structure of a social media item or message 400, according to some embodiments, generated by one instance of the social media client application 104 for communication to a further instance of the social media client application 104 or to the social media server application 114. The content of a particular message 400 is used to populate the message table 314 stored within the database 120, accessible by the social media server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotation 412: annotation data (e.g., filters, stickers, or other enhancements) that represents annotations to be applied to the message image payload 406, message video payload 408, or message audio payload 410 of the message 400.

A display duration parameter 414: a parameter value indicating, in seconds, the amount of time for which content of the message (e.g., the message image payload 406, message video payload 408, and message audio payload 410) is to be presented or made accessible to a user via the social media client application 104. The display duration parameter 414 is also referred to herein as a "display duration timer."

A message geolocation parameter 416: geolocation data or geo-tag data (e.g., latitudinal and longitudinal coordinates) associated with the content payload of the message 400. Multiple message geolocation parameter 416 values may be included in the payload, each of these parameter values being associated with respective content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values. An example of such a message story identifier 418 can in some embodiments comprise one or more thumbnail images.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotation 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
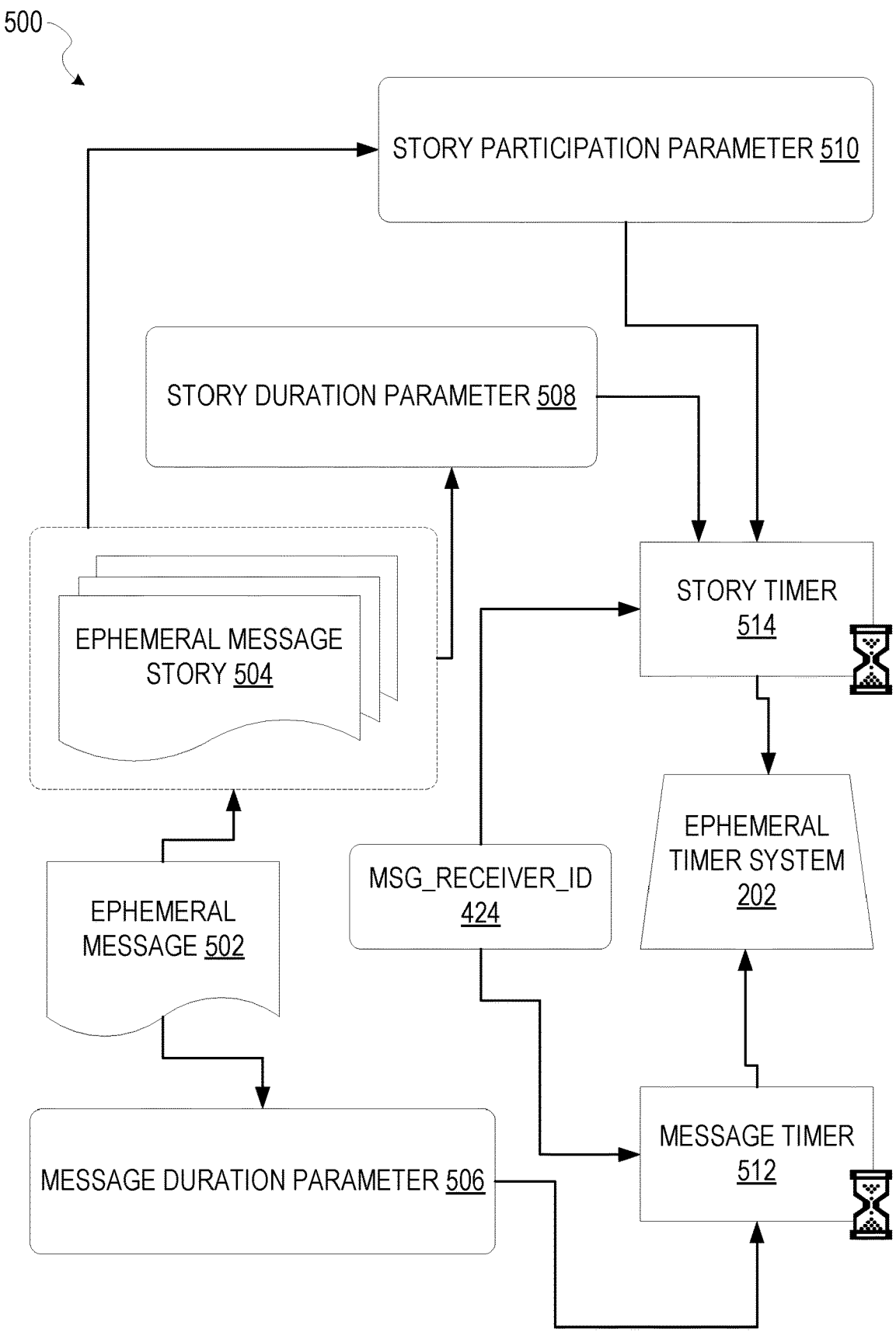
FIG. 5 is a schematic diagram illustrating an example access-limiting process, in terms of which access to content (e.g., an ephemeral message, and associated multimedia payload of data) or a content collection (e.g., an ephemeral message gallery or story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a display duration parameter 506, the value of which determines an amount of time that the ephemeral message 502 will be displayed to a receiving user of the ephemeral message 502 by the social media client application 104. In one embodiment, where the social media client application 104 is a SNAPCHAT client application, an ephemeral message 502 is viewable by a receiving user for up to a maximum of 10 seconds, depending on the amount of time that the sending user specifies using the display duration parameter 506. In some embodiments, the system automatically attaches a default display duration parameter 506 to photographic or still-image messages, e.g., having a default display duration of 5 seconds. The display duration parameter 506 of video-based messages may automatically correspond to the duration of the underlying video, with an automatically enforced upper limit. Thus, in an example embodiment in which an upper limit of 10 seconds is enforced, a 7-second video message will have a display duration parameter of 7 seconds.

The display duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the display duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within a social media gallery in the form of an ephemeral message story 504 (e.g., a personal SNAPCHAT story, or an event story). The ephemeral message story 504 has a story duration parameter 508, a value of which determines a time duration for which the ephemeral message story 504 is made available and is accessible to users of the social media platform system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504. In some embodiments, the story duration parameter 508 is determined based at least in part on respective story participation parameters 510 (or lifetimes) of one or more of the ephemeral messages 502 forming part of the particular ephemeral message story 504. In one example embodiment, the story duration parameter 508 corresponds to a story participation parameter 510 or lifetime of a last-posted one of the ephemeral messages 502 in the relevant ephemeral message story 504. In such a case, the ephemeral message story 504 expires (e.g., by becoming unavailable for viewing via the social media platform) when the last-posted ephemeral message 502 therein expires (e.g., when a story participation parameter 510 or lifetime of the last ephemeral message 502 expires).

As alluded to above, each ephemeral message 502 within the ephemeral message story 504 has an associated story participation parameter 510 (also referred to herein as a "gallery participation parameter" or a "gallery participation timer"), a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, first, whether a particular ephemeral message 502 of the ephemeral message story 504 will be displayed to a particular receiving user, and, if so, for how long. Note that the ephemeral message story 504 is also aware of the identity of the particular receiving user as a result of the message receiver identifier 424.

Accordingly, the story timer 514 in some embodiments operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a respective display duration parameter 506 may still determine the duration of time for which a particular ephemeral message 502 is displayed to a receiving user upon replay of the ephemeral message 502, even within the context of the ephemeral message story 504. Accordingly, the display duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508. Note that in this disclosure, at least some ephemeral messages 502 may be submitted by the user to the social media application for general or public viewing via the map-based GUI, without being included by the user in any particular event gallery and without being included in any location-based gallery represented by a respective gallery icon on the map GUI. Such ephemeral messages 502 in some embodiments also have respective story participation parameters 510 specifying time periods for which the ephemeral messages 502 are accessible via the map GUI as part of a collective Live Story or Our Story, as described with reference to specific example embodiments below. In a particular example embodiment, each ephemeral message 502 thus submitted for public or non-private view has a default gallery participation parameter or story participation parameter 510 of 24 hours. Such ephemeral messages 502 are thus viewable via the map GUI for only 24 hours after submission.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the social media platform system 100 (and, for example, specifically the social media client application 104) to cause an indicium (e.g., an icon) associated with the relevant ephemeral message story 504 to no longer be displayed within a user interface of the social media client application 104. Similarly, when the ephemeral timer system 202 determines that the story participation parameter 510 for a particular ephemeral message 502 has expired, the ephemeral timer system 202 causes the social media client application 104 to no longer display an indicium (e.g., an icon or textual identification) associated with the ephemeral message 502.

Example Embodiments of Map GUI Functionality

First, various aspects and features of the disclosure will be described conceptually with respect to specific example embodiments discussed with reference to and illustrated in FIGS. 6A-11B.

Basic Map GUI Architecture

Figure 6A:
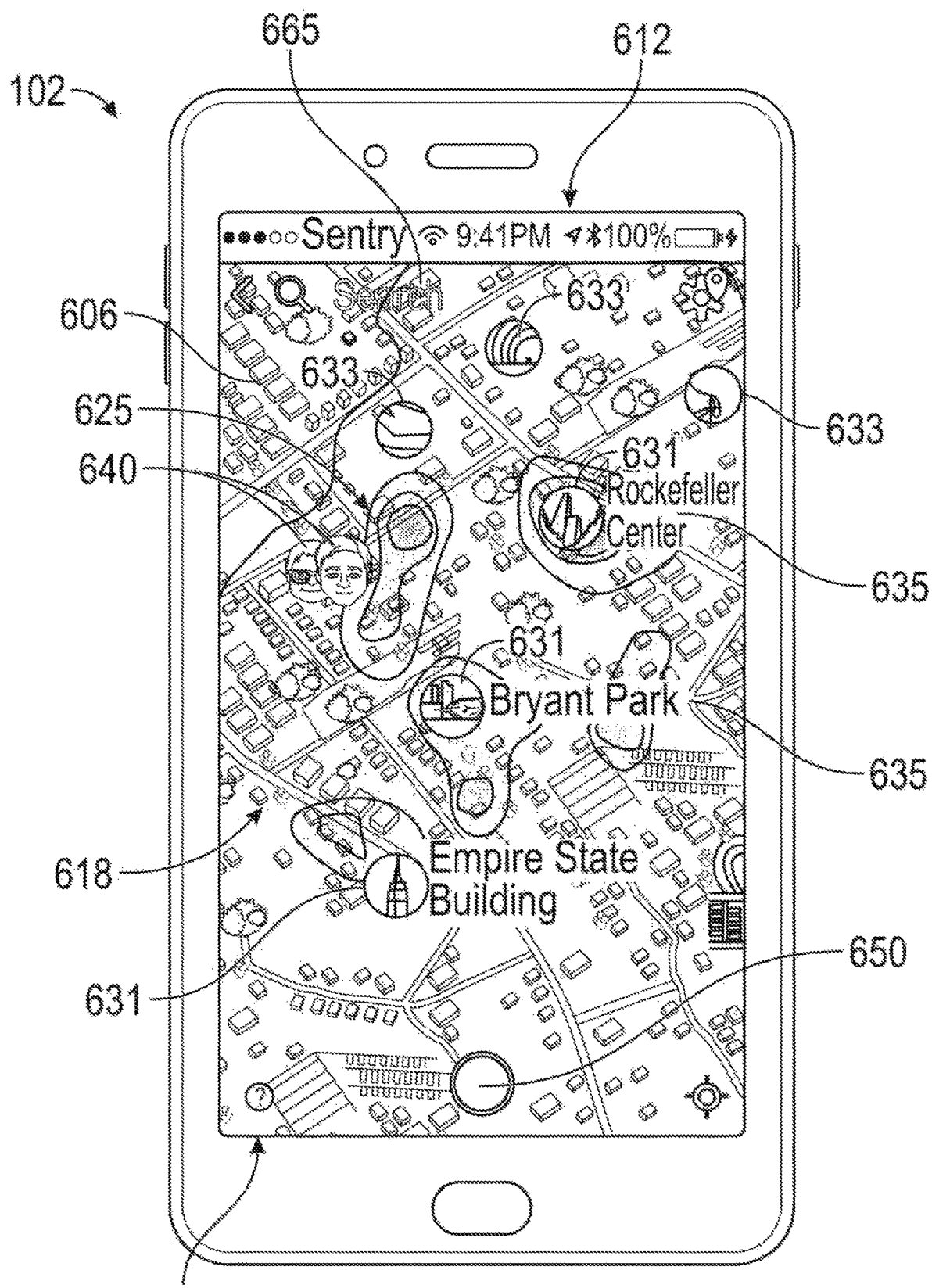
FIGS. 6A and 6B are respective schematic views of a client device providing a map-based graphical user interface for a social media application, according to different respective example embodiments.

FIG. 6A shows an example embodiment of a map-based graphical user interface, further referred to as a map GUI 612, displayed on a client device 102 in the example form of a mobile phone. In this example embodiment, the map GUI 612 is generated on a display in the form of a touchscreen 606 capable of receiving haptic input. The map GUI 612 includes an interactive map 618 showing a stylized aerial or satellite representation of a particular geographical area. The map 618 is displayed within a map viewport 621 which, in this example embodiment, uses the full available area of the touchscreen 606. In other example embodiments, the map viewport 621 may be a bounded panel or window within a larger display screen. The map GUI 612 further comprises a plurality of user-selectable graphical user interface elements displayed at specific respective geographic locations on the map 618. Each such geo-anchored GUI element is in this example embodiment represented by a respective indicium or icon overlaid on the map 618. The different types of icons and their respective functionalities will be described in greater detail below. As will also be described briefly, the map GUI 612 may further include one or more informational overlays rendered over the underlying geographical map 618, in this example embodiment including a heatmap 625 representative of the geographical distribution of underlying social media activity on the social media platform provided by the relevant social media application.

As mentioned, the map GUI 612 includes a number of different user-selectable icons or UI elements that indicate different geographically based content or information. In this example embodiment, the map GUI 612 includes a plurality of different gallery icons, also referred to in this description as "story icons." Each story icon corresponds in location on the map 618 to a respective location-based social media gallery or collection, in this example embodiment corresponding to a location-based story of ephemeral messages in the example form of so-called "snaps," as discussed elsewhere herein. Each of these stories that are represented by respective story icons on the map 618 consists of a respective set of snaps (respectively comprising augmented or unaugmented photographic or video content) that are grouped together based at least in part on respective geo-tag data associated with respective snaps.

In the example embodiment of FIG. 6A, the map GUI 612 includes two different types of gallery icons for two different respective types of location-based social media galleries, namely place icons 631 for place galleries/stories, and spike icons 633 for spike galleries/stories that are dynamically surfaced on the map GUI 612 based on one or more metrics of underlying social media activity relating to the submission of social media items/snaps to the social media platform with geo-tag data indicating the respectively associated geographical areas. Note that these different types of galleries are represented by different types of icons 631, 633. The differences between these different types of galleries and the corresponding visually distinct gallery icons 631, 633 are discussed later herein. The map GUI 612 in this example embodiment further includes friend icons in the example form of bitmojis 640 that are displayed on the map GUI 612 based on the current or last known geographic location of respective friends of the user associated with the client device 102.

Message and/or Story Ephemerality

In this example embodiment, the social media items that are selectively playable by selection of the corresponding story icons 631, 633 in the map GUI 612 are ephemeral social media items or messages. As described previously, ephemeral content is social media content (e.g., augmented and/or unaugmented video clips, pictures, and/or other messages) that is available for viewing by social media users via the map GUI 612 for only a predetermined limited period, also referred to herein as a respective gallery participation parameter or timer. After expiry of a respective gallery participation parameter or timer for any ephemeral message or snap uploaded by a particular user, that ephemeral message or snap is no longer available for viewing by other users via the map GUI 612 generated on their respective client devices 102. Current examples of such ephemeral social media content include the respective snaps or messages included in so-called "stories" in the SNAPCHAT or the INSTAGRAM social media applications.

Instead of, or in addition to, management of ephemerality on a per-snap level using respective gallery participation timers, availability of the ephemeral messages by the map GUI 612 can in some instances be managed collectively, e.g., on a per-story level. In such instances, each story can have a respective story duration parameter 508 (e.g., being based on a corresponding story timer 514—see FIG. 5), at the expiry of which availability of the corresponding story for viewing via the map GUI 612 is terminated. In some embodiments, the story duration parameter 508 is calculated based on the story participation parameter 510 of one of the ephemeral messages included in the relevant story. For example, a story may in some embodiments expire when a last uploaded item within the story expires, in response to which the corresponding story icon 631, 633 is no longer displayed on the map GUI 612. In one example embodiment, the map GUI 612 may include one or more event icons (e.g., similar in appearance to the place icons 631 of FIG. 6A) corresponding to respective event stories, with the story duration parameter 508 of the event story being set to expire a predetermined period of time from the start or conclusion of the underlying event. At expiry of the story duration parameter 508, the corresponding gallery icon 631, 633 is removed from the map GUI 612, irrespective of individual timers associated with respective snaps included in the event story.

Story Playback

The user can select any one of the gallery icons 631, 633 by haptic contact with the touchscreen 606 at the on-screen location of the selected gallery icon 631/633. In response to such selection, automated sequential playback of the corresponding set of ephemeral messages or snaps in the selected story is performed by the client device 102 on the touchscreen 606. Such automated sequential playback of the selected story consists of:

displaying on the touchscreen 606 the content or media payload of a first one of the ephemeral messages for a corresponding display duration (e.g., a default value of five seconds for photo-based messages and a maximum value of 10 seconds for video-based snaps), in this example embodiment temporarily replacing the map GUI 612 on the touchscreen 606 with a full-screen replay of the relevant snap;

at expiry of the display duration, displaying the content of the next snap/message for its display duration; and thus progressing in sequence through all of the ephemeral messages in the selected story until all of the snaps in the story have been replayed or until the user selectively dismisses the playback sequence.

In some embodiments, not all of the snaps in a particular story/gallery are necessarily included in the replay sequence. For example, if there are many overlapping snaps (e.g., snaps showing substantially identical content), some of those snaps are automatically skipped to keep a continuous narrative and not repeat some sections of an event commonly captured by the different snaps. Instead, or in addition, the social media server application 114 can in some embodiments be programmed automatically to identify and curate overlapping or contemporaneous snaps based on timestamp information associated with respective snaps.

In this example embodiment, the snaps automatically collected together in a replayable spike story or place story are arranged automatically to be played back in chronological order based on respective timestamps (e.g., being played in sequence from oldest to newest or earliest posted to most recently posted). A benefit of such chronological playback is that viewing of the story provides a user with sequentially arranged views of events transpiring at the relevant location. In some instances, however, a human curator may choose to rearrange snaps out of chronological order, for example to improve the narrative flow of the story. In other embodiments, the snaps may be played in reverse chronological order, from newest to oldest.

It can thus be seen that the example map GUI 612 includes multiple location-based gallery icons in the example form of story icons 631, 633 that are user-selectable to trigger playback of respective collections of ephemeral social media items, in this example embodiment being respective ephemeral stories consisting of respective sets of ephemeral messages (also referred to in this description as "snaps"). In this example embodiment, each of the plurality of location-based stories represented by the respective story icons 631, 633 may comprise media content contributed by multiple different users.

Our Story and Publication of Ephemeral Messages to Our Story

The respective ephemeral stories are in this example embodiment compiled from ephemeral messages submitted by multiple users based at least in part on geo-tagging of the respective snaps. Note that the ephemeral messages made available for viewing via the map GUI 612 are in this example embodiment not limited to content provided by other users who are members of an in-application social network of the user on whose client device 102 the map GUI 612 is generated. Instead, the social media content to which the map GUI 612 allows access is in this example embodiment provided by snaps uploaded or submitted by any user to be publicly accessible via the map GUI 612.

Figure 7A:
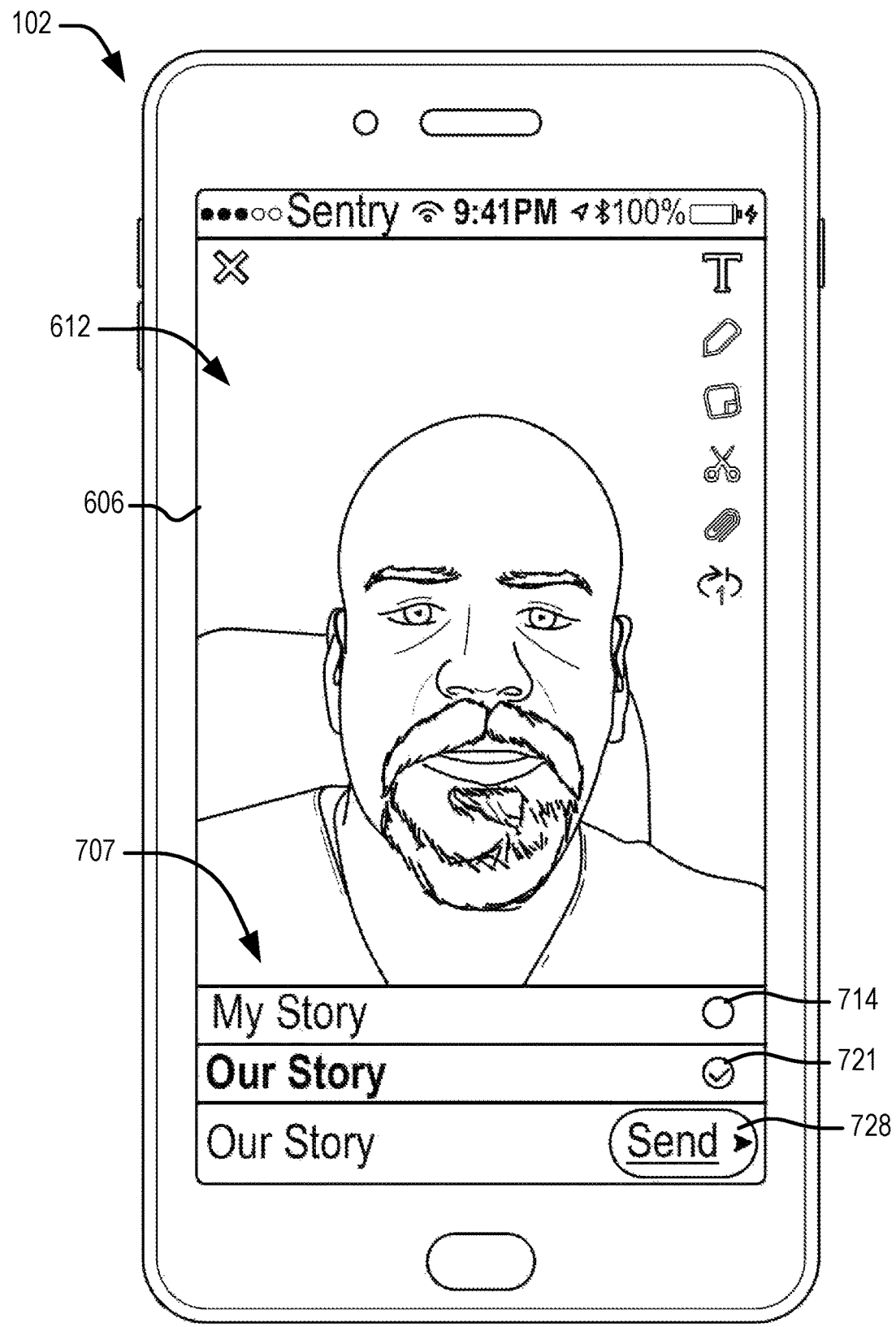
FIGS. 7A-7C are respective schematic views of a client device providing a destination selection interface forming part of a map-based graphical user interface for a social media application, according to some example embodiments.

One aspect of the example map GUI 612 provides for the functionality for users to submit social media content that is publicly viewable via the map GUI 612. Turning briefly to FIG. 7A, therein is shown an example embodiment of a destination selection interface 707 forming part of the map GUI 612 to provide a mechanism that gives the user a selectable option to make a snap publicly viewable via the map GUI 612 upon capturing of the snap.

In this example embodiment, snaps can be captured via the map GUI 612 while the map viewport 621 is displayed (as seen in FIG. 6A) by operation of a camera soft button 650 (FIG. 6A) forming part of the map GUI 612. After capturing of photo or video content by operation of the camera soft button 650, the captured media content is displayed on the touchscreen 606 (FIG. 7A) together with the destination selection interface 707. In this example embodiment, the user can select one or both destination options identified in FIG. 7A as "My Story" and "Our Story," represented in FIG. 7A by respective radio buttons 714, 721. By selecting the Our Story radio button 721 and thereafter selecting a "Send" soft button 728, the user can submit the snap over the network 106 to the application server 112 with an indication that the snap is available for non-private publication via the map GUI 612. If the snap is not so marked by the user, for example being associated with selection of the My Story radio button 714 only, then the snap is not available for inclusion in any of the stories associated with the story icons 631, 633 and is not available for inclusion in search results of a location-based search via the map GUI 612, as described later herein. Snaps included only in the My Story gallery are available only to friends of the user (e.g., members of the uploading user's social network). The My Story gallery is a per-user location-agnostic gallery of ephemeral messages available to friend users only, thus being a non-public or private gallery.

In other example embodiments described herein, the superset of ephemeral messages made available by multiple users for public viewing via the map GUI 612 is alternatively referred to as the "Live Story" or simply as a "Live" gallery. For the purposes of the description of example embodiments herein, "Live Story" and "Our Story" are thus to be read as being synonymous. In the present example embodiment, the compilation and/or surfacing of gallery icons 631, 633 and the rendering of the heatmap 625 are based exclusively on publicly available social media content provided by snaps uploaded to Our Story. Calculation of metrics or attributes of social media activity upon which one or more aspects of the map GUI 612 are based (e.g., an unusualness or anomaly metric indicating geo-temporal unusualness or anomaly of social media activity within respective geographical areas) is in this example embodiment likewise based exclusively on snaps uploaded to Our Story.

Visual Distinctions Between Story Icons for Different Story Types

Returning now to the visual distinctions or differences between the different types of gallery icons 631, 633, it will be noted that each gallery icon 631/633 in this example embodiment comprises a circular graphical user interface element bearing a thumbnail image provided by the one of the snaps contained in the respective story. Each place icon 631, however, also includes an associated label 635 bearing a text indication of the associated place. In this example embodiment, the labels 635 indicate the respective places of the place stories surfaced in the geographic window presently displayed in the example map 618 as being the Rockefeller Center, Bryant Park, and the Empire State Building, respectively.

Figure 6B:
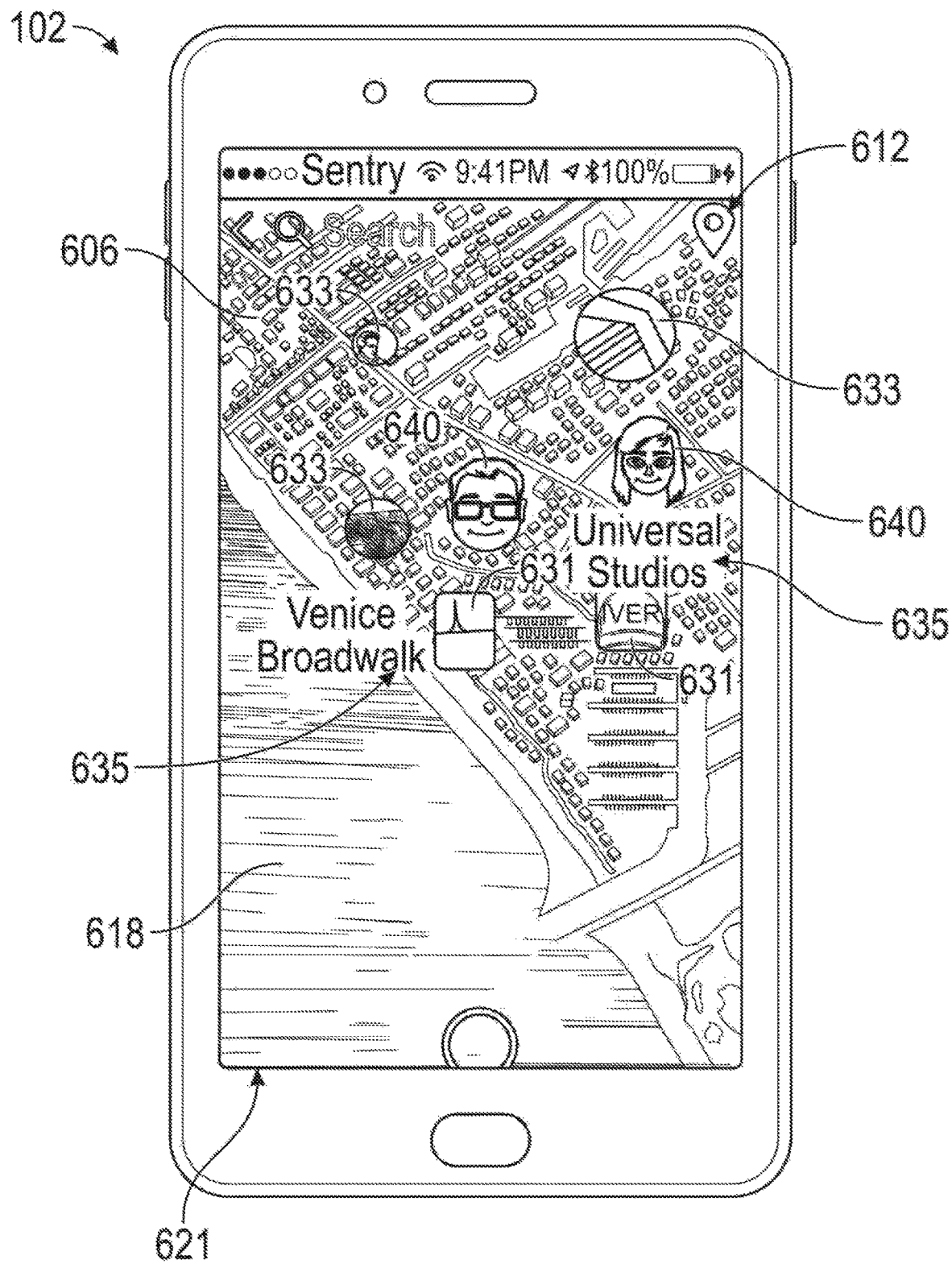

In other example embodiments, the visual distinctions between different types of story icons may be provided in a different manner. FIG. 6B, for example, shows another example embodiment of a map GUI 612 that is analogous to the example embodiment of FIG. 6A, a major difference being that the visual distinction between place icons 631 and spike icons 633 is provided at least in part by differently shaped thumbnail images. In the example of FIG. 6B, the thumbnails of the place icons 631 are rectangular, while the thumbnails of the spike icons 633 are circular.

The respective thumbnail images that are used for the spike icons 633 are in the example embodiments of FIGS. 6A and 6B automatically selected by the social media server application 114. In this instance, the thumbnail image for a spike icon 633 is automatically selected based on the posting time of the respective snaps forming part of the corresponding spike story, in this case being selected as a most recently posted snap in the relevant story. In other embodiments, automatic selection of the thumbnail image to be used in the spike icon 633 can be based on selecting the earliest-posted ephemeral message/snap that is still available for viewing as part of the spike story. The thumbnail images for the place icons 631 (or for icons associated with other curated stories, such as event stories) can in some embodiments likewise be selected automatically. In this embodiment, however, the thumbnail images for the place icons 631 can be selected from the snaps included in the corresponding story/gallery by a human operator via a content management interface forming part of the social media server application 114. Absent such an explicit designation of a particular snap to be used for the thumbnail image, thumbnail selection may revert to an automatic default selection as described previously.

Differences Between Different Story Types

Place Stories

Returning to FIG. 6A, the differences between the different types of social media galleries or stories accessible via respective story icons 631, 633 on the map GUI 612 will now be briefly discussed.

Place stories, represented by respective place icons 631, are social media galleries for defined locations or places, typically being places that consistently have relatively large activity volumes (e.g., Times Square, Universal Studios, etc.). Note that, in this example embodiment, not all defined places are by default surfaced in the map GUI 612 by respective place icons 631. Instead, the geo-anchored place stories are surfaced based on the amount of activity (e.g., the raw number of uploaded snaps) captured within a defined geographical area associated with the relevant place, as indicated by associated geo-tag data. This ensures that places that regularly or always attract relatively large volumes of snaps are identified as such on the map 618.

Figure 12:
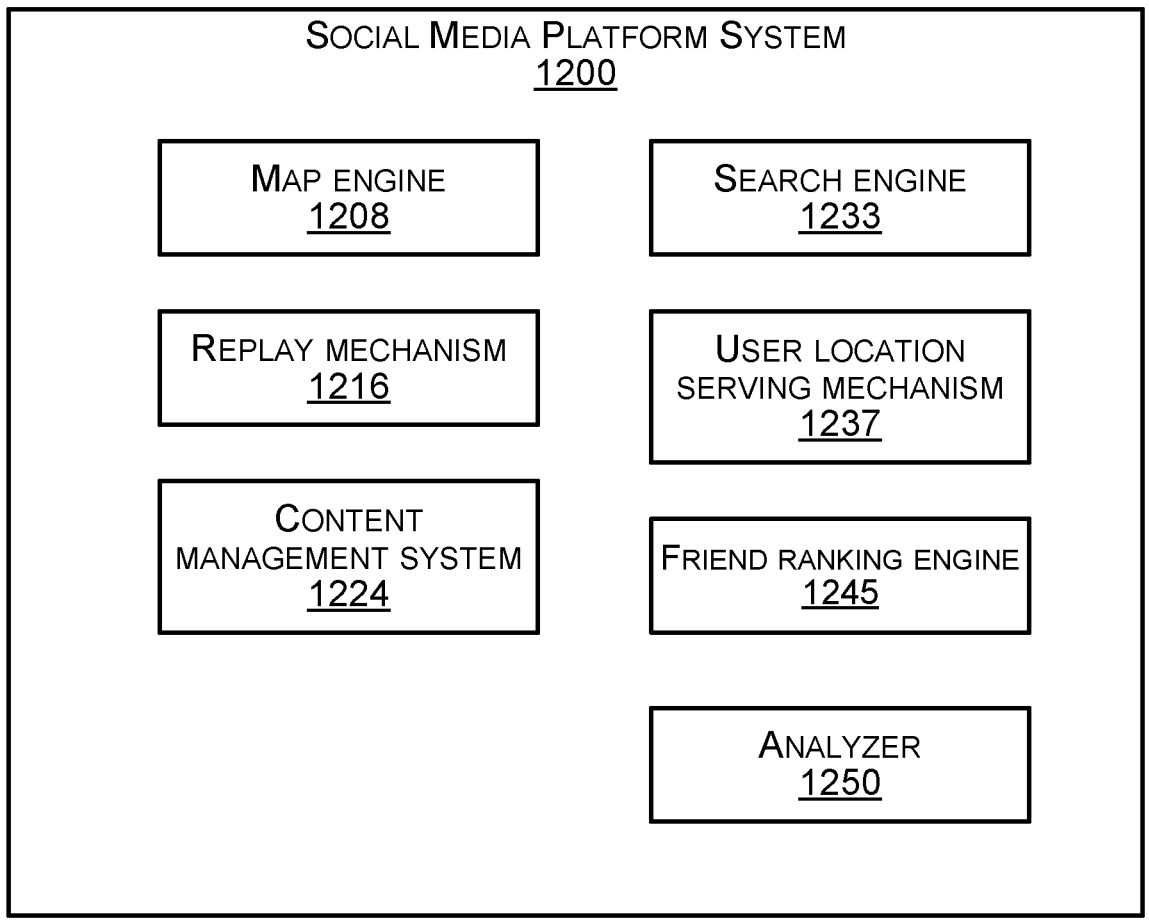
FIG. 12 is a schematic view of a social media platform system for providing a map-based graphical user interface for a social media application, according to one example embodiment.

Defined places for which place icons 631 may be surfaced in the map GUI 612 are in this example embodiment manually created by one or more human operators using a server-side gallery management system or content management system (CMS) 1224 provided by a server-side social media platform system 1200 (FIG. 12). In this example embodiment, each defined place has:

(a) an associated operator-defined polygon marking its geographical boundaries, that specify a particular geographical area for the place story;

(b) a thumbnail location or icon location, typically lying within the associated polygon, that specifies the on-map position at which the place icon 631 for a gallery or story associated with that place is displayed in the map 618; and (c) a name by which the place is identified. In the example embodiment of FIG. 6A, this is the name that is displayed on the associated label 635 of the place icon 631.

In other embodiments, such places and associated place stories are automatically identified by historical snap volume. In some such embodiments, the defined places and their associated stories/galleries are created and curated automatically by server-side procedures.

In some instances, each place story includes all of the snaps having geotag information indicating a geographic location lying within the associated polygon. Selection of a particular place icon 631 (e.g., by clicking in a desktop application or by tapping on the touchscreen 606 in the example embodiment of FIG. 6A) in such cases plays all the snaps from within the corresponding polygon. In this example embodiment, the CMS 1224 provides functionality to operators or administrators to curate the collection of snaps associated with any operator-selected defined place (e.g., a particular geographical area defined by the corresponding polygon). The operator or one or more automated procedures can thus, for example, delete individual snaps from the place story, or can select individual snaps for inclusion in the place story.

When snaps are played in response to selection of a place icon 631, the name of the place appears on-screen together with the replayed content or payload of the respective snaps. As mentioned, in this example embodiment, the snap represented by a corresponding thumbnail within the relevant place icon 631 is played first, then the rest in time order.

Spike Stories

The unlabeled circular spike icons 633 are automatically surfaced for geographical areas of unusually high activity, with the respective associated spike stories or ad hoc galleries including unexpired snaps within the associated geographical area. In the example embodiment of FIG. 6A, all ad hoc galleries associated with spike icons 633 are unmoderated, so that selecting a spike icon 633 triggers automated sequential replay of all of the snaps within a geographical area associated with the spike icon 633. In a particular example embodiment, the geographical area associated with the spike icon 633 includes all geographical points located within a predefined radius of the on-map location of the selected spike icon 633.

Thus, clicking or tapping on the spike icon 633 plays all the snaps in that cluster, showing the snap in the thumbnail first and then the rest of the snaps in time order. Note, again, that the snaps clustered under the common spike icon 633 are in this example uploaded by multiple different respective social media users to Our Story, and are uncurated by moderators. In other embodiments, the stories collected under such spike thumbnails may be curated.

Automated selection of spike icons 633 (and therefore of the associated social media gallery, collection, or story) for surfacing in the map GUI 612 is in this example embodiment based at least in part on calculation of respective anomaly or unusualness metric values for different geographical areas. Thus, a higher level of unusualness or anomaly of user activity in a particular geo-temporal space would in such instances increase the likelihood of a particular spike story being surfaced on the map GUI 612 by display of a corresponding spike icon 633. As mentioned, the anomaly metric provides an indication of the level of geo-temporal unusualness or anomaly of social media activity. Calculation of anomaly metrics can in some embodiments comprise calculating a level or percentage of difference between historical activity levels in a given area, and activity levels in a current time window. It will be appreciated that heat map coloration and content surfacing increases with an increase in positive anomaly levels (i.e., indicating unusually high social media activity). Also note that, in some embodiments, a social media activity metric upon which heat map generation and/or content surfacing is based on a combination of factors that include an anomaly metric. In a particular example embodiment, the social media activity metric is provided by a combination of a raw activity metric and an anomaly metric.

Instead, or in addition, human curators can, via the CMS 1224, also mark specific spike stories or clusters as "interesting," thereby boosting the unusualness or anomaly score of the respective spike.

Note that, in the example embodiment described with reference to FIG. 6A, different social media activity attributes or metrics are used for surfacing of the place icons 631 and the spike icons 633 respectively. As discussed, spike icons 633 are in this example embodiment surfaced based on anomaly metric values, while place icons 631 are surfaced based on raw snap volume. In other embodiments, surfacing of the place icons 631 may also be based at least in part on associated anomaly values. Note that in some embodiments, various aspects of social media surfacing as described herein (including heatmap calculation and generation, story surfacing, etc.) are based on attributes other than anomaly. For example, the heatmap 625 and story surfacing are in one embodiment based on raw activity levels. Therefore, discussion herein of aspects of the disclosure relating to informational overlays (such as the heatmap 625) and content surfacing based on the anomaly metric is to be read as, in other embodiments, being performed based on a different social media activity value, such as raw snap numbers in a given time period, snap frequency, snap density, or the like.

Other Types of Stories or Ephemeral Social Media Galleries

Other embodiments can instead, or in addition, provide for social media gallery types different from the place stories and the spike stories described with reference to FIGS. 6A and 6B. Each such different type of gallery may be represented on the map 618 by a visually distinct type of icon or other user interface element.

One example embodiment provides for event galleries pertaining to particular events occurring at a specific location. Such events can include, for example, concerts, festivals, sports events, or the like. These event galleries are in one embodiment created and curated server-side by human operators using the CMS 1224.

Some embodiments provide for surfacing on the map 618 story icons or thumbnails with respect to non-public snaps, e.g., snaps or stories that are access-restricted based at least in part on social network information. For example, individual stories uploaded by friend users may in some embodiments be represented on the map 618 by a respective icon or thumbnail. For example, the My Story of friend users may in some embodiments be directly accessible via the map 618. Such story icons are in some embodiments indicated by a respective friend icon or bitmoji 640 located on the map 618 corresponding to the location at which the corresponding story was generated. In other embodiments, each such user story icon may be indicated on the map GUI 612 by a circular thumbnail analogous to the previously described example story icons 631, 633.

Snap Submission to User-Selected Location-Based Stories

Another feature of the disclosure enables users to submit publicly viewable snaps designated for inclusion in any and all Live Stories or ephemeral galleries that might be happening at locations where the user is eligible to post, e.g., being geographically proximate to the current location of the user as indicated by the associated client device 102. In this manner, the user can specify snaps for inclusion in place stories, event stories, or other location-based ephemeral social media galleries as discussed above.

Figure 7C:
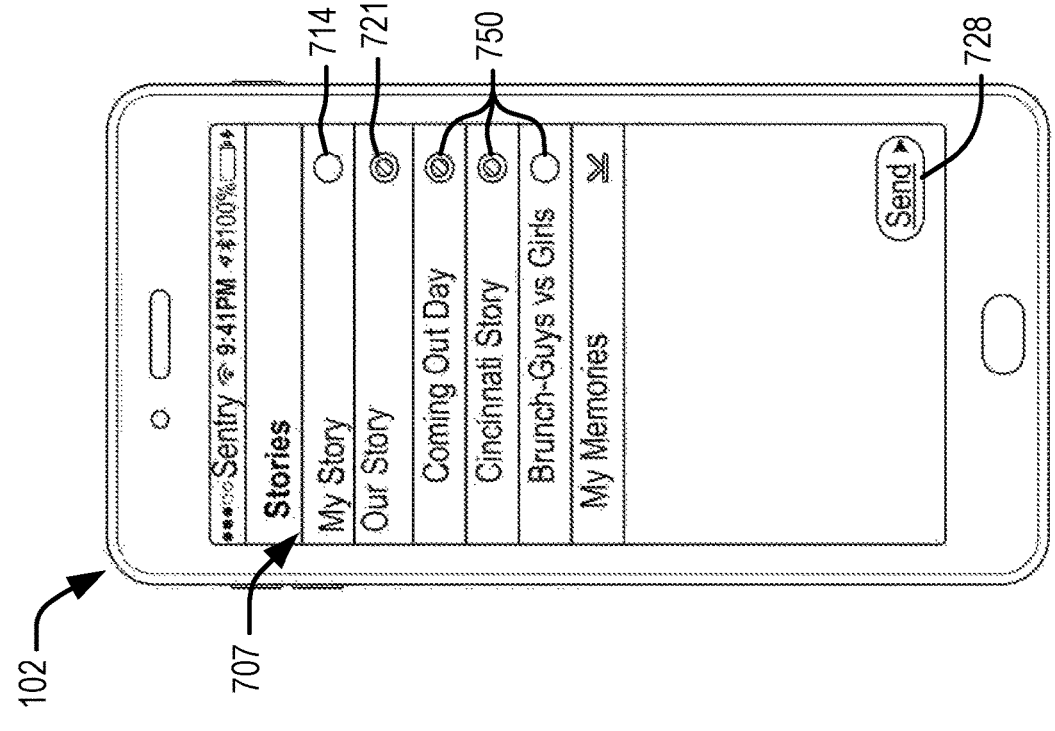
Figure 7B:
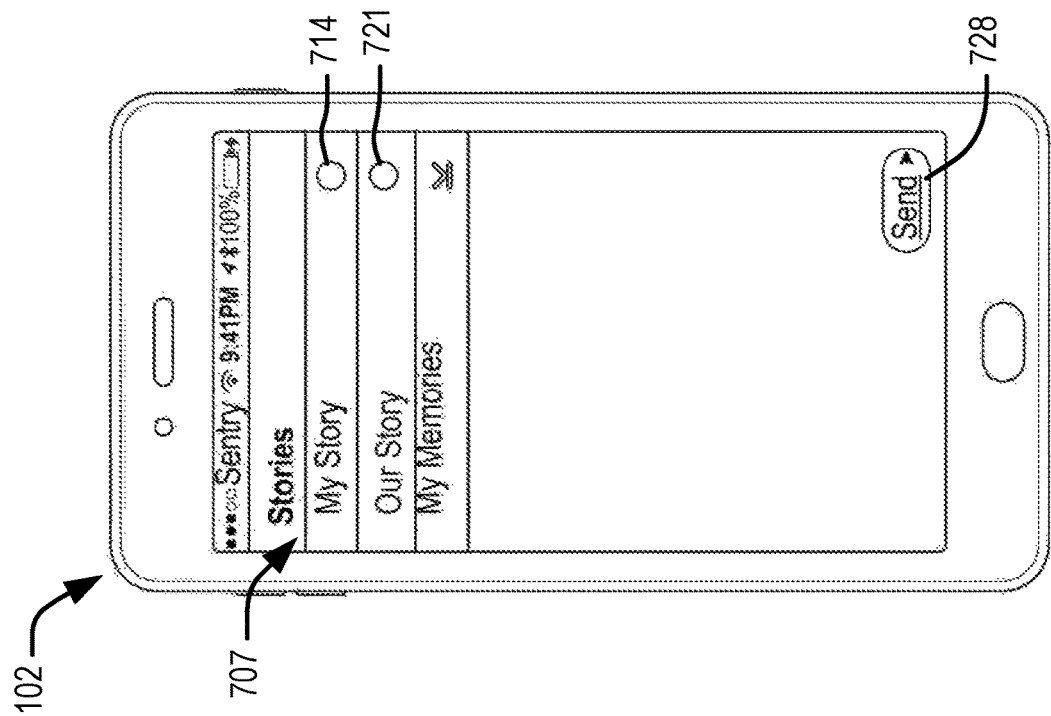

FIGS. 7B and 7C show an example embodiment of a destination selection interface 707 that provides a mechanism for such destination selection alternative to the example embodiment previously described with reference to FIG. 7A. The destination selection interface 707 of FIG. 7B is displayed on the client device 102 in response to the user initiating a snap submission flow, e.g., by capturing a snap.

The destination selection interface 707 of FIG. 7B is similar to that of the example embodiment of FIG. 7A, in that two different user-selectable user interface elements in the form of respective radio buttons 714, 721 are presented for posting a snap to a user-specific My Story (radio button 714) or to a publicly viewable Our Story (radio button 721). A distinction between the destination selection interface 707 of FIG. 7A and that of FIG. 7B is that the Our Story cell of FIG. 7B automatically expands upon selection of the radio button 721 to show subtitles of local place stories and/or event stories to which the snap could be submitted based on device location or the geo-tag of the associated snap.

FIG. 7C shows additional options presented as a result of selecting the Our Story radio button 721, which opens up a list showing the respective local stories for which the snap is eligible. In this example embodiment, all suboptions are selected by default via respective radio buttons 750. In other embodiments, separate selection of individual suboptions may be required. If the user chooses to submit the snap with all of the options selected, that snap is automatically associated with each of the selected suboptions as well as being made available for geographically based viewing as part of Our Story, separate from any curated location-based place or event gallery/story, as described above.

The user can deselect any particular suboptions by clicking or tapping on the corresponding default-selected radio button 750, as shown in FIG. 7C, in which the lowermost one of the suboptions has been deselected. If all suboptions are deselected, the snap is not posted to any curated location-based story, but is posted only to Our Story to be publicly viewable via the map GUI 612, as described elsewhere herein.

Heatmap Considerations

As shown in FIG. 6A, the social media application map GUI 612 in this example embodiment includes a heat map layer overlaid on the geographical map 618, thus providing the heatmap 625 that indicates geographical distribution of one or more attributes of user activity within the social media application. As discussed previously, the heatmap 625 indicates user activity levels with respect to posting geo-tagged content that is publicly viewable (e.g., Live Stories/Our Story). Instead, or in addition, the heatmap 625 can in some embodiments be based on snaps that are available for viewing by the particular user on whose client device 102 the map GUI 612 is displayed, in which case the heatmap 625 may differ from person to person depending on who gave the viewer permission to see their snaps.

In this example embodiment, the map 618 is color-coded, with warmer colors corresponding to higher levels of unusualness, as indicated by higher anomaly metric values. Thus, in the map 618 illustrated in FIG. 6A, the red areas of the heatmap 625 indicate those geographical areas with snap clusters corresponding to the highest anomaly metric values. Again, different metrics or attributes for generation of the heatmap 625 may be used in other embodiments, for example being based on snap density (e.g., raw snap volume per unit area of the map 618).

In some embodiments, the map GUI 612 displays information pertaining to the heatmap 625 differently at different magnification levels. For example, calculation of anomaly metrics and consequent rendering of the heatmap 625 based thereon is in some embodiments performed separately for each of a plurality of zoom levels. In addition, different sets of spike icons 633 may be surfaced at different magnification levels. In one example embodiment, the heatmap 625 may be displayed at a first zoom level without individual spike icons 633 surfaced in the map GUI 612, while multiple gallery or story icons 631, 633 are automatically surfaced in response to user-controlled zooming in on a particular portion of the map 618 shown at the first zoom level.

Anomaly Metric Calculation

Some features of the map GUI 612 in this example embodiment provide for calculating with respect to social media content an anomaly metric that quantifies geospatial anomaly or unusualness of the social media content, and for surfacing the social media content in the map GUI 612 based on respective values for the anomaly metric. In this example embodiment, respective collections of snaps associated with different geographical locations are ranked based at least in part on corresponding anomaly metric values, and a predetermined number of the collections are automatically selected based on their anomaly rankings for surfacing on the map GUI 612 with respective spike icons 633. Instead, or in addition, all spike stories with a positive anomaly metric value (i.e., reflecting anomalously high, not low, activity) higher than a predefined threshold value can automatically be surfaced by the display of a corresponding spike icon 633. As described elsewhere herein, the calculation and display of heatmap information is in some embodiments based at least in part on anomaly metric calculation.

Anomaly metrics may in some embodiments be calculated for individual social media items. In this example embodiment, however, anomaly metrics are calculated for collective user behavior. In particular, anomaly metrics are calculated for multiple snaps (in this example being respective geotagged social media submissions) based on a comparison between geo-temporal distribution of the multiple snaps and historic geo-temporal social media behavior in or around the relevant geographic location.

Note that the calculation of anomaly metrics is in this example embodiment time sensitive. Thus, the same volume of snaps in a particular location may be identified as being anomalous at one time of the day but not at another time. For example, a certain level of social media activity (here, posting of snaps to Our Story) at the Empire State Building would be flagged as above-threshold anomalous at 4 AM, but would not be thus identified as anomalous during daytime.

An aspect of the disclosure provides for determining one or more geo-temporal attributes of social media activity by a process comprising, for each of multiple social media postings, representing the posting as having a distribution in time and/or in space. In some embodiments, representing respective postings as having a geo-temporal distribution comprises treating respective social media items as a probability cloud, for example having a Gaussian distribution. Instead, or in addition, the method may comprise generating or extrapolating a historical model or historical representation of social media activity based at least in part on a resampling procedure executed with respect to a multiplicity of historical geo-tagged social media items. In one example embodiment, the resampling procedure comprises a bootstrapping operation.

In some embodiments, the representation of social media postings as having respective distributions in time and/or space is performed as part of an operation to represent a geo-temporal reference profile or model for historical social media activity for a particular geographical area. Instead, or in addition, the representation of social media postings as having respective distributions in time and/or space may be performed as part of a procedure to represent recent or near-live social media activity in the particular geographical area. In such cases, the geo-temporal reference profile and the representation of the recent or near-live social media activity may be used in combination to identify within the geographical area one or more regions of interesting or anomalous social media activity, e.g., by calculating a geographical distribution of a quantified anomaly metric based on differences between the geo-temporal reference profile and the corresponding representation of recent or near-live social media activity.

Dynamic Variation of Icon Size

Turning briefly to FIG. 6B, it will be seen that the map GUI 612 illustrated therein provides an example embodiment of an aspect of the disclosure that provides for automated variation in one or more visual attributes of user interface elements associated with respective social media content based at least in part on a quantified attribute of underlying social media activity. In particular, the example embodiment of FIG. 6B provides for dynamic variation in the on-screen size of respective spike icons 633 based on respective anomaly metric values for the corresponding clusters or spike galleries. On-screen size of the respective spike icons 633 thus indicates a level of unusualness or anomaly of the underlying social media activity. Worded differently, the size of a spike icon 633 represents how unusual it is for there to be the relevant amount of activity in that spot, with a larger spike icon 633 indicating a greater level of unusualness.

Instead, or in addition, a visual attribute (such as its on-screen size) of the place icons 631 may likewise be variable based on a corresponding anomaly value. In the example embodiment of FIG. 6B, however, the on-screen size of the place icons 631 is variable based on snap volume, with a greater number of snaps included in any place story corresponding to a larger on-screen size of the associated place icon 631. Thus, it is intuitively intelligible from the example screenshot shown in FIG. 6B that the Universal Studios story has a greater number of snaps than the Venice Boardwalk story.

Location Sharing and User Icons

User Location Display

As mentioned previously, the map GUI 612 includes a graphical representation of associated locations of the user associated with the client device 102 and/or other users, each user being represented by a respective user icon or friend icon (for users who are members of an in-application social graph associated with the viewing user), in the illustrated embodiments being in the form of respective bitmojis 640. In this example embodiment, a user of the social media platform will not be sharing their location if they have never interacted with the map GUI 612. The first time the user interacts with the map GUI 612, the user is taken through an on-boarding flow which allows for the setting of individual location sharing preferences.

Figure 8C:
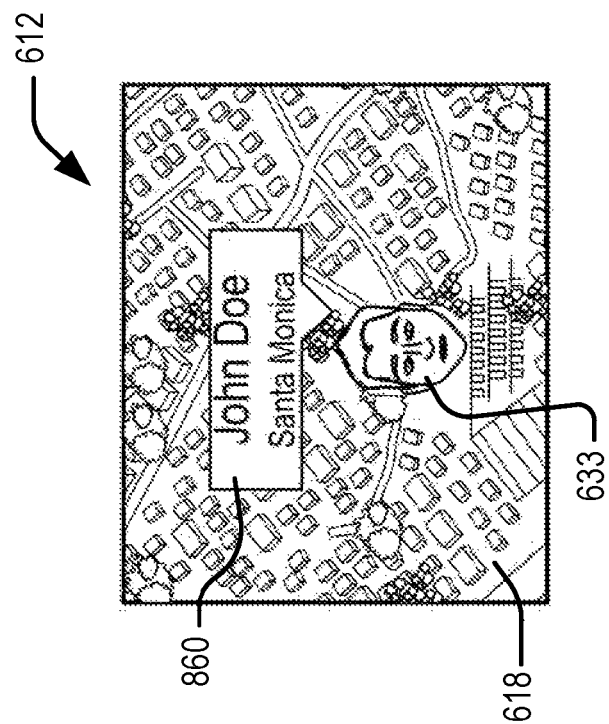
FIGS. 8A-8C are respective screenshots of a map-based graphical user interface, providing features relating to display of user icons in a map forming part of the interface, according to an example embodiment.
Figure 8A:
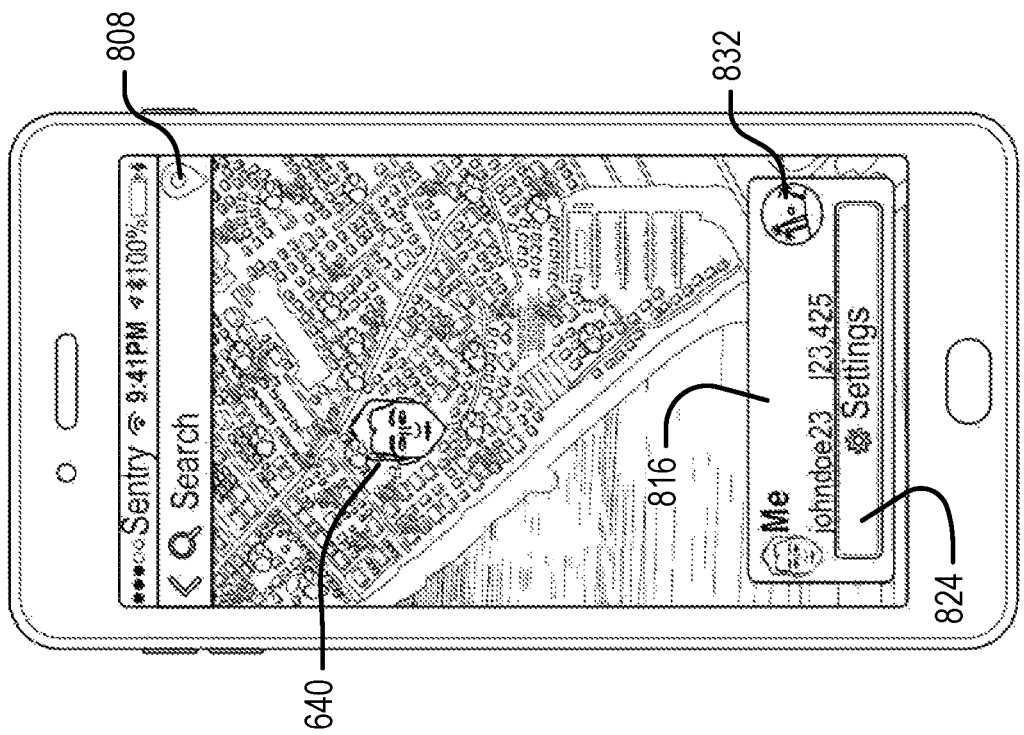

Regardless of whether the user has selected to show their location to anyone, the user can see their own current location on the map at all times, and, if the user's bitmoji 640 is no longer in view, snap back to it, causing the map focus to re-center on the user location. FIG. 8A shows an example embodiment in which the viewing user's location is indicated by a custom user-selected or user-generated user interface element in the form of the user's bitmoji 640.

Location sharing preferences can be changed from the graphical user interface of FIG. 8A. In this embodiment, changes to location sharing preferences can be affected by (a) entering an invisible mode in which the user's location is not visible by any other user (also referred to herein as Ghost Mode), and (b) changing default location sharing settings and/or respective settings for different friend users and/or groups of friend users.

Location sharing can be turned off or on from within the map GUI 612, thereby to enter or exit Ghost Mode. In this embodiment, Ghost Mode can be toggled on/off via a map pin icon 808 in the top right (see FIG. 8A). When location sharing is off (i.e., when in Ghost Mode), the user's location is no longer displayed in the map GUI 612 on other user's client devices 102. The user can still, however, see his/her location in the map GUI on his/her own device. When in Ghost Mode, a ghost icon (not shown) slowly pulses in the top right of the screen in replacement of the map pin icon 808.

Note that the Ghost Mode functionality described herein is to be distinguished from turning off location services on a mobile user device. Thus, when Ghost Mode is turned on, the device location services of the client device 102 are still functioning, so that the user location can still be determined and displayed on the map GUI 612 of the user's own device 102, with social media content captured in Ghost Mode still being geo-tagged.

When the user turns on Ghost Mode after previously being present on the map, the user's bitmoji 640 disappears within seconds from other people's maps. When in Ghost Mode, the user can still see anyone on the map who has chosen to share their location with the user.

If the user selects their own bitmoji 640, a user bubble or user panel 816 is launched at the bottom of the touchscreen 606, enabling the user to access location sharing preferences via a settings soft button 824. The user panel 816 further includes a location-agnostic collection icon in the form of a My Story icon 832. The My Story icon 832 is selectable to launch replay of the viewing user's My Story, being a location-agnostic collection of social media items (here, ephemeral snaps) submitted by the user. Analogous to other location-agnostic GUI features disclosed herein, location-agnostic in this context means that the collection of social media items playable via the My Story icon 832 is collated and displayed without regard to any location constraint, thus being unaffected by geo-tagging information associated with the respective items, by the user's current location, or by the current focus of the map 618.

Location Sharing Preferences

Selecting the settings soft button 824 causes display in the map GUI 612 of a location sharing preferences interface 840 (FIG. 8B) that, in this example embodiment, provides the user with options for specifying who will get to see their location, and at what granularity. Default sharing granularity options provided in this example embodiment include:

Precise, meaning in this embodiment is that the user's bitmoji 640 is displayed to friend users via their map GUIs 612 at the user's actual location (e.g., as indicated by the location services of the client device 102). In other words, the display location and the actual location for the user is substantially the same; and City, meaning that the display location of the user's bitmoji 640 will be different from the actual location, but will be located within a defined geographical region corresponding to the current actual location. In this example embodiment, the defined geographical region within which the user's location is displayed is at a city level (e.g., Venice, CA, London, etc.).

When the city option is selected for a particular group of users or for particular individuals, the user's bitmoji 640 will in this example embodiment be shown in the map GUI 612 generated on the user devices 102 of the selected persons (or persons within the selected group) at a random location within that city, and which will in this embodiment not change if the user does not leave that city. FIG. 8C shows an example of display of a user bitmoji 640 in the interactive map 618 of the map GUI 612 at such a city-level display granularity, in which the user bitmoji 640 is shown at the random location in the city, together with an associated label 860 specifying, broadly, the city in which the user is located (in the illustrated example embodiment being Santa Monica).

Note that the features related to intentionally inaccurate display of the user's location has the effect that the user's location is displayed differently on, the one hand, an instance of the map GUI 612 generated on their own device 102 (e.g., FIG. 8A, in which the display location of the user bitmoji 640 corresponds to the actual location of the user) and, on the other hand, instances of the map GUI 612 generated on the user devices 102 of friend users having a non-precise viewing permission (e.g., labeled city-level display such as that illustrated in FIG. 8C, in which the display location of the user bitmoji 640 differs from the user's actual location). In this example embodiment, the display location of the user bitmoji 640 at a non-precise regional level (e.g., at city-level) is the same across different friend user devices 102, so that different friends see the user bitmoji 640 as being displayed at the same random location. In other embodiments, the display location can be different for different friend users.

It will be seen that this aspect of the disclosure thus provides for a method comprising: determining a location of a user device associated with the user of a social media application; determining a user-selected location display setting that specifies a manner in which the user location is to be displayed on a map-based GUI displayed to other users of the social media application, the location display setting being selected from a predetermined set of location display settings that correspond to display of the user location at different respective levels of precision on the map-based GUI; and representing the user on the map-based GUI of the friend user by rendering a UI element associated with the user at a location on the map-based GUI in accordance with the selected location display setting.

Figure 8B:
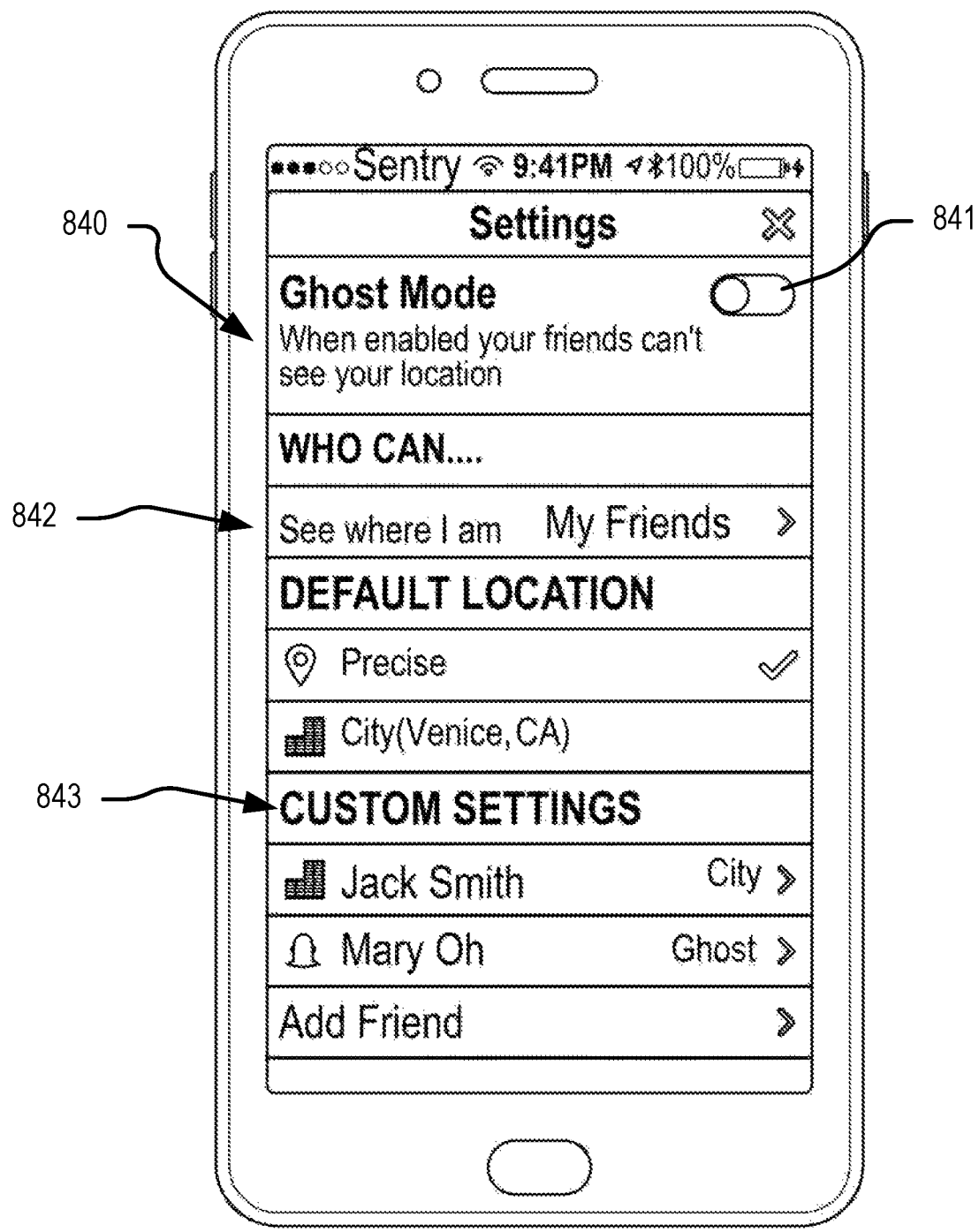

The defined geographic region is in the example embodiment of FIG. 8B as being available only at city level. In other embodiments, different or additional levels of display granularity can be provided, for example identifying different levels of cartographically and/or politically defined geographical regions, such as county-, city-, town-, or neighborhood level. Note that, in the example embodiment of FIG. 8B, Ghost Mode can not only be toggled at a general level (via a Ghost Mode toggle 841), but can be selected for groups of users or for individual friend users via a group selector 842 and a friend selector 843 respectively. In some embodiments, the displayed user location remains fixed at the randomly selected display position until the user device 102 leaves the defined geographic area. Thus, a new display location is in some embodiments determined each time the user enters the relevant area.

As mentioned, the user can also via the location sharing preferences interface 840 select different groups of other users to which his location will be displayed, and may in some embodiments specify different display attributes for the different respective groups or for different respective individuals. In this example, audience options available via the group selector 842 include: Best Friends, Friends, and Custom (which is an individual-level whitelist of people specified by the friend selector 843).

If Friends are selected, all new people added to the user's friends list will automatically be able to see their location, consistent with the granularity level selected in the group selector 842 (e.g., being selectable as precise or at city level in the group selector 842 of FIG. 8B). If they are already sharing with the user, they appear within seconds on the user's map.

In this example embodiment, the location sharing relationships are two-way—if John is sharing his location with Jack, Jack will not see John on his map 618 unless he has added him as a friend. The user cannot add anyone who is not a friend to the Custom section. The user can furthermore, via the friend selector 843 43, define more specialized permissions for specific people, which override the default setting When viewing the map GUI 612, the user will thus be able to see the locations of all his/her friends that have shared their location with him/her on the map 618. As discussed, each user is in this example embodiment represented by a bitmoji 640. If the friend does not have a bitmoji 640, a profile picture within a generic UI element is shown. If no profile pictures available for a particular friend, a default icon (e.g., a blank profile) is displayed at the corresponding location.

Friend-Level Access Via Friend Icon/Friend Carousel

In this example embodiment, friend-level access to friend information and friend-specific content is enabled via the interactive map 618. Such friend-level access is distinguished from location-based access mechanisms such as a location-based search or snap collections accessible via respective geo-anchored story icons 631, 633. One example of such a friend-level access mechanism is a friend bubble or friend panel 909 (FIG. 9A that pops up at the bottom of the screen when the user taps on the bitmoji 640 of a displayed friend. The friend panel 909 and a friend carousel 918 of which it forms part, provide a number of functionalities to the user.

Figure 9B:
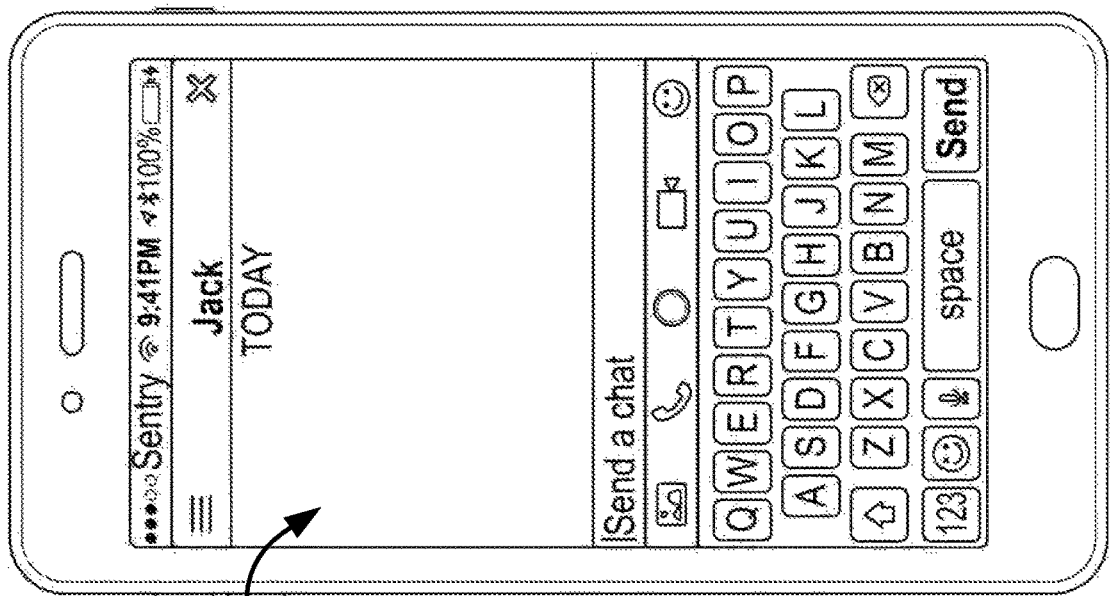
FIGS. 9A and 9B are respective screenshots of the functionalities of a map-based graphical user interface that provides access to a chat interface and to friend content via a friend icon displayed as part of the map, according to an example embodiment.
Figure 9A:
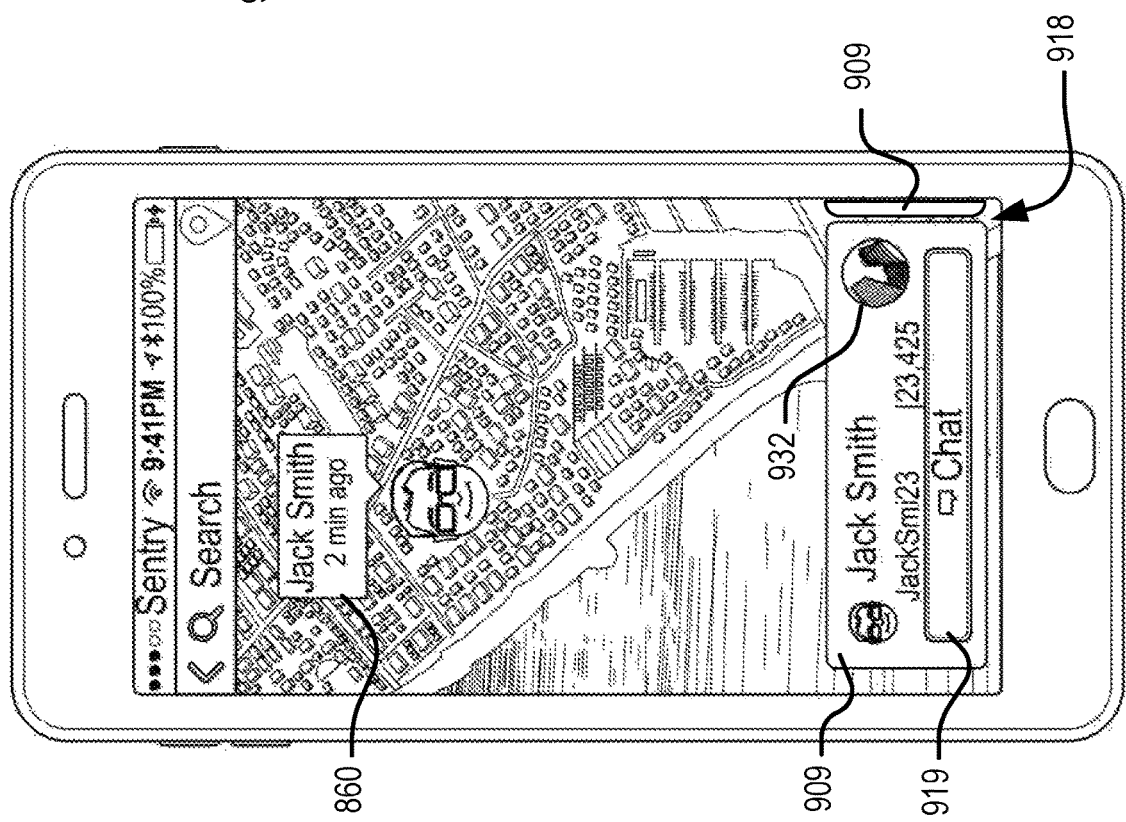

In the example embodiment of FIG. 9A, the friend panel 909 displays summary information about the user. As illustrated in FIG. 9A, the friend panel 909 forms part of a friend carousel 918 that enables the user selectively to switch focus between different friends. Note that, in addition to the main friend panel 909, the friend carousel 918 includes a next friend panel 909 whose left edge is exposed on the right-hand side of the touchscreen 606.

The user can swipe between friends on the map 618 via the friend carousel 918. In this example embodiment, switching between friends is achieved by swiping the current focus friend panel 909 left or right. Swiping left or right on the friend panel 909 brings into view the next or previous friend panel 909, as the case may be. In this example embodiment, swiping to a particular friend automatically centers the map 618 on the bitmoji 640 of that friend. Note that all of the friends for whom the user has viewing permission should be available as part of the friend carousel 918, not just those friends who are visible in the map viewport 621. Friends are in this embodiment ordered in the carousel by update recency.

The friend panel 909 also includes a chat soft button 918 that can be selected to launch a chat interface 950 (see FIG. 9B) in temporary replacement of the interactive map 618, but without leaving the map GUI 612. In other embodiments, tapping on the friend bitmojis 640 causes a fly-out menu to be displayed, with initiation of a chat session being one of the selectable options.

In this example embodiment, selection of the chat soft button 918 causes the chat interface 950 to pop up in a modal over the map 618, which modal can be swiped down to dismiss. Incoming chat notifications can be opened in this modal view.

The friend carousel 918 additionally provides location-agnostic access to social media content provided by respective friend users via the map GUI 612. In this example embodiment, such location-agnostic access is available via a location-agnostic collection icon in the form of a respective Friend Story icon 932 displayed in the friend panel 909. The Friend Story icon 932 is selectable to trigger replay of a corresponding story (in this example being that the My Story of the selected friend) comprising a series of snaps uploaded by the corresponding friend user, without any location constraint on the replayed material. In other words, no location information has any effect on the availability and identity of these snaps. The friend carousel 918, via the Friend Story icon 932 thus provides a link from the user location to social media content that is not located anywhere, in that the snaps or stories thus available will be the same irrespective of the friend user's current location, the current focus of the map viewport 621, or the current location of the viewing user. Worded differently, this and other location-agnostic access features of the map GUI 612 provide for access to friend content via the map GUI 612 in a manner similar to that which would be provided by a GUI that is not map-based. Thus, in one example embodiment, selecting a particular friend bitmoji 640 causes display of a menu or user interface element (in the example embodiment of FIG. 9A, the respective Friend Story icon 932 of the selected user) through which available snaps and/or stories of the target user can be viewed, without regard to any geo-tagging information of the respective snaps/stories.

As will be described below, certain aspects of the search mechanisms provided by the map GUI 612 similarly provide access to location-agnostic social media content of friend users via the map GUI 612.

Search Functionalities

In addition to viewing clustered stories by selection of the story icons 631, 633, the user can access snaps by use of one or more search functionalities provided by the map GUI 612. In this example embodiment, the map GUI 612 provides a number of different search mechanisms through which the user can access targeted social media content, the search mechanisms including:

a search bar 665 (FIG. 6A) that enables the entry of a text string search query to cause display of search results comprising a list of entries satisfying the search query (FIG. 10C);

location-based searches to search for social media content based at least in part on their respective geo-tag information. In some embodiments, these location-based search mechanisms include:

a location-targeted search triggered by clicking or tapping at a target location on the map 618 (illustrated schematically in FIGS. 11A and 11B); and a friend-based location search to locate social media content based at least in part on the location of a selected friend user; and one or more friend-level access mechanisms that provide access to social media content of the selected friend users. In a particular embodiment, these include:

access to location-agnostic friend content via the user icons, friend carousel 918 and/or individual friend panels 909; and location-agnostic collection icons (e.g., Friend Story icons 932, as described below with reference to FIGS. 10A-10C) displayed in association with respective friend users in a list of search results.

Search Bar Mechanism

Two example embodiments of operation of a search mechanism provided via the search bar 665 is illustrated schematically with reference to FIG. 10A and FIGS. 10B-10D respectively. Discussing first the example embodiment of FIG. 10A, it will be seen that selection of the search bar 665 (FIG. 6A) causes display of a drop-down search interface 1010 that includes a search box 1020 for entering a text-based search query, and a number of lists of suggestions 1030 in respective user interface cells displayed below the search box 1020. In the example embodiments of FIGS. 10B-10D, individual suggestion cells correspond to individual snaps, stories, places, and/or friends. As can be seen with reference to a corresponding screenshot of the search interface 1010 in FIG. 10C, the particular cells displayed as part of the suggestions 1030 are dynamically filtered in response to text entry in the search box 1020, to include only stories, friends, or places that satisfy the entered search query.

When the user clicks on a selected cell in the list of suggestions 1030, the map GUI 612 in this example automatically navigates with a fly-over to the corresponding point on the map 618. If the selected cell is for a spike collection or cluster (also referred elsewhere herein as a spike story), the snaps in the corresponding story starts playing sequentially. If the selected cell is a friend cell, the map viewport 621 navigates to the corresponding friend bitmoji 640, and the associated a friend panel 909 pops up, as the case may be. In the example embodiment of FIG. 10A, at least some aspects of the display search results or suggestions 1030 are location-agnostic, returning search results from any location, without any constraint based on the user current location or the display area of the map 618. In particular, the "My Friends" section of the suggestions 1030 in the embodiment of FIG. 10A includes any friends for whom the user has viewing permission.

Figure 10A:
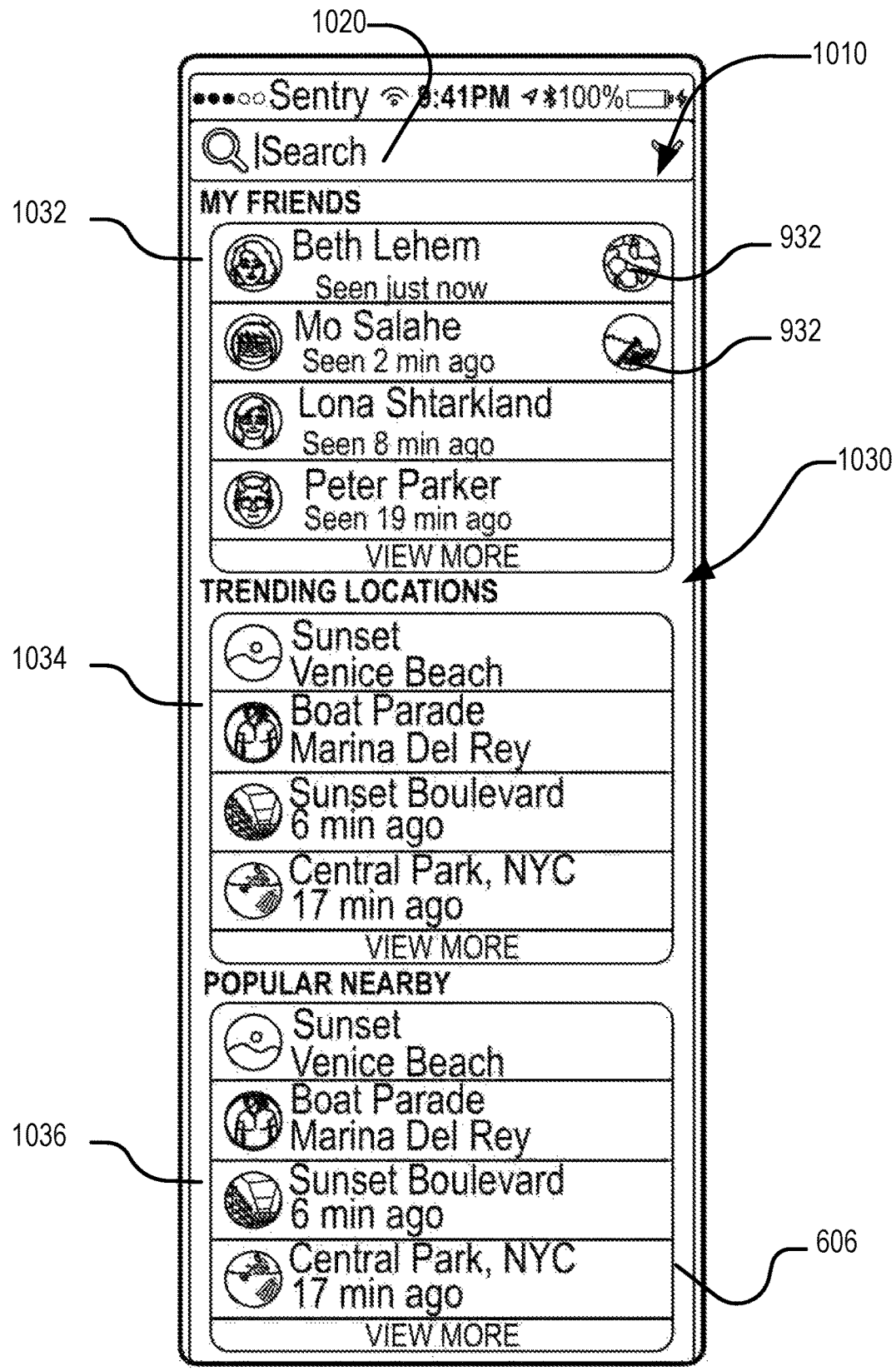

Thus, features provided by the search interface 1010 of FIG. 10A include:

Searching for a location anywhere in the world, and navigating to it by selecting the corresponding suggestion cell; and Viewing, before typing, suggestions 1030 of interesting social media content, and, while or after typing, suggestions that dynamically satisfies the search query. In the example embodiment of FIG. 10A, these include:

Friends of the user, in section 1032, identified as a "My Friends";

Trending place stories, event stories, and/or spike stories or clusters, irrespective of location, identified as "Trending Locations" in section 1034;

Nearby place stories, event stories, and/or spike stories or clusters, in section 1036, identified as "Popular Nearby."

Note that the "My Friends" and "Trending Locations" in the example embodiment of FIG. 10A shows friends/content from all over the world, not just friends/content that shows up in your viewport. All friends are shown section 1032 in order of how recently seen. In contrast, the "Popular Nearby" entries have a location restraint, being in this example embodiment limited to stories falling within the area of the current map viewport 621. In other embodiments, the location restraint is based on the user's current location, as indicated by the client device 102.

The "Trending Locations" and "Popular Nearby" stories are ranked globally according to a metric based on the underlying social media activity, in this example embodiment being ranked according to the number of unique users contributing to a story. In some embodiments, the trending locations may be ranked according to anomality metrics or interestingness scores. In yet further embodiments, surfacing of stories in the search interface 1010 can be based on raw snap volume, snap density over time, rate of increase in snap volume, or the like.

When users click on an entry in the search box dropdown, the map GUI navigates with a fly-over to the corresponding point on the map 618, after which the story/spike cluster starts playing, or friend panel 909 pops up, as the case may be.

Searching functionality available via other example embodiments of the map GUI 612 will now be described with reference to FIGS. 10B-10D. FIGS. 10C and 10D show behavior of the search interface during and after typing by the user in a search box forming part of the search interface 1010. It will appreciated that items listed during and after typing are limited to items (e.g., friends, places, events, or stories) that satisfy the search string entered thus far. Each one of a number of different sections of suggestions 1030, in which respective entries are ranked by priority, will be described separately below. Different embodiments may employ different combinations of these suggestions sections.

Figure 10B:
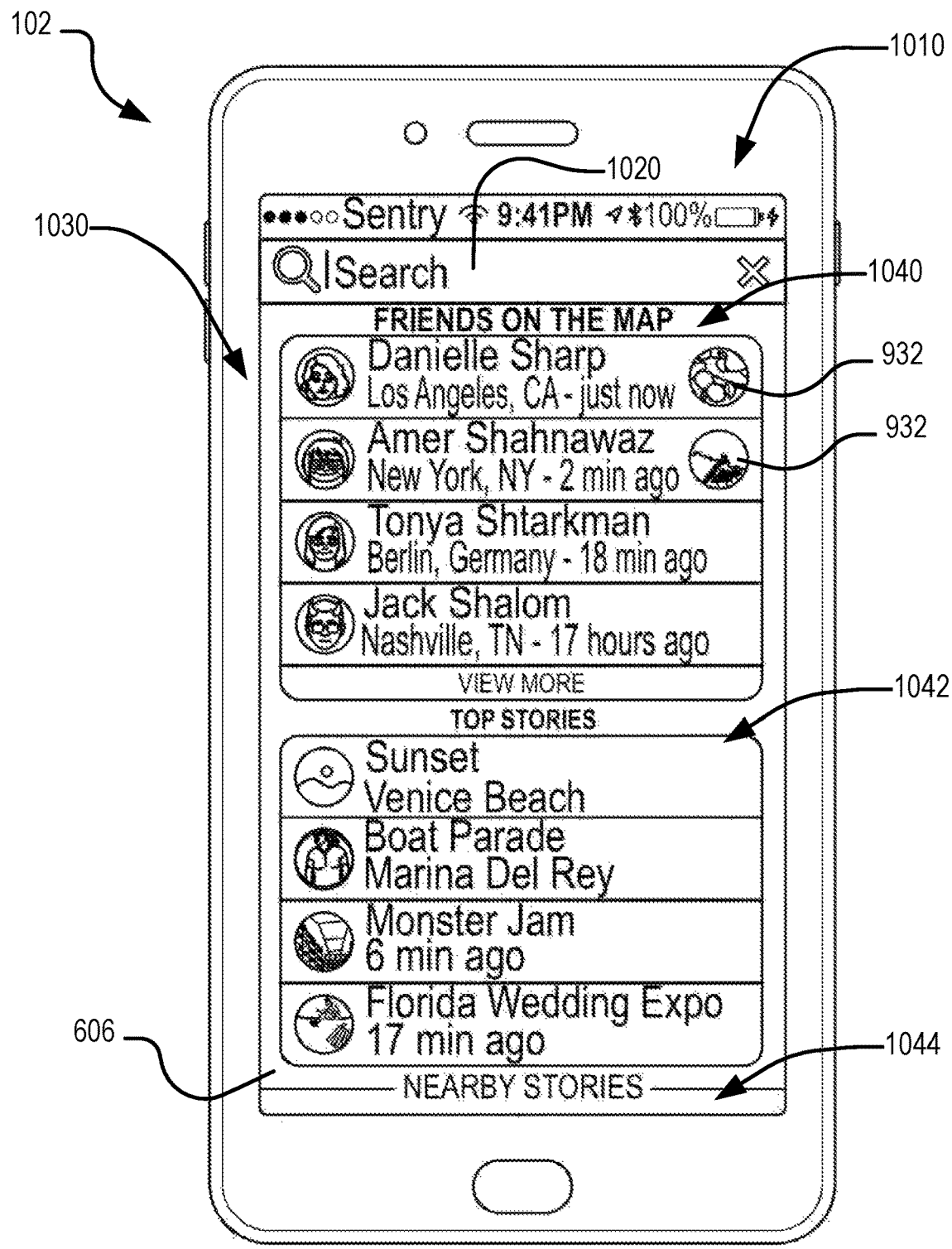

FRIENDS ON THE MAP—This section, indicated by reference numeral 1040 in FIG. 10B, shows friends that are that are on the map 618. In this example embodiment, the displayed friends are limited to friends who are visible in the map viewport 621 (i.e., in the geographical area of the map 618 displayed immediately before launching the search interface 1010). In other embodiments, the displayed friends include any friends who are currently available somewhere on the map 618. In this example, the top four friends are listed, followed by a View More button if necessary. The user can tap on a friend cell to locate them on the map 618.

Each friend cell includes, if available, a location-agnostic collection icon in the form of a Friend Story icon 932. Any of the Friend Story icons 932 can be tapped to view the corresponding friend story modally. Viewing of a story comprises sequential replay of the series of snaps included in the story. Each Friend Story icon 932 in this example embodiment comprises a user interface element in the form of a circular thumbnail to the right of the respective friend name. In this example, the stories thus playable include any of the friend's stories, without regard to any location information that may be associated with the story or with any snaps forming part of the story, thus being in accordance with the disclosed feature of map-based access to location-agnostic social media content of a target friend user. In other embodiments, however, the stories surfaced for replay are limited to those geo-tagged on the current map view.

In addition to the Friend Story icon 932, each friend entry in this example embodiment comprises an associated bitmoji, name, last seen timestamp, and associated location indicator. The listed friends are ordered by update recency.

ALL FRIENDS—This section, identified by reference numeral 1050 in FIG. 10C is similar to the My Friends section 1032 of FIG. 10A, in that it surfaces friends that satisfy the search string, irrespective of whether or not that friend is present on the map. In addition to a My Story icon 832 were available, a user name and a score indicator is shown as subtext for each friend. In this example embodiment, the indicated score is a user score that is used throughout the application to represent a user's engagement level. In some embodiments, as previously described, tapping on a friend cell navigates the map to focus on the display location of that friend. In this example embodiment, however, tapping on cell launches the chat interface 950 modally (see FIG. 9B). Dismissing the chat brings the user back to the search interface 1010.

TOP STORIES—This section, identified by reference numeral 1042 in the example embodiment of FIG. 10B, showcases the top stories from around the world (selected by curators daily or ranked by quality score or viewer volume).

NEARBY STORIES—This section, identified by reference numeral 1044 in FIG. 10B, shows interesting event clusters nearby or within the viewport. These will be ranked by descending quality score. In some embodiments, the nearby stories can be ranked according to the anomality metric, or according to a ranking score based at least in part on the anomality metric. Thus, it will be seen that some embodiments of the disclosure provide for social media application search interface that automatically surfaces ephemeral galleries based at least in part on geographical proximity between the user device and geolocations associated with the respective galleries. Ranking of the surfaced ephemeral galleries may be based at least in part on respective anomaly metrics.

LOCATIONS—This section, identified by reference numeral 1060 in FIG. 10D, shows all points of interest (POIs) or places (as defined by the CMS 1224) that matches the search query. In some embodiments, surfacing and ranking of locations satisfying the search string includes locations with stories available for replay, i.e. having an associated place story. Thus, for example, in the screenshot of FIG. 10D, Blue Lagoon is ranked above Blue Bottle Coffee because it has an associated collaborative story, even though the latter is closer to the location of the user device 102.

If the place has a story, a story icon 1063 in the form of a thumbnail is in this example embodiment shown before the title (see FIG. 10D). Tapping the story icon 1063 (or anywhere in the cell) centers the place on the map and auto-plays the story. If the place does not have a thumbnail, tapping the cell in this example embodiment reverts to the map viewport 621, focusing on the relevant location, without playing any story. Fallback prioritization is by proximity to current viewport (after POIs and/or places with playable stories have been prioritized to the top).

Location-Based Search Via Target Location on Map

As an alternative to entering a text-based search query, the user can initiate a location-based search by selecting a target location on the map 618 separate from any of the story icons 631, 633, friend bitmojis 640, or any other selectable user interface element overlaid on the map 618. In this manner, the map 618 itself provides an interactive search mechanism. An example embodiment of such a location-based search is illustrated schematically with reference to FIGS. 11A and 11B.

In response to the user's clicking or tapping on a particular location on the map viewport 621, a search is conducted for social media items within a predefined radius from the click- or tap location. In this example embodiment, such a location-based search does not return a list of graphical user interface elements that are selectable to play respective items, but instead automatically triggers automated sequential replay of items returned as a result of the search.

Figure 11A:
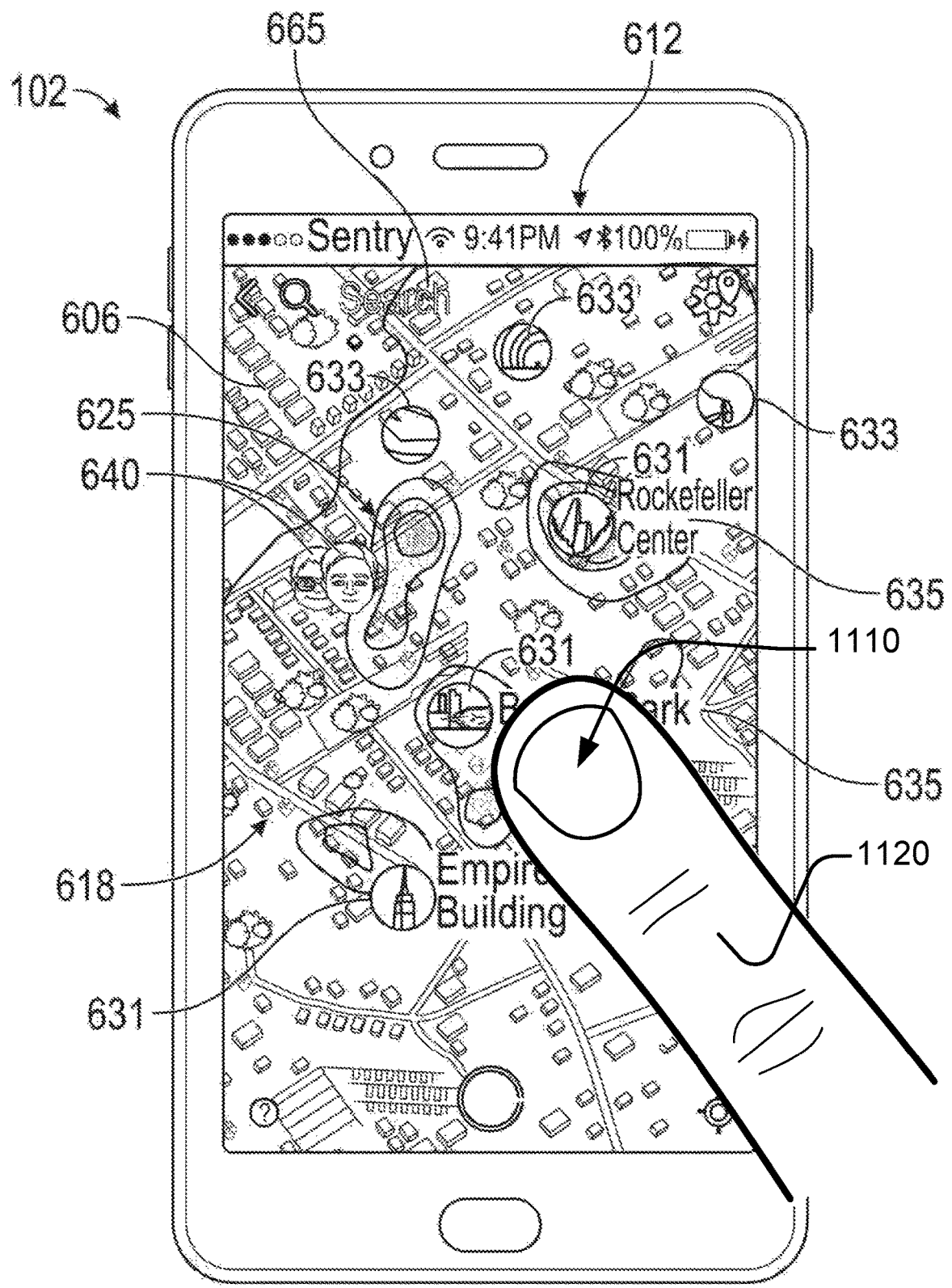
FIGS. 11A-11B are a series of schematic screenshots illustrating a location-based search mechanism provided by a map-based graphical user interface, according to one example embodiment.

In the example embodiment of FIG. 11A, selection of a target location 1110 is by haptic contact at the selected on-screen position, consisting of tapping the touchscreen 606 with a single finger 1120 of the user. Thus, tapping on a non-thumbnail place on the map 618 will radiate out a search around the target location 1110, as illustrated schematically in FIG. 11B by a substantially circular geographical search area 1130 centered on the target location 1110. Such a location-based search can have a predefined search radius from the tap location. If any snaps are found in the geographical search area 1130, they are automatically played back in sequence, as described before. If there are no snaps in that area, the search bounces back to show no results found.

In some embodiments, such a location-based search is dynamically restrained by a predefined search limit, so that the size of the geographical search area 1130 can be variable in different instances. In some embodiments, the search limit for a location-based search is a predefined maximum size defined by the number of snaps located in the search. In an example embodiment, the geographical search area 1130 will thus radiate out from the target location 1110 to a point where a predefined maximum number of snaps are found, after which all snaps from that area will start playing in sequence. Worded differently, a predefined search metric or limit is provided in some embodiments to determine when the search should be stopped. As mentioned, the search limit may be an upper limit to the number of snaps located, with the search radiating out no further from the target location once the number of snaps located reaches the upper limit. Thus, it will be seen that different location-based searches can return snaps from geographical search areas 1130 that differ in size, depending on the density of snaps in the vicinity of the target location 1110.

In some example embodiments, such a location-triggered social media content search (i.e., a search for social media content uploaded by other users triggered by a user click/tap at the target location 1110 that does not coincide with a story icon 631/633 or friend bitmoji 640) can be configured automatically to exclude social media items included in one or more of the clustered collections represented by respective icons 631, 633 on the map. Thus, in this embodiment, the social media application will not include in search results or replay any snaps that are included in any of the place stories or any of the spike stories on the map.

As mentioned, initiating a location-based search by clicking or tapping on a non-thumbnail area in this example embodiment triggers automatic replay of snaps located within a geographical search area 1130 centered on the target location 1110. In other embodiments, such a search input by target location selection may cause display of a graphical user interface element listing the snaps found within the search area, for example including a thumbnail and username for each found snap. The user can thereafter select from the list of found snaps those which are to be replayed.

In some embodiments, the snaps located in a location-based search are played back in chronological sequence, as indicated by respective timestamp data indicating when the corresponding snap was uploaded. In some example embodiments, a sequencing operation may be performed on the subset of snaps identified in a location-based search, so that the replay sequence does not strictly follow chronological sequence. In one example embodiment, an improved sequence for media playback in response to a user tap on the map viewport is achieved by a sequence of operations comprising (a) finding all snaps in a fixed radius of the tap point, (b) doing geo-temporal clustering of those snaps, (c) sorting those clusters by distance from tap, and (d) sorting within the clusters by time.

In some embodiments, the location-based search is by default performed for material uploaded within a predefined default time period. For example, the location-based search may identify all snaps that (a) are located within the geographical search area 1130; (b) are not included in any story represented by a corresponding story icon 631/633; and (c) have timestamps within a default preceding ephemeral timespan. Thus, in an example embodiment in which a snap is by default available for 24 hours via the map GUI 612, the location-based search may by default locate snaps having timestamps indicating upload dates within the past 24 hours.

In some embodiments, however, the preceding period with respect to which the search is performed is selectively variable by the user. For example, the search period timespan is automatically variable in response to an interval for which a search input gesture or signal is provided by the user.

In embodiments in which the map GUI 612 is displayed on a touchscreen 606 (as is the case in the example embodiment of FIGS. 11A and 11B), a geo-temporal search is triggered by haptic contact at a particular location within the map 618, with the search being geographically centered on a target location 1110 defined by the on-screen position of the haptic contact. In some embodiments, an input interval indicated by the time period for which the haptic contact is maintained with the touchscreen 606 automatically determines the preceding timespan with respect to which the search is carried out. In such a case, for example, a tap on the screen triggers a geo-temporal search for material within the default time period, while a press and hold automatically triggers a geo-temporal search for material within an extended time period which is longer than the default time period. In one example embodiment, a tap input triggers a geo-temporal search with a 12-hour timespan, while a tap and hold triggers a geo-temporal search with a 24-hour timespan. In other embodiments, the extended timespan is variable in graduated fashion, so that multiple different search timespans are selectable based on the press-and-hold interval. Note that the operations described with reference to the haptic contact on the touchscreen 606 can be performed analogously by a click-and-hold input in instances where user input is provided by a cursor control mechanism, such as a mouse.

Instead, or in addition, the search radius (i.e., the size of the geographical search area 1130) may be variable based on the length of the input interval, with longer input intervals (e.g., a longer hold period) corresponding to a larger search radius.

Location-Based Searching Via Friend Location or for Friend Content

Some embodiments of the map GUI 612 provide functionalities for searching for social media content with a location restraint based at least in part on a location attribute of the selected friend user. The location restraint may, for example, operate to limit the search to social media content geo-tagged within a predefined geographic range centered on a geographic location of the selected friend user.

For example, the user can in some example embodiments trigger a location-based search with a location constraint based on the location of a selected friend user. In one example embodiment, such a location-based search with respect to a particular friend location can be performed in a manner analogous to that described below with respect to a general location-based search as described with reference to FIGS. 11A and 11B. The various considerations and features discussed for general location-based searching can thus in some example embodiments apply, mutatis mutandis, to location-based searching based on friend location.

In one example embodiment, a friend-targeted location-based search can be triggered by user interaction with the friend icon or bitmoji 640 of a target friend user. In such an example embodiment, a click or tap input on the bitmoji 640 surfaces a menu or friend panel 909, while a press-and-hold input or a click-and-hold input automatically triggers a location-based search such as that previously described, the search area being centered on the location of the selected user. Instead, or in addition, a menu or friend panel 909 launched responsive to selection of the bitmoji 640 in some embodiments include a selectable user interface element to trigger a search for social media content targeted with a location constraint defined with respect to the location of the selected user.

In some embodiments, the friend-based social media content search additionally has an owner constraint such that the search results are limited to social media items of the selected friend user. In other embodiments or instances, the friend-based social media content search may search for content including but not limited to that uploaded or provided by the selected friend user.

Other example embodiments in which social media content searches via the map GUI 612 has a location constraint based on a selected friend user's location include instances where (while map focus is on a selected user) search results are limited to items currently displayed in the map viewport 621. The result section 1030 in the embodiment of FIG. 10B provides one such example. In other instances, the map GUI 612 provides for the option of searching for content exclusively contributed by a selected target user. Responsive to triggering such a friend-specific search, the user can change the focus and/or zoom level of the map viewport 621, with social media items surfaced in the map viewport 621 being limited to social media content posted by the target friend user.

As described with reference to some example embodiments herein, a social media application executing on the user device in some embodiments generates a map GUI having a map viewport on which displayed geographic locations of at least some friend users may differ from the actual geographic locations of those users. In some embodiments, the friend-centered location-based social media content search may be centered on the actual geographic location of the selected friend user, being distinct from a displayed location of the selected friend user on the map GUI. In other embodiments, the search may be performed with reference to the displayed location of the selected friend user.

Overview of Map GUI Functionality

In use, the map GUI 612 thus surfaces different types of location-based stories, which the user can view from the map 618. In the example embodiment of FIGS. 6A and 6B, the user can access via the map GUI 612 snaps posted to Our Story from anywhere in the world. This can be achieved by navigating to different geographical areas displayed within the map viewport 621. In particular, the displayed geographical area can be changed by zooming in or zooming out, and by moving the focus area of the map viewport 621. In the example embodiment of FIGS. 6A and 6B, in which the map GUI 612 is provided on a touchscreen 606, zooming in and zooming out can be achieved by haptic gestures in the form of a pinch-out or a pinch-in haptic input. Movement of the map 618 within the map viewport 621, so as to change the displayed geographical area, is achieved by a haptic dragging gesture at any point on the map 618.

In this example embodiment, the map 618 is not selectively rotatable by the user, having a fixed default orientation relative to the touchscreen 606. In other embodiments, the map 618 may have a fixed orientation relative to the Earth. In some embodiments, the map 618 is selectively rotatable, e.g., with all map content rotating around a fixed anchor.

As discussed at length above, in any particular map viewport 621, the displayed information can include:

the color-coded heatmap 625, visually displaying the geographical distribution of snap uploading activity within a preceding window (for example the default snap lifetime, in this example 24 hours), allowing the user readily to identify places with more or less activity. This enables the user more effectively to target location-based searches via the map GUI 612. In some embodiments, the color-coded heatmap 625 is shown only at a highest level of magnification. In this example embodiment, however, the color-coded heatmap 625 is rendered at all zoom levels.

Thumbnail icons 631, 633 for surfaced content forming part of ephemeral galleries or stories. As described previously, these include in this example embodiment place icons 631 for geo-anchored stories associated with particular labeled locations, and spike icons 633 for location-based stories surfaced based on anomalous levels of geo-spatial activity.

Friend bitmojis 640 of friend users most frequently contacted by the user who is logged in to the social media client application 104 executing on the client device 102 and by which the map GUI 612 is generated.

In some embodiments, no spike icons 633 are shown at some levels of magnification. In a particular example embodiment, no spike icons 633 are shown at the original zoom level at which the map GUI 612 loads by default. In such an example, only the heatmap 625, friend bitmojis 640, and a number of place icons 631 are displayed on the map 618 at the original zoom level. As the user zooms in, spike icons 633 are surfaced, representing respective clusters of activity.

It will be appreciated that different icons 631, 633 are surfaced at different zoom levels. In this example embodiment, the map GUI 612 displays no more than a predefined maximum number of place icons 631 and no more than a predefined maximum number of spike icons 633 in any particular view. For example, at any zoom level, the top three place stories (ranked by snap volume) are surfaced by displaying respective place icons 631 in the map viewport 621. Likewise, at any zoom level, the top three spike stories (ranked by anomality or unusualness metric value) are surfaced by displaying respective spike icons 633 in the map viewport 621.

In addition to viewing stories surfaced in the map 618 by respective story icons 631, 633, the user can use one or more of the search functionalities described above to access any snap uploaded to Our Story and whose gallery participation timer or availability lifetime has not yet expired.

It will be appreciated that the map GUI 612 is dynamic, in that the information displayed therein changes dynamically with time. New snaps may continually be uploaded to Our Story, while the underlying social media items upon which surfacing of the story icons 631, 633 and generation of the heatmap 625 is based can further continually change due to the expiration of the availability of snaps. In this example embodiment, however, the information displayed in the map viewport 621 is not dynamically updated during display of any particular geographical area. Instead, changing of the focus of the map viewport 621 is associated with receiving updated information with respect to the story icons 631, 633 and heatmap 625 from the application server 112.

It is a benefit of the map GUI 612 as described with the example embodiments that it provides for user-friendly and intuitive interaction with geographically distributed social media content. The provision of different types of social media galleries (e.g., represented respectively by spike icons 633 and place icons 631) provides a system that automatically surfaces only content which is most relevant for user-selection in such a manner that the very large number of individual social media items that may be available via a social media platform is reduced in complexity, and that allows selection of targeted content in which the user might be interested.

Example System

FIG. 12 shows an example embodiment of a social media platform system 1200 configured to provide a map-based graphical user interface for a social media application, such as the map GUI 612 described with reference to FIGS. 6A-11B. The system 1200 and its associated components can in some embodiments be provided server-side, for example by the social media application server system 108 (FIG. 1). In such instances, the respective components of the system 1200 can be provided by execution of the social media server application 114 on the application server 112. In other embodiments, one or more components of the system 1200 are provided client-side, for example by execution of the social media client application 104 on a respective client device 102 (FIG. 1). In yet further embodiments, the system 1200 is provided collaboratively server-side and client-side, the application server 112 and a client device 102 in communication therewith being configured to provide the respective system components by execution of the social media client application 104 on the client device 102 and by execution of the social media server application 114 on the application server 112.

The system 1200 includes a map engine 1208 to generate the map GUI 612, including the location-based social media information displayed in the map GUI 612. Thus, the map engine 1208 is configured to generate or to facilitate generation of the map 618 (FIG. 6A) in the map viewport 621 of the client device 102. To this end, the map engine 1208 can be configured to surface and cause display particular story icons 631, 633, to identify and cause display of respective friend bitmojis 640, to generate heatmap information and display or cause display of a heatmap 625 overlaid on the map 618, and to perform operations that provide other related functionalities of the map GUI 612 described with reference to FIGS. 6A-11B.

The system 1200 further includes a replay mechanism 1216 configured to cause automated sequential replay of the content of a set of social media items or snaps on the client device 102. The replay mechanism 1216 can thus cause sequential display of all of the snaps in a selected place story or spike story, as described previously herein. In some embodiments, the replay mechanism 1216 may provide for transmission of the set of snaps to the client device 102 in response to selection of a corresponding story icon 631/633. In some such embodiments, information automatically transmitted by the application server 112 to the client device 102 upon initial rendering of a map view in the map GUI 612 can include a first few (e.g., 2 or 3) snaps for each of the story icons 631, 633 surfaced in the map viewport 621. Upon selection of a particular story icon 631/633, the first few snaps in the story are immediately available for replay, with the subsequent snaps in the story being pulled from the application server 112 during presentation of the first few snaps.

The system 1200 also includes a content management system (CMS) 1224 enabling server-side administrative functionalities. The CMS 1224 provides an administration interface enabling operators to manage content, for example by defining various attributes of different place and/or event stories. The CMS 1224 in this example embodiment also includes the collection management system 204 (FIG. 2) as previously described. The CMS 1224 is configured for the automated or semiautomated compilation of the respective social media galleries or stories as previously described. This may include curation or moderation of respective stories by use of a server-side curation interface provided by the CMS 1224.

Figure 11B:
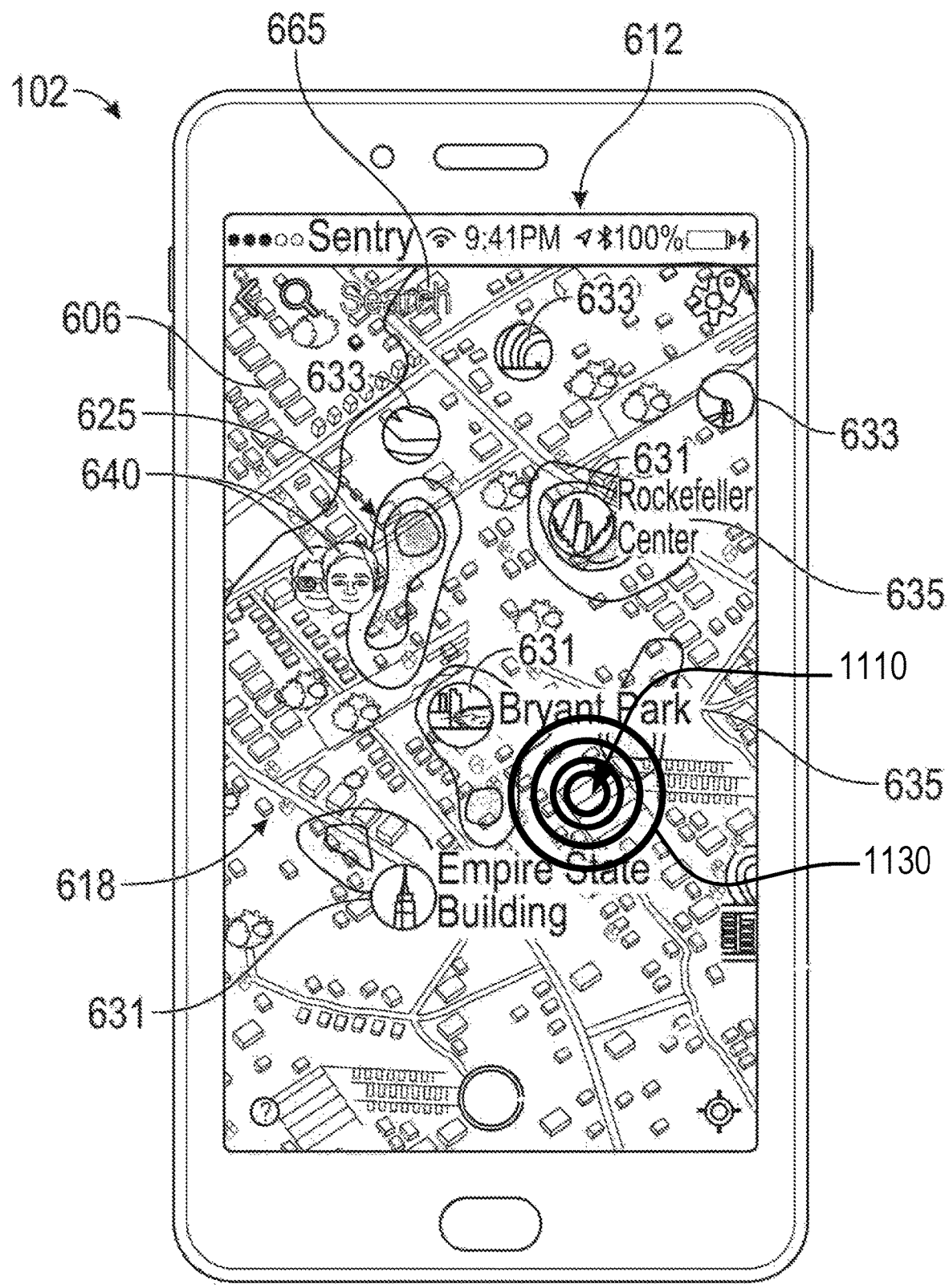

The system 1200 further includes a search engine 1233 configured to provide search functionalities with respect to social media content via the map GUI 612. In particular, the search engine 1233 in this example embodiment provides for user-directed searching both via the search interface 1010 (FIGS. 10A-10D) and via location-based searching by direct selection of a target location on the map 618 (FIGS. 11A-11B).

The system 1200 further includes a user location serving mechanism 1237 configured to determine respective user locations, in this example embodiment indicated by the respective device locations, to determine for each user the particular friend users who are viewable via the map GUI 612, and to provide the respective user location information for display of associated user icons at corresponding display locations. The user location serving mechanism 1237 in some embodiments comprise, as part of the server system 108, a user location datastore and a per-user access control list (ACL) that lists the particular friend users viewable by each user. In some embodiments, the per-user ACL specifies respective viewing level granularity for each viewable user. The user location serving mechanism 1237 in such example embodiments is additionally configured to determine and manage respective user display granularity. This includes calculating non-precise display locations for some users, and causing display of a corresponding user icons at the non-precise display locations.

The system 1200 also includes an analyzer 1250 that is configured to process social media activity data to calculate anomality metric values for different areas that is to be served by the map GUI 612. In some embodiments, the analyzer 1250 generates a historical model of the geospatial distribution of social media activity, using a probabilistic rendering of individual snaps. Activity data from a current or near live time window is mapped to the historical model and a respective anomaly score for different respective locations in the map is calculated. Such anomaly scores can be used by the map engine 1208 to surface content via the map GUI 612, to determine the size of spike icons 633, and the rendering of heatmap information, or the like.

Example Methods

Provision and Rendering of Heatmap

Example methods relating to the rendering of social media activity information in the form of a heat map in a graphical user interface will now be described. The description that follows is with reference to the map GUI 612 having a heatmap 625, according to the earlier described example embodiment. It will be borne in mind that implementation details may vary between different embodiments.

As mentioned, the heatmap 625 is displayed to guide users to places where there is content available to be viewed (see, for example, FIG. 6A), in particular guiding the user to profitable target locations for location-based searches, as described with reference to FIGS. 11A-11B. In this manner, provision of the heatmap 625 serves to minimize the number of fruitless or minimally effective location-based searches that would otherwise have been performed, thus reducing processing load on the server system 108. The frequency and repetition rate of searches with small or no result sets tends to be significantly greater than is the case for successful searches.

Figure 13A:
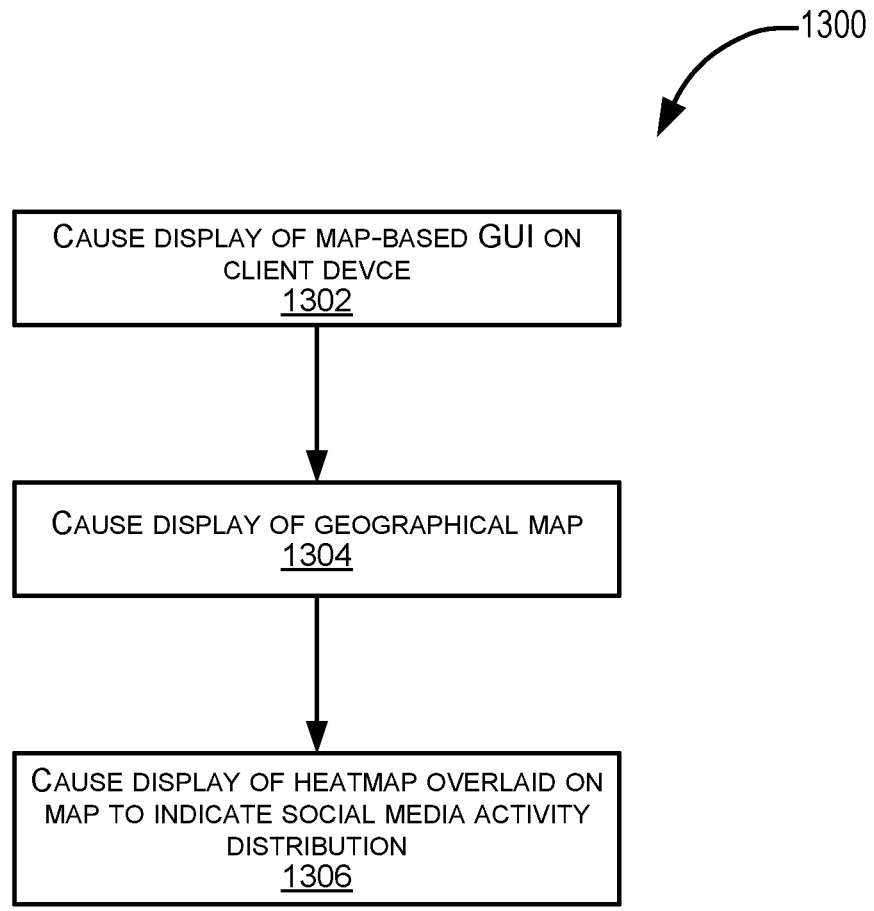
FIGS. 13A-13B show respective flow charts illustrating an example embodiment of a method of providing a map-based graphical user interface for a social media application that includes an activity heat map, according to an example embodiment.
Figure 13B:
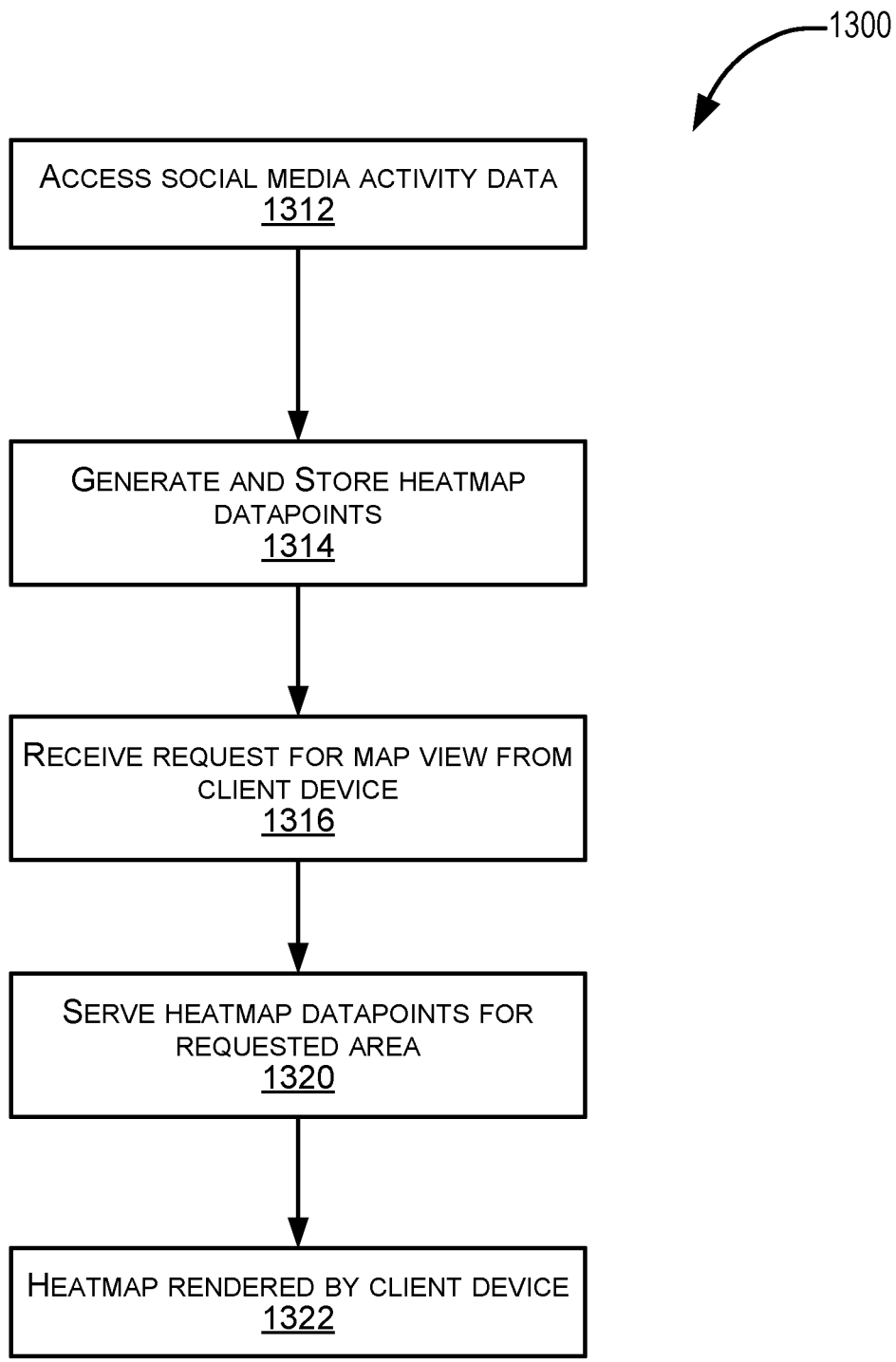

FIG. 13A is a schematic flow chart illustrating a high-level view of a method 1300 of providing a map-based GUI for a social media application, according to an example embodiment. The method 1300 is in this example embodiment executed by a system 1200 as described with reference to FIG. 12, using the system architecture and environment described with reference to FIGS. 1-5. Moreover, the example method 1300 in this example embodiment provides the various map-based functionalities, including location-based search functionalities, described with reference to FIGS. 6A-11B. The various operations that provide the respective functionalities described with reference to the example map GUI 612 of FIGS. 6A-11B are to be read as forming part of the method 1300, even though, for avoidance of repetition, not all of the different operations previously described are repeated in the description that follows.

At operation 1302, the map engine 1208 causes display of a map GUI 612 for social media platform on a client device 102. This includes, at operation 1304, providing for display of the map 618 as part of the map GUI 612. To this end, stylized map tiles for a geographical area in the map viewport 621 are served to the client device 102, and are rendered on the touchscreen 606.

At operation 1506, a heatmap 625 is displayed so as to be overlaid on the map 618 and to be geographically registered to the map 618. The heatmap 625 illustrates a geographical distribution of a particular social media activity metric. As discussed previously, the heatmap 625 in this example embodiment represents relative snap density at different locations within the displayed area. Rendering of the heatmap 625 is in this example embodiment performed by the social media client application 104, using heatmap data served to the client device 102 by the map server system 108.

In some embodiments, rendering of a pixelated heatmap distribution based on underlying social media activity data is done server-side, with pixel data or vector data for rendering the mapping transmitted to the client device 102. In this example embodiment, however, individual heatmap data points are served to the client device 102 by the map engine 1208. The heatmap 625 is 10 rendered by the social media client application 104 on the client device 102 based on these heatmap data points.

In this example embodiment, the heatmap is rendered using a set of data points based on timestamp and GPS coordinates from all snaps posted to Our Story. As shown in the more detailed flowchart of FIG. 13B, the map engine, at operation 1512, accesses the social media activity data representing the set of snaps upon which the heatmap is to be rendered, and, at operation 1514, generates and stores heatmap data points representative of the social media activity metric to be represented (here, distribution of snap volume).

In some embodiments, the generation of the heatmap data points comprises a pruning or filtering operation in which some snaps are excluded from the original data set based on predefined exclusion criteria. In this example embodiment, a per user limit is imposed on the number of snaps in the original data set, so that the pruned data set includes no more than a predefined maximum number of snaps from any one user. In this example embodiment, each user is represented in the pruned data set by no more than one snap. This serves to prevent skewing of the represented activity data by high-volume individual posters. Instead, or in addition, an age limit may be imposed, so that snaps from users younger than a certain age are excluded.

In this example embodiment, different heatmap data sets is, in an aggregation procedure, generated for different zoom levels. The underlying activity data is thus aggregated into tiles at various geographic zoom levels. The data format in this instance is:

```
message Point {
   double lat = 1;
   double lng = 2;
}
message HeatmapPoint {
   Point point = 1;
   double radius = 3;
   double weight = 4;
}
// A rendered "local" peak on the heatmap. Used for normalization.
message HeatmapPeak {
   Point point = 1;
   double intensity = 2; // in heatmap pixel intensity units
}message Tile {
   TileId id = 1;
   TileSetId tile_set_id = 3;
   repeated HeatmapPoint points = 10;
   repeated PointOfInterest pois = 11;//POIs are place stories/spike stories
   repeated HeatmapPeak peaks = 13; // peaks in this tile and/or neighbors
}
```

At operation 1316, a request for a particular map view is received from the client device 102, responsive to which the heatmap data points for the particular requested zoom level and geographical area are served to the client device from the map engine 1208, at operation 1320.

After the heatmap data is received, the client device 102, at operation 1322, renders each point according to the location, radius, and weight parameters. The renderer in this example embodiment draws a Gaussian distribution with that radius and intensity into a pixel buffer for every point. Note that, in this example embodiment, the map is generated based on considering each individual social media item (here, snaps) probabilistically, rendered as a geographically distributed events. This typically applies at very high zoom levels and/or for isolated areas. At higher zoom and/or density, each heatmap data point is typically and aggregated representation of multiple underlying snaps.

After all points are rendered to the pixel buffer, the renderer does some normalization of the intensities in the pixel buffer based on calculated maximum values and HeatmapPeak values calculated on the server. After normalization is complete, the pixel buffer is converted to an OpenGL texture, a palette transformation is applied to convert to our desired color space, and the result is displayed on the touchscreen 606.

Example embodiments that incorporate the above-described and illustrated aspects of the disclosure include the various example embodiments listed below as examples 1-12, which are to be read as forming part of the description.
Location Fuzzing Another aspect of the disclosure relates to intentionally displaying visual representation of some social media activity at non-accurate locations in a map-based GUI. In particular, the visual representation of social media activity that can allow other users to identify the actual location of a user is in some embodiments, to protect user privacy, displayed at an intentionally non-accurate locations from the actual geographic location. In this description, this aspect of the disclosure is referred to as location fuzzing, with the intentionally non-accurate location being referred to as the fuzzed location.

In the description that follows, the particular map feature to which location fuzzing is applied is heatmap data, for example individual heatmap data points representative of snaps meeting predefined fuzzing criteria. In other embodiments, different map features with similar location revealing potential are instead, or in addition, submitted to location fuzzing.

Figure 14:
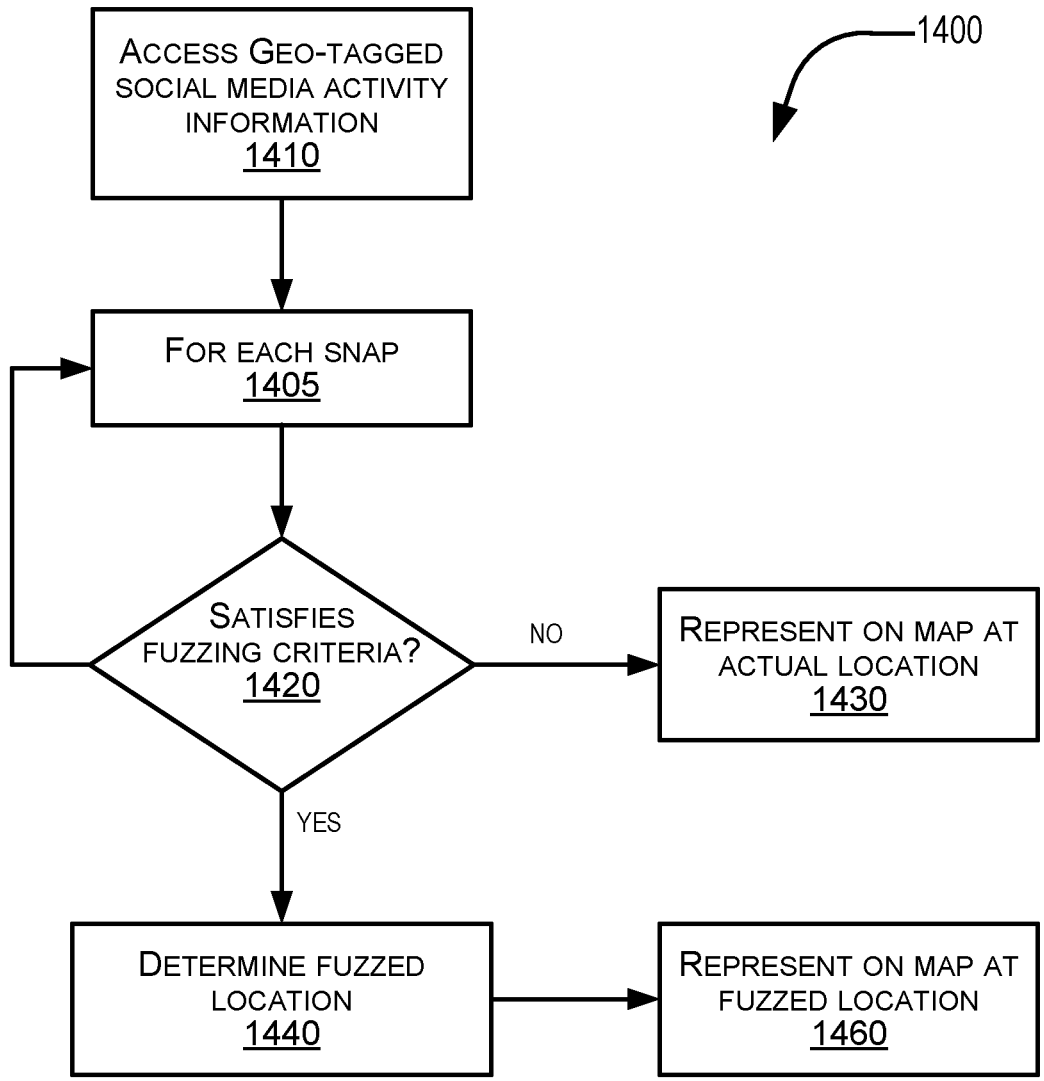
FIG. 14 shows a flowchart illustrating a method of representing a method of representing location-based user activity in a map-based graphical user interface, according to an example embodiment.

FIG. 14 shows a method 1400 of a method for providing a map-based graphical user interface such as to apply location fuzzing to at least some representations of underlying social media activity. The method 1400 is in this example embodiment executed by a system 1200 as described with reference to FIG. 12, using the system architecture and environment described with reference to FIGS. 1-5. Moreover, the example method 1300 in this example embodiment provides the various map-based functionalities, including location-based search functionalities, described with reference to FIGS. 6A-11B. The various operations that provide the respective functionalities described with reference to the example map GUI 612 of FIGS. 6A-11B are to be read as forming part of the method 1400, even though, for avoidance of repetition, not all of the different operations previously described are repeated in the description that follows.

At operation 1410, the map engine 1208 accesses underlying geo-tagged social media activity for rendering various map features. In this example embodiment, similar to that described with reference to FIG. 13B, the activity information comprises a set of geo-tag snaps uploaded to Our Story for general accessibility. Location data associated with each snap thus indicates the actual location of the associated user device when capturing the snap.

At operation 1420, it is determined for each snap in the set (operation 1405) whether or not that snap satisfies predefined fuzzing criteria. A number of different examples of such fuzzing criteria is described later below.

If the snap does not satisfy the fuzzing criteria, then its actual location is used, at operation 1430, to render a corresponding visual representation in the map GUI 612. In this example embodiment, the respective snap is used at its actual location as a heatmap data point.

If, however, it is determined that the snap does satisfy the fuzzing criteria, a non-accurate or fuzzed display location is determined for the snap, at operation 1440, in an automated fuzzing procedure executed by the map engine 1208. A number of different considerations for such fuzzing procedures are described later below.

At operation 1460, the fuzzed location of the snap is used to render a corresponding visual representation on the map 618. In this example embodiment, the snap is represented in heatmap data served to client devices 102 at its intentionally inaccurate, fuzzed location.

The following terms and concepts are in this embodiment pertinent to some example fuzzing criteria:

"Isolated snap"—if a snap is posted and there are not many unique users posting snaps around that time and location. An exact definition is given below for one example in which the fuzzing criteria identifies isolated snaps.

"Fuzzing"—normally, a snap is represented as a blob of color on the heatmap at its true location. In some embodiments, the locations of isolated snaps is moved, as discussed, to a fuzzed location in order to protect the privacy of the user.

"Enhanced fuzzing"—certain countries or jurisdictions are considered more sensitive than other, or have different applicable regulations. "Enhanced fuzzing" will be employed there, which some example embodiments means that the distance by which isolated snaps are moved is increased.

"Minor"—a user under the age of 18. Special considerations for snaps posted by minors. Different definitions can apply in.

For any snap that is posted and subsequently displayed on the map GUI, a location of the user is potentially disclosed within 0.11 m of accuracy (give or take based on cell GPS accuracy). In public spaces, this less of an issue, but for people posting from their own homes, this could be undesirable.

To mitigate the potential safety implications of showing users' exact locations when posting snaps to Our Story, the system in this example embodiment, as discussed with reference to FIG. 14, automatically fuzzes the location of snaps that satisfy the predefined fuzzing criteria. Here, snaps are fuzzed when posted by users in 'isolation' (as defined below).

For these isolated snaps, the map engine 1208 renders a large radius, low intensity Gaussian distribution centered at the fuzzed location. The distance for which fuzzing occurs is in this example based on population density in that location. Note that the fuzzing distance is thus in some embodiments based at least in part on an associated population density, such that the fuzzing distance is smaller for areas of greater density.

Several considerations apply to such location fuzzing:
For events with many unique users posting to Our Story, high accuracy of heatmap points is preferable.
For isolated users, low accuracy of heatmap points is preferable.
In some embodiments, the fuzzing procedure such as to prevent discovery by someone who has aggregate data of an isolated user posting many times.
The rendered heat map is to maintain a pleasant aesthetic.
An example fuzzing procedure used in the described embodiment, comprises:
Snaps are deemed to be 'isolated' if there are fewer than 2 other unique users posting content within a 30 minute period and 50 meter radius of the snap. In other embodiments, different isolation criteria can be used, for example having different phones for at least one of the proximity radius (here, 50 m), the threshold number of users (here, 2), and the measured time interval (here, 30 minutes).
For any snap that is identified as being isolated, the location of that snap is modified by a delta by automatically selecting a direction and distance that is based on a 16-bit hash of:

The hash of the posting user's userId;

The geohash of length 4 of the snaps's location (so that the geohash is constant for a constant position, meaning that different snaps originating from the same spot has the same fuzzed location, making detection of the true location more difficult); and/or A 2048-bit cryptographic secret from a registry key The first 8-bits of the hash is used to choose from 1 of 256 possible directions.

A distance from 100-2000 m is chosen based on unique user app open density of the S2 cell the snap falls into For "enhanced fuzzing countries", the distance is doubled.

The distance is then slightly jittered based on the remaining 8-bits of the hash.

Some alternative fuzzing procedures include random fuzzing of all isolated snap locations. A drawback of this approach is with aggregation. If a user snaps enough times, their exact location may be revealed.

In another embodiment, a constant delta is maintained per user. This approach may have a drawback if a user snaps in a place identifiable by the snap media. An observer can than derive the delta and apply to future snaps.

Yet a further example embodiment provides for fuzzing to the bounding geohash or S2 cell. A drawback of this approach is its aesthetic effects—isolated snaps will conform a grid and look fake.

Special considerations for minors, popular and/or Official Accounts may apply in some embodiments. In some embodiments, exclusion criteria are applied to some such accounts. For example, for minors posting content to Our Story, their snaps will not be shown on the map 618 unless there are more than 7 unique users posting within a 30 minute period within a 50 m radius and, 30% of the posting users are non-minor accounts. For Popular and Official Accounts, their snaps are not represented on the map 618 unless there are more than a threshold number of unique users (here, 100) posting within a 30 minute period within a defined proximity radius (here, 50 m).

Example embodiments that incorporate the above-described and illustrated aspects of the disclosure include the various example embodiments listed below as examples 13-27, which are to be read as forming part of the description.

Identifying and Surfacing Interesting Content Based on Geospatial Anomaly

Considering the sheer volume of snaps that can at some times and at some places be uploaded to a social media platform, it can be problematic for users and for administrators of the platform to identify posting activity that users will find interesting. Some aspects of this disclosure provides for surfacing or making visible content based on underlying snap volume. One disadvantage of such surfacing is that some areas (like tourist locations) have consistently high volume but is seldom particularly interesting to nonparticipants.

Interestingness per se is typically largely subjective, but one aspect of the disclosure operates on the insight that activity that is unusual or anomalous is more likely to be interesting than non-anomalous activity. This aspect of the disclosure thus proposes an anomaly metric that provides a quantified value for a level of unusualness of activity in a particular area. Bearing in mind these distinctions, the terms anomaly, unusualness, and interestingness are further in this description used substantially synonymously, unless the context clearly indicates otherwise.

The following section of the disclosure describes an example technique for finding interesting clusters of snaps in space and time by mining the stream of snaps sent to a live story or uploaded to Live Anywhere. Surfacing of clusters and/or stories in the map GUI 612, as described above with respect to spike stories or in a search interface 1010 is in some embodiments based at least in part on the identification of interesting snap clusters as described below.

The problem of finding interesting events is in the present example embodiment broken down into sub-problems:

1) Describing the amount of activity happening "now" at a particular place, or more generally, describing the amount of activity in a given window of space and time.

2) Describing what is "normal" activity in a given window of space and time. Then, "interesting" is when there is more activity than normal.

The more the level of activity exceeds normal, the more interesting that window of space and time is.

Figure 15:
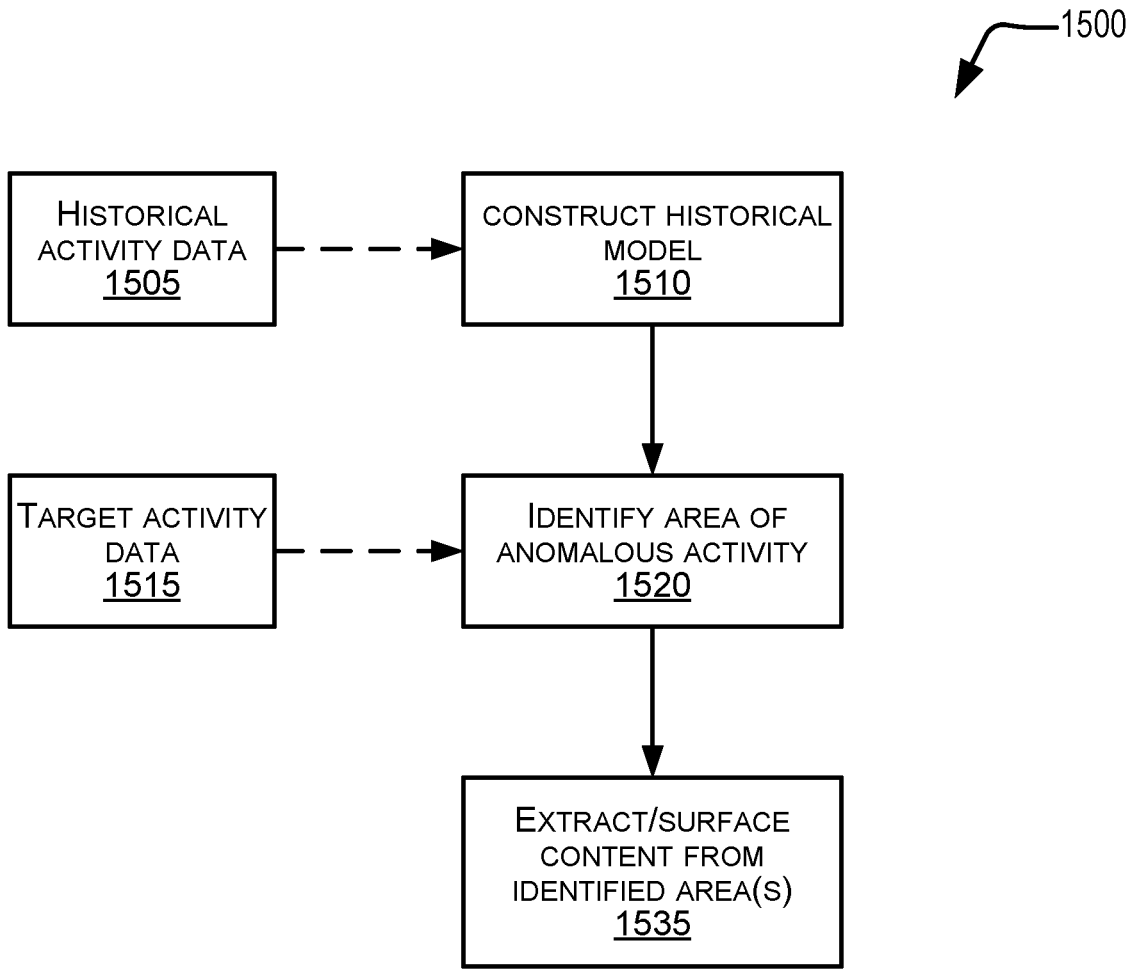
FIG. 15 shows a high-level flowchart illustrating a method of identifying geo-spatially anomalous social media activity, and consequent surfacing of content in a map-based graphical user interface, according to an example embodiment.

FIG. 15 shows a high-level view of an example method 1500 for identifying and surfacing potentially interesting content in a social media platform. At operation 1510, a historical geo-temporal model for posting activity is created based on historical activity data (see operation 1505). As will be seen from the description that follows, the model is described as being geotemporal, in that it represents a geographical distribution of estimated snap density (e.g., snap volume per unit surface area) for each of a plurality of time windows. In some embodiments, the historical model may be two-dimensional only.

At operation 1515, target activity data (e.g., all snaps in a target area within a recent time window) is retrieved. Geographical distribution of snap density for the target activity is, at operation 1520, compared with the historical model, for example applying a statistical comparison between the target time window and a corresponding time window of the historical model. A respective anomaly score a statistically calculated for different locations or portions of the compared target area, thus identifying one or more areas of anomalously high activity. Such areas are also referred to herein as spikes or spike clusters. Note that surfacing is based on high anomaly scores, considering that low levels of unusualness is unlikely to be interesting.

At operation 1535, social media content (in this case, one or more subsets of the underlying set of snaps) is extracted and surfaced in the map GUI 612 based on the identified geospatial activity anomalies. This can be by the formation and surfacing of spike stories (such as those described previously as being represented on the map 618 by respective spike icons 633), or by suggestions of interesting content in a search interface 1010.

A snap is identified as having three dimensions: a location defined by a lat-long pair, and a timestamp, fixing it in space and time. An aspect of anomaly identification according to this embodiment is that those attributes are not viewed as a specific point in space and time, but rather as a probability cloud.

This is based on the insight that any single snap of an event could have been taken from a slightly different location or at a slightly different time and be functionally the same as the one observed. With this in mind, a set of snaps is not treated as a census in the statistical sense. Rather it is considered a sample drawn from a random process. If we were able to somehow repeat last Monday between 10:00 and 10:30 in NYC, we can imagine observing a similar but different set of snaps from the random process of people moving about in the world and posting snaps.

When computing what "normal" looks like, we cut the world up into small cells (in one example embodiment, squares on the surface of the earth about 30 meters on a side) and spread the weight of each snap across many such cells, centered on the cell the snap actually fell into. In other embodiments, each snap may be centered at its precise location.

These accumulated weights become the parameters of a weight distribution that tells indicates where snaps are likely to occur in the future. Similarly, when computing when "now" looks like, the weight of each snap is distributed across many cells.

Anomality metric calculation (see operation 1520) in this embodiment comprises comparing those results to the range of possibilities we might have observed based on the "normal" weights. The more the current weights exceed the expected weights, as indicated by the model, the more anonymous (and therefore likely interesting) that cell is.

A more detailed overview of these operations in an example embodiment will now be described with reference to FIGS. 16-17, after which example implementation details are discussed with greater specificity.

Figure 16:
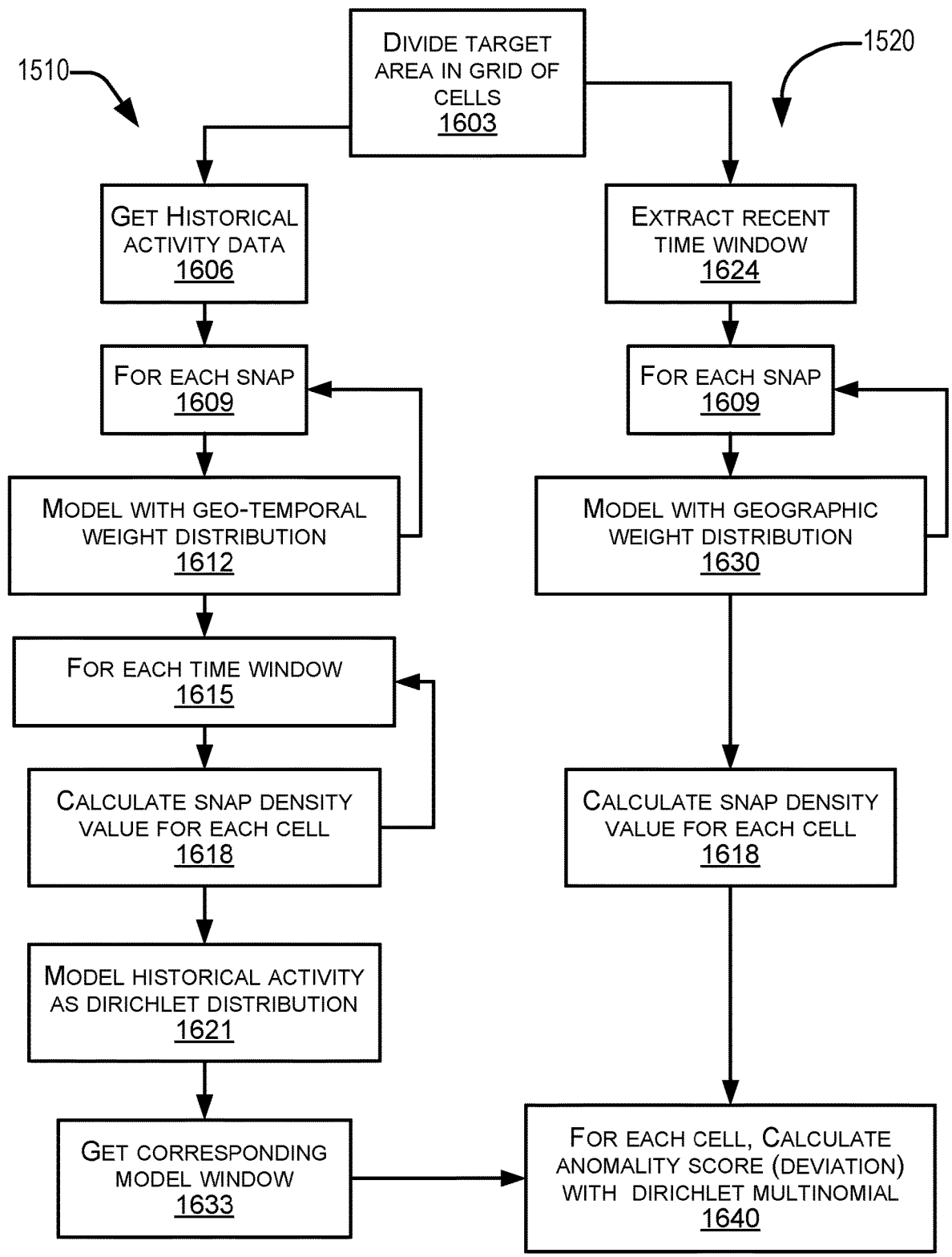
FIG. 16 is a flowchart illustrating a method of identifying anomalous activity on a social media platform based on construction of a historical model, according to an example embodiment.

FIG. 16 shows a flowchart for identifying areas of anomalous activity (e.g., spike clusters) according to an example embodiment. At operation 1603, the surface of the earth is cut into a grid of cells. In this example embodiment, Google's S2 geometry is used, having cells with a pitch of about 35 m.

At operation 1606, historical snap activity data is retrieved for generating the historical model. In this example embodiment, historical activity is modeled on the grid as a Dirichlet distribution, where there is a parameter for each cell representing the concentration of snaps in that cell for a window of time. Persons of ordinary skill in the art of statistical analysis will be familiar with Dirichlet distributions, and with using a Dirichlet-multinomial with respect to such a distribution. Worded differently, the distribution of snap density across the grid is not smoothed within the cells, but provides a single density value for each cell.

At operation 1612, each snap in the set of historical snaps is represented in the model as having a smoothed density estimate (e.g., a weight distribution) in three dimensions—two dimensions on the surface of the earth, and one in time. In this example embodiment, spatial distribution or smoothing of the snap is performed using a radially symmetric two-dimensional Epanechnikov kernel that is 90 m wide each direction. For distribution in time, an Epanechnikov kernel that is six hours wide is employed in this example embodiment. It will be appreciated that other smoothing parameters can be employed in other embodiments.

Considering that the time windows or time slices are in this example embodiment one hour long, it will be seen that each snap thus adds to several cells in several times slices. Further, modeling the weight distribution using a kernelling procedure means that the snap adds most to the cell it was taken in at the time it was taken, but influences other cells less and less the further away those cells are in space and in time. In other embodiments, a Gaussian distribution or kernel can be employed. Use of an Epanechnikov kernel, however, has computational benefits.

Such representation of a snap as having a weight distribution time and in space is repeated, at operation 1609, for each snap in the historical set.

At operation 618, respective weight parameter or density value is calculated for each cell based on the contributions of all distributed snaps whose weight distributions at least partially fall thereon. This is repeated, at operation 1615, for each time window, thus producing a set of historical models showing geographical distribution of historical activity for respective time windows.

It will be seen that, as summarized by operation 1621, the solution for each time window is a Dirichlet distribution whose parameters describe the concentration of snap density in S2 cells within a particular time window.

Describing what is happening currently, at operation 1520 (FIG. 16) is similar. At operation 1624, live or near live activity data showing the most recent hour of snaps is extracted. In this example embodiment, the process is filtered by imposing a per user limit of three snaps. In this instance, at most three snaps (chosen randomly) is selected from each user. From the filtered set, each snap (at operation 1609) is again represented probabilistically, at operation 1630, as having a density distribution. In this instance, however, a density estimate is calculated for each snap with the same space parameters (a 90 m Epanechnikov kernel), but with no time-based decay. In other words, the snaps have no time distribution and are represented as a probability cloud in two-dimensional space only.

At operation 1618, a density value is calculated for each cell similar to that described previously, giving a pseudo-count of snaps in each cell, where each individual snap has been "broken up" and smoothly applied to many cells in its neighborhood. Note again, in this instance that the weight distribution is applied across cells, but is not applied within a cell. Each cell has a single pseudo-count value.

The geographically distributed representation of the currently considered snaps is then scored, at operation 1640. For deviation/anomaly based on a corresponding time window of the historical model (retrieved at operation 1633). Entering the historical Dirichlet distribution into a Dirichlet-multinomial, where the sample-size parameter is the number of snaps observed in the current window, solves the problem directly. The 25th, 50th and 75th percentiles of counts in each S2 cell can now be determined, considered for a sample of snaps the same as currently observed, given the historical distribution of snaps as indicated by the corresponding model time slice. Then the score for each cell is calculated as the currently observed pseudo-count (O), less the median (M) divided by the interquartile range (IQR), that is, the 75th percentile minus the 25th.

$$\text{anomality score} = \frac{O - M}{IQR}$$

This anomaly score is roughly analogous to a number of standard deviations above the mean, a ratio that is common in settings where Gaussian distributions can be used or assumed. Calculating the quartiles of the beta-binomial in order to derive the respective cell anomaly scores is described separately below.

Figure 17:
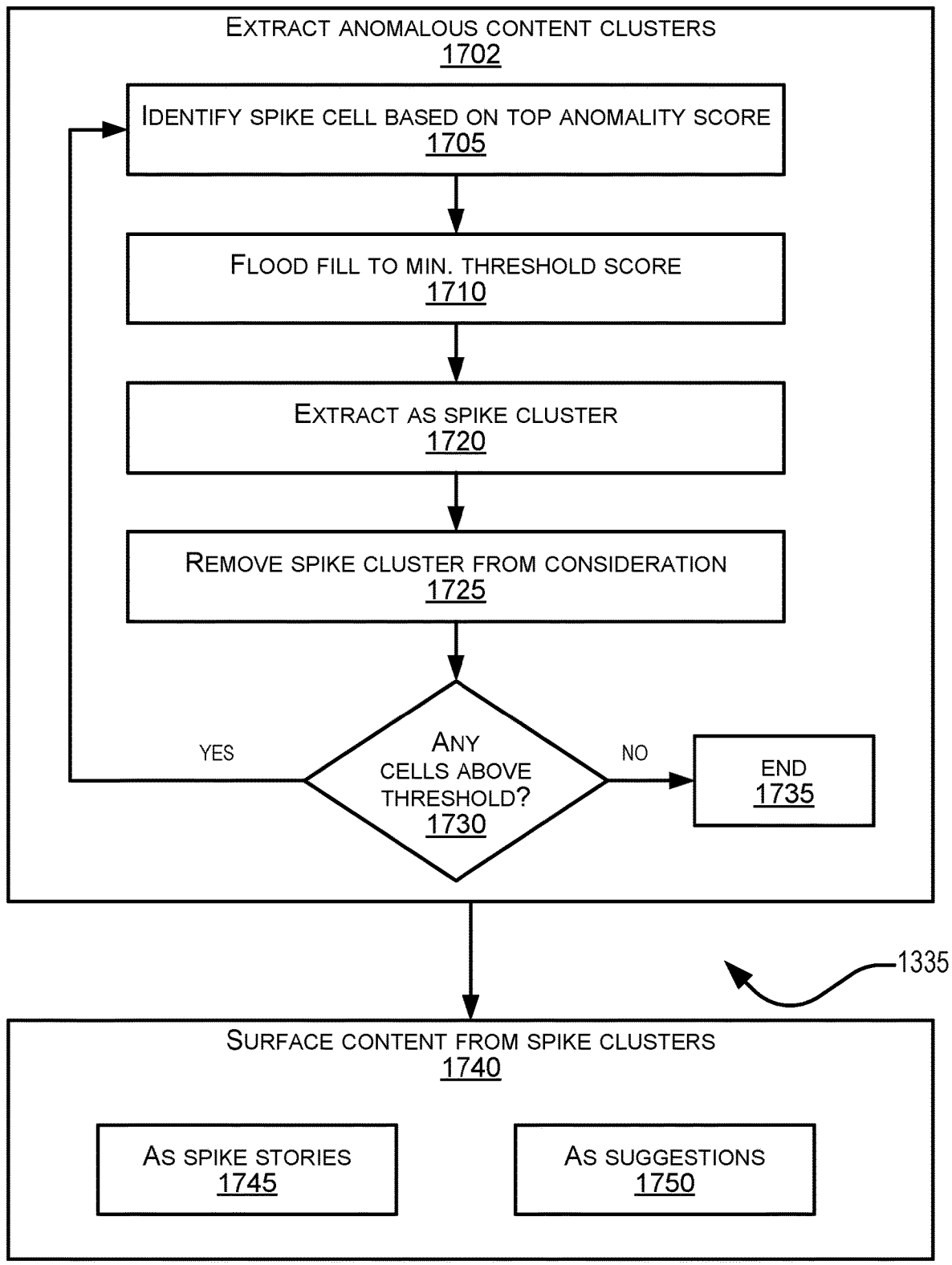
FIG. 17 is a flowchart illustrating a method of extracting clusters of unusual social media activity based on calculation of geographically distributed anomaly metrics for a target area, according to an example embodiment.

FIG. 17 shows a more detailed view of procedure 1535 for, based on the cell-wise anomaly scores, extracting spike clusters (being high-anomaly groups of cells clustered together) and identifying associated snaps for surfacing in the map GUI 612. In this example embodiment, extraction of a spike cluster comprises, at operation 1705, identifying a spike cell as that cell with the highest anomaly score in a target area. At operation 1710, the cluster is then flood filled out to a minimum threshold score (in this example embodiment being an anomaly score of 2.5 as cutoff).

The resultant group of clustered cells is extracted as a spike cluster, at operation 1720, and is removed from consideration, at operation 1725. At operation 1730, it is considered whether or not there are any remaining cells with an anomality scores above the threshold value. If so, the process is repeated to extract further spike clusters until there are no more above-threshold cells remaining, at which cluster extraction ends, at operation 1735.

Thereafter, snaps from the cell clusters are surfaced on the map GUI 612, at operation 1740. This can comprise compiling respective collections or spike stories based on the snaps located within the cells of the spike clusters. Such spike stories can, at operation 1745, be surfaced on the map 618 by respective spike icons 633. Instead, or in addition, spike stories may be surfaced as suggestions in the search interface 1010.

The particular embodiment described for identifying spatial clusters with the Dirichlet-multinomial scales to the planet on two 16-core and one 8-core Google Compute Engine (GCE) instances. In this manner, effective identification and surfacing of potentially interesting social media content via the Map GUI can be achieved in fully automated fashion.

Additional Considerations

Bearing in mind the described unusualness cluster identification and extraction procedure described with reference to FIGS. 15-17, selected statistical considerations and implementation choices of the particular example embodiment now follows.

With respect to probabilistic modeling of snaps as kernels, there are theoretical reasons to prefer the Epanechnikov kernel over the Gaussian. In the present embodiment, however, this also has practical benefits. The Epanechnikov kernel has finite support, meaning that outside of a certain domain its density drops to zero. The Gaussian has infinite support, which requires choosing a cutoff beyond which we ignore further contributions. Significantly, the Epanechnikov is very efficient to compute, requiring just a handful of floating point operations.

Figure 18A:
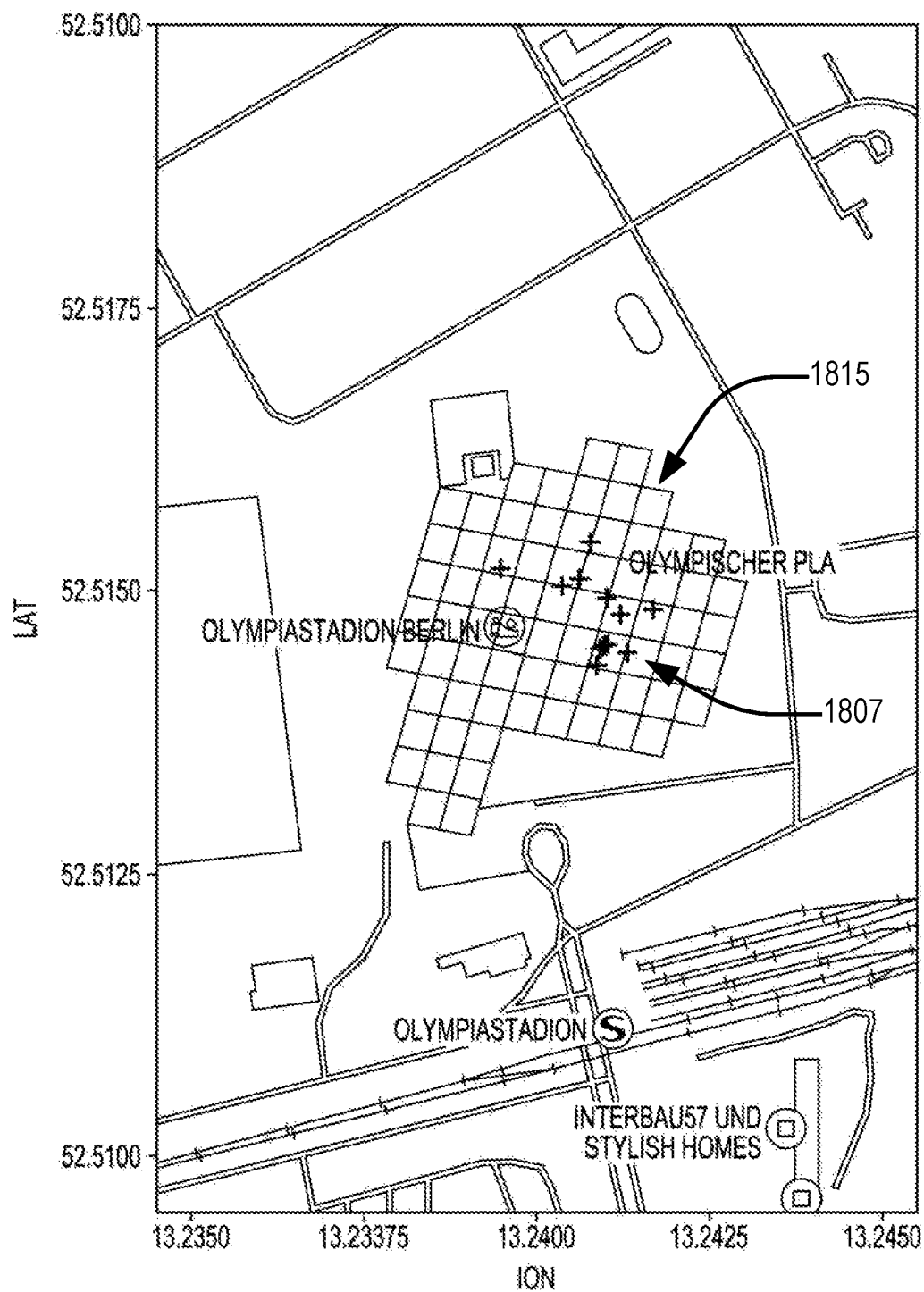
FIGS. 18A and 18B are map views illustrating an estimated density distribution calculated based on a set of social media items, according to an example embodiment.
Figure 18B:
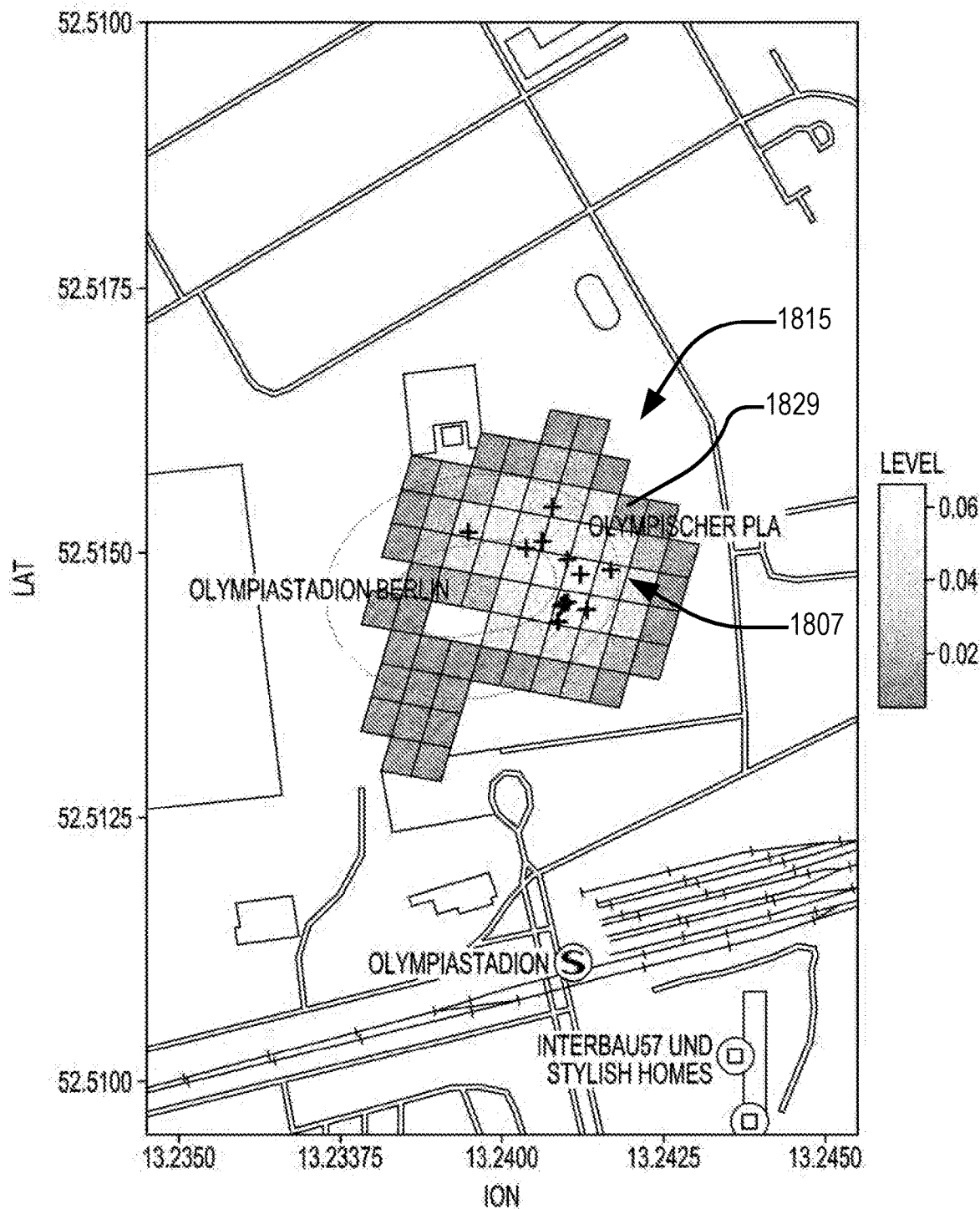

A sense of scale and of the modeled Dirichlet distributions for an example set of snaps is provided in FIGS. 18A and 18B, in which the respective locations of a set of snaps 1807 is shown overlaid on the Olympic Stadium in Berlin, a soccer and track and field venue. A corresponding portion of a grid 1815 provided by S2 level 18 is also shown. In FIG. 8B, a derived Dirichlet distribution 1829 based on the set of snaps 1807 is shown. Note that the drawings counterintuitively illustrated higher density values in lighter shades than lower density values.

Pertaining to selection of time window size and historical model size, a number of considerations apply. In this embodiment, the model identifies two types of day—weekdays and weekend days. Further, we break the world up into IANA timezones, making a model for each one separately. Thus, there is a model for each combination of a) time of day, b) day-class (weekend or weekday), and c) IANA timezone. That makes 24·4·2=192 models for each timezone. There are about 360 timezones in the IANA database that are tracked in this implementation, making for a total of roughly 70,000 models.

A further implementation detail is that a given user can contribute only a single snap (chosen randomly) to any one model. This prevents any one user from having undue influence, particularly in areas with sparse coverage.

Quartiles of the Beta-Binomial

To derive the score on based on the Dirichlet-multinomial, the quartiles—the 25th, 50th and 75th percentiles—for each bucket of a Dirichlet-multinomial is to be computed. Bear in mind that the Dirichlet distribution can be understood as indicating the probability of a single snap falling any one of the respective cells. Therefore, one way of calculating the quartiles (which is used in some embodiments) is to simulate a vast number of draws from the Dirichlet-multinomial, keeping track of the counts in each cell in each draw. Thereafter, the quartiles of the accumulated data in each cell can be computed.

In this example embodiment, however, the Dirichlet-multinomial is collapsed to a series of beta-binomials. Each cell's quartiles are the quartiles of a beta-binomial where one of the two shape parameters, alpha, is the value of the Dirichlet parameter for that cell. The other shape parameter, beta, is the sum of the Dirichlet parameters for all the other cells. In notation, if you have a Dirichlet-multinomial distribution, $$\text{Dirichlet-Multinomial}(\alpha, n)$$

Where $\alpha$ is a vector of concentration parameters $\alpha 1, \ldots, \alpha n$, then the density in the kth bin is distributed as beta-binomial, $$\text{Beta-binomial}\left(\alpha_k, \sum_{i \neq k} \alpha_k, n\right)$$

There is no simple analytic function that gives quantiles of the Beta-binomial, so the quartiles are found by summing up the density of the beta-binomial (given above) as we sweep over its range, noting where it crosses the quantiles of interest. Technically, the quantiles of the Beta-binomial can only be integers, but to achieve smoother scores the system in this example embodiment linearly interpolates for values greater than zero.

The procedure outlined above experiences difficulties when no snaps have been observed in the history of a given S2 cell, but one or more snaps are observed in the current time slice. All three of the quartile will be zero, and the score will be infinity. This can also happen when $\alpha_k$ is non-zero but sufficiently small. To this end, a lower bound is put on the IQR used in the score calculation.

In the present embodiment, the minimum IQR is set at 0.25, which requires three snaps all directly on top of one another in order to pass the minimum score threshold for cluster creation (2.5). More snaps are required if they are not directly on top of one another.

In another example embodiment, current snaps are distributed using a Gaussian kernel and a bandwidth of 35 meters in each direction. A different method to characterize the range of normal activity is via resampling. Bootstrapping is one example method. Because most of space is very thinly populated with snaps, a smooth bootstrap is used, adding Gaussian noise to each snap (a standard deviation of 1,800 s in time, and 25 m in each dimension of 2D-space) in resampling.

Thus, a number of example embodiments for surfacing content based on an unusualness metric is described above. Example embodiments that incorporate the above-described and illustrated aspects of the disclosure include the various example embodiments listed below as examples 28-39, which are to be read as forming part of the description.

Probabilistic Geo-Temporal Representation of Social Media Activity

As evident from the above example embodiments described with reference to FIGS. 15-18B, an aspect of the disclosure provides for determining one or more geo-temporal attributes of social media activity by a process comprising, for each of multiple social media postings, representing the posting as having a distribution in time and/or in space.

Thus, in some embodiments, representing respective postings as having a geo-temporal distribution comprises treating respective social media items as a probability cloud, for example having a Gaussian distribution or as an Epanechikov kernel. Instead, or in addition, the method in some embodiments comprise generating or extrapolating a historical model or historical representation of social media activity based at least in part on a resampling procedure executed with respect to a multiplicity of historical geo-tagged social media items. In one example embodiment, the resampling procedure comprises a bootstrapping operation.

In some embodiments, the representation of social media postings as having respective distributions in time and/or space is performed as part of an operation to represent a geo-temporal reference profile or model for historical social media activity for a particular geographical area. Instead, or in addition, the representation of social media postings as having respective distributions in time and/or space may be performed as part of a procedure to represent recent or near-live social media activity in the particular geographical area. In such cases, the geo-temporal reference profile and the representation of the recent or near-live social media activity may be used in combination to identify within the geographic area one or more regions of interesting or anomalous social media activity.

Thus, a number of example embodiments based on representing social media items probabilistically has been described above. Example embodiments that incorporate the above-described and illustrated aspects of the disclosure include the various example embodiments listed below as examples 40-56, which are to be read as forming part of the description.

Icon Variation Based on Activity Value

As described previously, one aspect of the disclosure provides for automated variation of a visual attribute of user selectable user interface elements for respective collections of social media items based on respectively associated social media activity metrics. FIG. 19 is a schematic flow chart illustrating a high-level view of a method 1900 of providing such dynamic variation in appearance of collection icons in a map-based GUI for a social media platform, according to an example embodiment.

The method 1900 is in this example embodiment executed by a system 1200 as described with reference to FIG. 12, using the system architecture and environment described with reference to FIGS. 1-5. Moreover, the example method 1900 in this example embodiment provides the particular example embodiment described previously with reference to FIG. 6B, in which an on-screen size of respective story icons 631, 633 is variable based on respectively associated activity values. The various operations that provide the respective functionalities described with reference to the example map GUI 612 of FIGS. 6A-11B are to be read as forming part of the method 1900, even though, for avoidance of repetition, not all of the different operations previously described are repeated in the description that follows.

At operations 1910 and 1920, the social media platform system 1200 determines an associated social media activity metric value for each of a number of social media collections (here, stories) that are to be represented on the map 618 by respective geo-anchored user interface elements, in this example story icons 631, 633 (FIG. 6B).

In this example embodiment, the method 1900 provides for variation in icon size, and provides for variation of place icons 631 and spike icons 633 on different activity metrics. In particular, the size of place icons 631 is variable based on associated snap volume (with greater snap volume corresponding to greater display size), while the size of spike icons 633 is variable based on associated unusualness as indicated by a corresponding anomaly score. The operation 1920 of determining respective activity metric scores in this example embodiment thus includes calculation of respective anomality scores for respective spike stories using the methods described with reference to FIGS. 15-18. In another example embodiment, place icons 631 have a consistent, invariable on-screen size, while the size of only spike icons 633 is variable.

At operation 1930, the map engine 1208 determines a respective display size for each of the variable of icons 631, 633, based on predefined criteria using snap volume for the place icons 631 and anomaly score for the spike icons 633. In this example embodiment, respective icon size values are generated by the map engine 1208 and written to respective map data tiles that defines the location and size of each of the icons 631, 633 that is to be displayed in a corresponding geographical area.

At operation 1940, the map engine 1208 causes display of an instance of the map GUI 612 for a particular geographical area corresponding to the map viewport 621, in which the on-screen sizes of the respective icons 631, 633 vary according to the previously determined values. In this example embodiment, this is achieved by serving to the requesting client device 102 the map data tiles corresponding to the requested view, thus communicating to the client device 102 respective sizes at which the different icons 631, 633 are to be rendered.

In this manner, the respective story icons 631, 633 serves the dual purpose not only of providing geographically anchored elements that can be selected to perform one or more functions with respect to the associated story (e.g., to replay the story), but also communicates in a minimally invasive manner information of significant importance with respect to the associated story. For example, the user is immediately and intuitively informed how unusual a spike story is based on the size of the corresponding spike icon 633. Thus, the limited available screen area, used in the example embodiment of the map GUI 612 to convey a large amount and variety of information, is used more effectively than would otherwise be the case.

Thus, a number of example embodiments based on automated variance of icon appearance based on an associated activity metric has been described. Example embodiments that incorporate the above-described and illustrated aspects of the disclosure include the various example embodiments listed below as examples 57-68, which are to be read as forming part of the description.

Recapitulation of Selected Example Embodiments

From the preceding description it will be seen that a number of example embodiments and combinations of example embodiments are disclosed. The disclosed embodiments include, but are not limited to, the enumerated list of example embodiments that follow.

Example 1: A method comprising:
generating a map-based graphical user interface (GUI) for a social media platform, the map-based GUI including an interactive map that shows a geographical area; and causing display on the interactive map of a heatmap overlaid on the displayed geographical area to indicate geographical distribution of a metric of user activity on the social media platform.

Example 2: The method of example 1, wherein the metric of user activity indicated by the heatmap is based on user activity limited to posting of geo-tagged social media content that is published for general accessibility.

Example 3: The method of examples 1-2, further comprising:

causing display overlaid on the heatmap of a plurality of gallery icons at different respective locations on the interactive map, each gallery icon corresponding in location to a respective location-based social media gallery, each social media gallery comprising a respective set of social media items grouped together based at least in part on respective geotag data; and responsive to receiving user input indicating selection of a particular one of the plurality of gallery icons, causing automated sequential reproduction of the corresponding set of social media items.

Example 4: The method of examples 1-3, wherein the causing display of the interactive map comprises:

at a server system, receiving from a user device a request for information to display on the user device the interactive map for a target geographical area; and from the server system, serving to the user device a set of heatmap data points for the target geographical area, enabling rendering of the heatmap in the interactive map by the user device.

Example 5: The method of examples 1-4, wherein the heatmap indicates a density of social media posting events, different levels of posting density corresponding to different coloration of the heatmap.

Example 6: The method of examples 1-4, wherein the metric of user activity indicated by the heatmap is based at least on part on an anomaly metric that indicates a level of geo-temporal unusualness of social media item posting.

Example 7: The method of examples 1-6, further comprising: accessing a data set of posting events;

pruning the data set exclude a number of posting events from the data set, thereby to form a pruned data set; and causing display of the heatmap based on the pruned data set.

Example 8: The method of example 7, wherein the pruning of the data set comprises imposing a per-user limit, such that the pruned data set includes no more than a predefined maximum number of posting events from any individual user.

Example 9: The method of examples 7-8, wherein the pruning of the data set comprises identifying a set of excluded posting events based at least in part on age values of respective users associated with the excluded posting events.

Example 10: The method of example 9, wherein the identifying of the set of excluded posting events is additionally based at least in part on satisfaction by each excluded posting event of an isolation criterion that defines a threshold geographical isolation of the respective posting event in the data set.

Example 11: A system comprising: one or more computer processor devices:

one or more memory devices having stored thereon instructions that configure the one or more computer processor devices, when executing the instructions, to perform operations comprising the method of any one of examples 1-10.

Example 12: A non-transitory computer readable storage medium having stored thereon instructions for causing a machine, when executing the instructions, to perform operations comprising the method of any one of examples 1-10.

Example 13: A method comprising:

accessing activity information indicating social media activity of a user, the activity information including location information indicating an actual geographic location associated with the social media activity;

determining that the social media activity satisfies predefined location fuzzing criteria; and conditional upon the determining that the location fuzzing criteria are satisfied for the social media activity, causing display on a map-based graphical user interface (GUI) for a social media platform a visual representation of the social media activity at a non-accurate location that is spaced from the actual geographic location.

Example 14: The method of example 13, wherein the location fuzzing criteria are based at least in part on one or more attributes of the user.

Example 15: The method of examples 13-14, further comprising, responsive to determining that the social media activity satisfies the location fuzzing criteria, performing an automated location fuzzing procedure that calculates the non-accurate location based at least in part on the actual location of the social media activity.

Example 16: The method of example 15, wherein the social media activity comprises posting by the user of a social media item having geo-tag information indicating the actual location, the visual representation in the map-based GUI representing the social media item at the non-accurate location.

Example 17: The method of example 16, wherein the map-based GUI includes a heatmap overlaid on an interactive map forming part of the map-based GUI, the visual representation of the social media item comprising a portion of the heatmap generated at the inaccurate location based at least in part on the social media item.

Example 18: The method of examples 16-17, wherein the determining that the social media item satisfies the location fuzzing criteria includes determining that the social media item satisfies predefined isolation criteria based at least in part on geographic proximity to other social media items, being social media items posted by other users of the social media platform.

Example 19: The method of example 18, wherein the isolation criteria specify a threshold number and a threshold proximity radius from the actual location of the social media item, the social media item being identified as satisfying the isolation criteria conditional upon a count of other social media items that have actual locations within the proximity radius being smaller than the threshold number.

Example 20: The method of example 19, wherein the isolation criteria additionally specify a time interval, other social media items included in the count being limited to social media items having respective timestamp information covering a span of no more than the time interval.

Example 21: The method of examples 16-20, further comprising calculating a fuzzing distance by which the non-accurate location is spaced from the actual location based at least in part on a population density value associated with a geographic area in which the action location is situated, such that the fuzzing distance is variable based on variation in associated population density.

Example 22: The method of examples 16-21, wherein the location fuzzing procedure is a nonrandom procedure.

Example 23: The method of examples 22, wherein the location fuzzing procedure is such that the non-accurate location is constant for different social media items posted by the same user at the same actual location.

Example 24: The method of examples 22-23, wherein the location fuzzing procedure calculates a fuzzing distance and a fuzzing direction that define spacing of the non-accurate location relative to the actual location, the location fuzzing procedure being based at least in part on a value of the actual location, such that different social media items posted by the same user at different actual locations differ in at least one of the fuzzing distance and the fuzzing direction.

Example 25: The method of examples 16-21, wherein the location fuzzing procedure is based at least in part on a randomly generated value.

Example 26: A system comprising:
one or more computer processor devices:
one or more memory devices having stored thereon instructions that configure the one or more computer processor devices, when executing the instructions, to perform operations comprising the method of any one of examples 13-25.

Example 27: A non-transitory computer readable storage medium having stored thereon instructions for causing a machine, when executing the instructions, to perform operations comprising the method of any one of examples 13-25.

Example 28: A method comprising:
accessing activity data that indicate a geographical distribution of social media content posted to a social media platform within a target time period, the social media content comprising multiple social media items associated with respective locations within a geographical area;
in an automated operation based on the activity data and performed using an analyzer comprising one or more computer processor devices configured therefor, calculating different values for an anomaly metric at different positions within the geographical area, each anomaly metric value indicating a level of unusualness represented by the activity data in the corresponding portion; and
based on the respective anomaly metrics, surfacing one or more subsets of the social media content in a graphical user interface for the social media platform.

Example 29: The method of example 28, wherein the calculating of the anomaly metric values comprises:
dividing the geographical area into a grid comprising multiple cells; and calculating a respective anomaly metric value for each cell.

Example 30: The method of example 29, further comprising:
identifying one or more spike cells based on their respective anomaly metric values, the spike cells having higher metric values than non-spike cells, a higher anomaly metric value indicating a greater level of unusualness; and
compiling the one or more subsets of social media content for surfacing based on location of the respective social media items within the one or more spike cells.

Example 31: The method of example 30, wherein the identifying of the one or more spike cells comprises:
identifying as spike cell that cell of the grid whose anomaly metric value is highest; and
identifying a spike cluster comprising a cluster of contiguous spike cells by flood filling from the spike cell to a predefined minimum threshold for the anomality metric value,
wherein the method further comprises:
defining a spike collection that comprises multiple social media items forming part of the social media content and having respective locations falling within the spike cluster; and surfacing the spike collection in the graphical user interface.

Example 32: The method of examples 29-31, wherein the calculating of the anomality metric values is based at least in part on historical activity data that indicate a geographical distribution of historical social media content posted to the social media platform prior to the target time period.

Example 33: The method of example 32, further comprising the prior operation of:
accessing the historical activity data; and
based on historical activity data, compiling a geo-temporal model that represents, for each one of a plurality of time windows, a respective distribution of historical activity levels across the grid,
wherein the calculating of each anomaly metric value is based at least in part on, for the respective cell and for a particular applicable time window of the model, a deviation between the historical activity level and an activity level indicated by the activity data.

Example 34: The method of example 33, wherein the compiling of the geo-temporal model comprises:
representing each one of multiple historical social media items as having a geo-temporal weight distribution, so a weight of the social media item is distributed across a plurality of neighboring grid cells and a plurality of time windows; and
for each cell in each time window, aggregating the respective portions of all social media items whose weight distribution falls at least partially thereon, thereby calculating a respective historical activity level for the cell.

Example 35: The method of example 33, further comprising:
representing each social media item as having a geographical weight distribution, so a weight of the social media item is distributed across a plurality of cells,
wherein the calculating of the respective anomaly values is based at least in part on aggregated weight distribution of the multiple social media items.

Example 36: The method of examples 28-35, wherein the graphical user interface comprises an interactive map, and wherein the surfacing of the one or more subsets comprises:
based at least in part of the calculated anomaly metrics, compiling one or more collections of social media items; and
causing display in the interactive map of a respective geo-anchored collection icon for each of the one or more collections, each collection icon being user-selectable to trigger replay in the graphical user interface of the corresponding collection of social media items.

Example 37: The method of example 36, further comprising calculating an on-screen size of each collection icon based at least in part on the respective anomaly value of a geographical position associated with the collection icon.

Example 38: A system comprising: one or more computer processor devices:

one or more memory devices having stored thereon instructions that configure the one or more computer processor devices, when executing the instructions, to perform operations comprising the method of any one of examples 28-37.

Example 39: A non-transitory computer readable storage medium having stored thereon instructions for causing a machine, when executing the instructions, to perform operations comprising the method of any one of examples 28-37.

Example 40: A method comprising:

determining one or more attributes of social media activity in a geographical area in an automated process comprising, for each of multiple social media postings forming part of the social media activity, representing the posting as having a density distribution in two-dimensional space; and causing display as part of a graphical user interface (GUI) for a social media platform one or more user interface elements that are determined based at least in part on the one or more attributes of the social media activity.

Example 41: The method of example 40, wherein the density distribution for each posting is centered on a posting location associated with the posting, density of the distribution decreasing radially from the posting location.

Example 42: The method of example 40 or example 41, wherein the representing of each posting as having a density distribution comprises an automated kernel smoothing procedure.

Example 43: The method of example 42, wherein the kernel smoothing procedure is based on an Epanechnikov kernel.

Example 44: The method of any one of examples 40-43, further comprising calculating a geographical distribution of posting density in the geographical area by summing, at each of multiple positions within the geographical area, respective density contributions of each posting whose density distribution at least partially overlaps the respective position.

Example 45: The method of example 44, wherein the calculating of the geographical distribution of posting density comprises:

dividing the geographical area into a grid of cells; and for each cell, summing the density contribution of each posting whose density distribution at least partially overlaps the respective cell.

Example 46: The method of any one of examples 40-45, further comprising representing each posting as additionally having a density distribution in time.

Example 47: The method of example 46, further comprising:

generating respective geographic density distribution models for each of a plurality of time windows, the density distribution of each posting being centered on a time window corresponding with a timestamp of the posting, and the density of the distribution decreasing in other time windows with an increase in time difference between the time stamp and the respective time window.

Example 48: The method of example 47, wherein representing each posting as having a density distribution in time comprises applying a kernel smoothing procedure in time space.

Example 49: The method of example 48, wherein the kernel smoothing procedure in time space is based on an Epanechnikov kernel.

Example 50: The method of any one of examples 40-49, further comprising:

accessing social media activity data indicating a set of social media postings within the geographical area; and filtering the set of social media postings by imposing a maximum number of postings per unique user, thereby deriving a filtered data set, wherein the determining of the one or more attributes of social media activity in the geographical area is performed using the filtered data set.

Example 51: The method of example 50, wherein the maximum number of postings per unique user is one.

Example 52: The method of any one of examples 40-51, wherein:

the one or more attributes of the social media activity includes a geographical distribution of unusualness of posting activity within the geographical area, and wherein representation of each posting as having a density distribution is applied to historical social media activity data to derive a historical model of social media activity in the geographical area.

Example 53: The method of example 52, further comprising calculating a geographical distribution of current social media activity, the current social media activity being represented by a set of social media postings within a predefined preceding time period, the calculating of the geographical distribution of current social media activity being based at least in part on representing each posting in the set as having a respective density distribution.

Example 54: The method of example 53, further comprising calculating the geographical distribution of unusualness of posting activity within the geographical area based on automated comparison of the historical model of social media activity and the calculated geographical distribution of the current social media activity.

Example 55: A system comprising:

one or more computer processor devices:

one or more memory devices having stored thereon instructions that configure the one or more computer processor devices, when executing the instructions, to perform operations comprising the method of any one of examples 40-54.

Example 56: A non-transitory computer readable storage medium having stored thereon instructions for causing a machine, when executing the instructions, to perform operations comprising the method of any one of examples 40-54.

Example 57: A method comprising:

providing display on a user device of a graphical user interface (GUI) for a social media platform, the graphical user interface providing access to social media items posted to the social media platform;

for each of a plurality of collections of social media items, determining a respective activity metric for underlying social media activity associated with the corresponding collection; and for each of the plurality of collections of social media items, causing display of a respective user-selectable user interface element as part of the GUI, the user interface element having a visual attribute that is variable dependent on the activity metric, such that the visual attribute for at least two of the plurality of collections of social media items differ based on a difference between the corresponding activity metrics.

Example 58: The method of example 57, wherein each of the user interface elements is a collection icon representing the corresponding collection of social media items, the collection icon being user-selectable to trigger replay of the corresponding collection of social media items.

Example 59: The method of example 58, wherein each collection icon comprises a respective thumbnail image selected from visual media content forming part of one of the corresponding collection of social media items.

Example 60: The method of example 58 or example 59, wherein the variable visual attribute of the collection icon comprises an on-screen display size of the collection icon.

Example 61: The method of any one of examples 57-60, wherein the underlying social media activity comprises a set of geo-tagged social media items that are associated with the corresponding user interface element based at least in part on respective geographical locations indicated by geo-tag information of the social media items.

Example 62: The method of example 61, wherein location-based association between the set of geo-tagged social media items and the corresponding user interface element comprises that the geographical location of each of the set of social media items falls within a predefined geographical area associated with the user interface element.

Example 63: The method of any one of examples 57-62, wherein the activity metric comprises an anomaly metric indicating a level of unusualness for the underlying social media activity.

Example 64: The method of example 63, wherein the anomaly metric provides a quantified indication of geospatial unusualness of the underlying social media activity.

Example 65: The method of any one of examples 57-62, wherein the activity metric comprises a posting volume metric indicating a volume of social media items posted to a corresponding geographical area.

Example 66: The method of any one of examples 57-65, wherein the GUI is a map-based GUI that includes an interactive map displaying a part of the Earth's surface, each of the plurality of user interface elements for the collections of social media items being a geo-anchored element displayed at a corresponding fixed geographical location.

Example 67: A system comprising:
one or more computer processor devices:
one or more memory devices having stored thereon instructions that configure the one or more computer processor devices, when executing the instructions, to perform operations comprising the method of any one of examples 57-66.

Example 68: A non-transitory computer readable storage medium having stored thereon instructions for causing a machine, when executing the instructions, to perform operations comprising the method of any one of examples 57-66.

Machine and Software Architecture

These systems, system components, methods, applications, and so forth described in conjunction with FIGS. 1-12 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines configured for particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. The software and hardware architectures presented here are example architectures for implementing the disclosure, and are not exhaustive as to possible architectures that can be employed for implementing the disclosure.

Software Architecture

FIG. 20 is a block diagram illustrating an example software architecture 2006, which may be used in conjunction with various hardware architectures herein described. FIG. 20 is a non-limiting example of a software architecture, and it will be appreciated that many other architectures may be implemented to facilitate the functionality described herein. The software architecture 2006 may execute on hardware such as a machine 2100 of FIG. 21 that includes, among other things, processors 2104, memory 2114, and I/O components 2118. A representative hardware layer 2052 is illustrated and can represent, for example, the machine 2100 of FIG. 21. The representative hardware layer 2052 includes a processing unit 2054 having associated executable instructions 2004. The executable instructions 2004 represent the executable instructions of the software architecture 2006, including implementation of the methods, components, and so forth described herein. The hardware layer 2052 also includes memory and/or storage modules memory/storage 2056, which also have the executable instructions 2004. The hardware layer 2052 may also comprise other hardware 2058.

In the example architecture of FIG. 20, the software architecture 2006 may be conceptualized as a stack of layers where each layer provides particular functionality. For example, the software architecture 2006 may include layers such as an operating system 2002, libraries 2020, frameworks/middleware 2018, applications 2016, and a presentation layer 2014. Operationally, the applications 2016 and/or other components within the layers may invoke application programming interface (API) calls 2008 through the software stack and receive a response in the form of messages 2008. The layers illustrated are representative in nature, and not all software architectures have all layers. For example, some mobile or special-purpose operating systems may not provide a frameworks/middleware 2018, while others may provide such a layer. Other software architectures may include additional or different layers.

The operating system 2002 may manage hardware resources and provide common services. The operating system 2002 may include, for example, a kernel 2022, services 2024, and drivers 2026. The kernel 2022 may act as an abstraction layer between the hardware and the other software layers. For example, the kernel 2022 may be responsible for memory management, processor management (e.g., scheduling), component management, networking, security settings, and so on. The services 2024 may provide other common services for the other software layers. The drivers 2026 are responsible for controlling or interfacing with the underlying hardware. For instance, the drivers 2026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2020 provide a common infrastructure that is used by the applications 2016 and/or other components and/or layers. The libraries 2020 provide functionality that allows other software components to perform tasks in an easier fashion than by interfacing directly with the underlying operating system 2002 functionality (e.g., kernel 2022, services 2024, and/or drivers 2026). The libraries 2020 may include system libraries 2044 (e.g., C standard library) that may provide functions such as memory allocation functions, string manipulation functions, mathematical functions, and the like. In addition, the libraries 2020 may include API libraries 2046 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 2020 may also include a wide variety of other libraries 2048 to provide many other APIs to the applications 2016 and other software components/modules.

The frameworks/middleware 2018 provides a higher-level common infrastructure that may be used by the applications 2016 and/or other software components/modules. For example, the frameworks/middleware 2018 may provide various graphic user interface (GUI) functions, high-level resource management, high-level location services, and so forth. The frameworks/middleware 2018 may provide a broad spectrum of other APIs that may be utilized by the applications 2016 and/or other software components/modules, some of which may be specific to a particular operating system 2002 or platform.

The applications 2016 include built-in applications 2038 and/or third-party applications 2040. Examples of representative built-in applications 2038 may include, but are not limited to, a contacts application, a browser application, a book reader application, a location application, a media application, a messaging application, and/or a game application. The third-party applications 2040 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 2040 may invoke the API calls 2008 provided by the mobile operating system (such as the operating system 2002) to facilitate functionality described herein.

The applications 2016 may use built-in operating system 2002 functions (e.g., kernel 2022, services 2024, and/or drivers 2026), libraries 2020, and frameworks/middleware 2018 to create user interfaces to interact with users of the system. Alternatively, or additionally, in some systems interactions with a user may occur through a presentation layer, such as the presentation layer 2014. In these systems, the application/component "logic" can be separated from the aspects of the application/component that interact with a user.

Hardware Architecture

FIG. 21 is a block diagram illustrating components of a machine 2100, according to some example embodiments, able to read instructions from a machine-readable medium (e.g., a machine-readable storage medium) and perform any one or more of the methodologies discussed herein. Specifically, FIG. 21 shows a diagrammatic representation of the machine 2100 in the example form of a computer system, within which instructions 2110 (e.g., software, a program, an application, an applet, an app, or other executable code) for causing the machine 2100 to perform any one or more of the methodologies discussed herein may be executed. As such, the instructions 2110 may be used to implement modules or components described herein. The instructions 2110 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2110, sequentially or otherwise, that specify actions to be taken by the machine 2100. Further, while only a single machine 2100 is illustrated, the term "machine" shall also be taken to include a collection of machines that individually or jointly execute the instructions 2110 to perform any one or more of the methodologies discussed herein.

The machine 2100 may include processors 2104, memory/storage 2106, and I/O components 2118, which may be configured to communicate with each other such as via a bus 2102. The memory/storage 2106 may include a memory 2114, such as a main memory, or other memory storage, and a storage unit 2116, both accessible to the processors 2104 such as via the bus 2102. The storage unit 2116 and memory 2114 store the instructions 2110 embodying any one or more of the methodologies or functions described herein. The instructions 2110 may also reside, completely or partially, within the memory 2114, within the storage unit 2116, within at least one of the processors 2104 (e.g., within the processor's cache memory), or any suitable combination thereof, during execution thereof by the machine 2100. Accordingly, the memory 2114, the storage unit 2116, and the memory of the processors 2104 are examples of machine-readable media. In some embodiments, the processors 2104 comprise a number of distributed processors 2108-2112, each of which have access to associated memories storing instructions 2110.

The I/O components 2118 may include a wide variety of components to receive input, provide output, produce output, transmit information, exchange information, capture measurements, and so on. The specific I/O components 2118 that are included in a particular machine 2100 will depend on the type of machine. For example, portable machines such as mobile phones will likely include a touch input device or other such input mechanisms, while a headless server machine will likely not include such a touch input device. It will be appreciated that the I/O components 2118 may include many other components that are not shown in FIG. 21. The I/O components 2118 are grouped according to functionality merely for simplifying the following discussion, and the grouping is in no way limiting. In various example embodiments, the I/O components 2118 may include output components 2126 and input components 2128. The output components 2126 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2128 may include alphanumeric input components (e.g., a keyboard, a touchscreen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touchscreen that provides location and/or force of touches or touch gestures, or other tactile input components), audio input components (e.g., a microphone), and the like.

In further example embodiments, the I/O components 2118 may include biometric components 2130, motion components 2134, environment components 2136, or position components 2138 among a wide array of other components. For example, the biometric components 2130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2134 may include acceleration sensor components (e.g., accelerometer), gravitation sensor components, rotation sensor components (e.g., gyroscope), and so forth. The environment components 2136 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 2138 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2118 may include communication components 2140 operable to couple the machine 2100 to a network 2132 or devices 2120 via a coupling 2124 and a coupling 2122 respectively. For example, the communication components 2140 may include a network interface component or other suitable device to interface with the network 2132. In further examples, the communication components 2140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2120 may be another machine or any of a wide variety of peripheral devices (e.g., a peripheral device coupled via a Universal Serial Bus (USB)).

Moreover, the communication components 2140 may detect identifiers or include components operable to detect identifiers. For example, the communication components 2140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2140, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible media to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronic system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

"EPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory. "Snaps" as referenced in the description are ephemeral messages. Ephemeral messages are not limited to communications having specified individual recipients, but include social media items uploaded to a gallery or a collection for viewing by multiple users. Thus, the term ephemeral message includes a photo or video clip (which may be augmented or unaugmented) made available for a time-limited duration for viewing public or by a "MACHINE-READABLE MEDIUM" in this context refers to a component, a device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

LANGUAGE

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated, unless that the context and/or logic clearly indicates otherwise. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. The specification and drawings are, accordingly, to be regarded in an illustrative rather than a restrictive sense.

What is claimed is:

1. A method comprising:

accessing current activity data indicative of current user activity with respect to posting of social media content to a social media platform within a current time window limited to a predefined preceding time period, the social media content comprising social media items associated with respective geographical locations within a geographical area, a geographical distribution of the current user activity thus being indicated by the current activity data;

in an automated operation based on the current activity data and performed using an analyzer comprising one or more computer processor devices configured therefor, calculating a respective anomaly metric value for each one of multiple predefined constituent map portions of the geographical area, each anomaly metric value quantifying, for a respectively corresponding one of the map portions, unusualness in volume of current user activity relative to historical user activity for the corresponding map portion, each anomaly metric value being based at least in part on a deviation between:

location-associated current user activity represented by the current activity data in the corresponding map portion; and a statistical representation of historical user activity in the corresponding map portion for a corresponding time window historically, the historical user activity being indicated by historical activity data;

ranking the predefined constituent map portions according to the respective anomaly metric values; and based on the ranking, surfacing one or more subsets of the social media content in a graphical user interface for the social media platform.

2. The method of claim 1, wherein the calculating of the anomaly metric values comprises:

defining said multiple map portions by dividing the geographical area into a grid comprising multiple cells, each cell providing a respective map portion; and calculating a respective anomaly metric value for each cell.

3. The method of claim 2, further comprising:

identifying one or more spike cells based on their respective anomaly metric values, the spike cells having higher anomaly metric values than non-spike cells, a higher anomaly metric value indicating relatively greater unusualness; and compiling the one or more subsets of social media content for surfacing based on location of the respective social media items within the one or more spike cells.

4. The method of claim 3, wherein the identifying of the one or more spike cells comprises:

identifying as a spike cell that cell of the grid whose respective anomaly metric value is highest; and identifying a spike cluster comprising a cluster of contiguous spike cells by flood filling from the spike cell to a predefined minimum threshold for the anomaly metric value, wherein the method further comprises:

defining a spike collection that comprises multiple social media items forming part of the social media content and having respective locations falling within the spike cluster; and surfacing the spike collection in the graphical user interface.

5. The method of claim 2, wherein the historical activity data indicates a geographical distribution of historical social media content posted to the social media platform prior to said current time window.

6. The method of claim 5, further comprising prior operations of:

accessing the historical activity data; and based on the historical activity data, compiling a geo-temporal model that represents, for each one of a plurality of time windows, a respective distribution of historical activity levels across the grid, wherein the calculating of each anomaly metric value is based at least in part on, for the respective cell and for a particular applicable time window of the model, a deviation between the historical activity level and an activity level indicated by the current activity data for said current time window.

7. The method of claim 6, wherein the compiling of the geo-temporal model comprises:

representing each one of multiple historical social media items as having a geo-temporal weight distribution, so a weight of the social media item is distributed across a plurality of neighboring grid cells and a plurality of time windows; and for each cell in each time window, aggregating the respective portions of all social media items whose weight distribution falls at least partially thereon, thereby calculating a respective historical activity level for the cell.

8. The method of claim 6, further comprising:

representing each social media item as having a geographical weight distribution, so a weight of the social media item is distributed across a plurality of cells, wherein the calculating of the respective anomaly metric values is based at least in part on aggregated weight distribution of multiple social media items forming part of the social media content.

9. The method of claim 1, wherein the graphical user interface comprises an interactive map, and wherein the surfacing of the one or more subsets comprises:

based at least in part of the calculated anomaly metric values, compiling one or more collections of social media items; and causing display in the interactive map of a respective geo-anchored collection icon for each of the one or more collections, each collection icon being user-selectable to trigger replay in the graphical user interface of the corresponding collection of social media items.

10. The method of claim 9, further comprising calculating an on-screen size of each collection icon based at least in part on the respective anomaly metric value of a geographical position associated with the collection icon.

11. A system comprising:

one or more computer processor devices:

one or more memory devices having stored thereon instructions that configure the one or more computer processor devices, when executing the instructions, to perform operations comprising:

accessing current activity data indicative of current user activity with respect to posting of social media content to a social media platform within a current time window limited to a predefined preceding time period, the social media content comprising social media items associated with respective geographical locations within a geographical area, a geographical distribution of the current user activity thus being indicated by the current activity data;

in an automated operation based on the current activity data, calculating a respective anomaly metric value for each one of multiple predefined constituent map portions of the geographical area, each anomaly metric value quantifying, for a respectively corresponding one of the map portions, unusualness in volume of current user activity relative to historical user activity for the corresponding map portion, each anomaly metric value being based at least in part on a deviation between:

location-associated current user activity represented by the current activity data in the corresponding map portion; and a statistical representation of historical user activity in the corresponding map portion for a corresponding time window historically, the historical user activity being indicated by historical activity data;

ranking the predefined constituent map portions according to the respective anomaly metric values; and based on the ranking, surfacing one or more subsets of the social media content in a graphical user interface for the social media platform.

12. The system of claim 11, wherein the instructions configure the system to calculate the anomaly metric values in a procedure comprising:

defining said multiple map portions by dividing the geographical area into a grid comprising multiple cells, each cell providing a respective map portion; and calculating a respective anomaly metric value for each cell.

13. The system of claim 12, wherein the instructions configure the system to perform further operations comprising:

identifying one or more spike cells based on their respective anomaly metric values, the spike cells having higher anomality metric values than non-spike cells, a higher anomality metric value indicating relatively greater unusualness; and compiling the one or more subsets of social media content for surfacing based on location of the respective social media items within the one or more spike cells.

14. The system of claim 13, wherein the instructions configure the system to identify the one or more spike cells by a procedure:

identifying as a spike cell that cell of the grid whose respective anomality metric value is highest; and identifying a spike cluster comprising a cluster of contiguous spike cells by flood filling from the spike cell to a predefined minimum threshold for the anomality metric value, and wherein the instructions configure the system to perform further operations comprising:

defining a spike collection that comprises multiple social media items forming part of the social media content and having respective locations falling within the spike cluster; and surfacing the spike collection in the graphical user interface.

15. The system of claim 12, wherein the historical activity data indicate a geographical distribution of historical social media content posted to the social media platform prior to said current time window.

16. The system of claim 15, wherein the instructions further configure the system to perform, preparatory to calculating the anomality metric values, operations comprising:

accessing the historical activity data; and based on the historical activity data, compiling a geo-temporal model that represents, for each one of a plurality of time windows, a respective distribution of historical activity levels across the grid, wherein the calculating of each anomality metric value is based at least in part on, for the respective cell and for a particular applicable time window of the model, a deviation between the historical activity level and an activity level indicated by the current activity data for said current time window.

17. The system of claim 16, wherein the instructions configure the system to compile the geo-temporal model by a procedure comprising:

representing each one of multiple historical social media items as having a geo-temporal weight distribution, so a weight of the social media item is distributed across a plurality of neighboring grid cells and a plurality of time windows; and for each cell in each time window, aggregating the respective portions of all social media items whose weight distribution falls at least partially thereon, thereby calculating a respective historical activity level for the cell.

18. The system of claim 16, wherein the instructions configure the system to perform further operations comprising:

representing each social media item as having a geographical weight distribution, so a weight of the social media item is distributed across a plurality of cells, wherein the calculating of the respective anomality metric values is based at least in part on aggregated weight distribution of multiple social media items forming part of the social media content.

19. The system of claim 11, wherein the graphical user interface comprises an interactive map, and wherein the surfacing of the one or more subsets comprises:

based at least in part of the calculated anomality metric values, compiling one or more collections of social media items; and causing display in the interactive map of a respective geo-anchored collection icon for each of the one or more collections, each collection icon being user-selectable to trigger replay in the graphical user interface of the corresponding collection of social media items.

20. A non-transitory computer readable storage medium having stored thereon instructions for causing a machine, when executing the instructions, to perform operations comprising:

accessing current activity data indicative of current user activity with respect to posting of social media content to a social media platform within a current time window limited to a predefined preceding time period, the social media content comprising social media items associated with respective geographical locations within a geographical area, a geographical distribution of the current user activity thus being indicated by the current activity data;

in an automated operation based on the current activity data, calculating a respective anomality metric value for each one of multiple predefined constituent map portions of the geographical area, each anomality metric value quantifying, for a respectively corresponding one of the map portions, unusualness in volume of current user activity relative to historical user activity for the corresponding map portion, each anomality metric value being based at least in part on a deviation between:

location-associated current user activity represented by the current activity data in the corresponding map portion; and a statistical representation of historical user activity in the corresponding map portion for a corresponding time window historically, the historical user activity being indicated by historical activity data;

ranking the predefined constituent map portions according to the respective anomality metric values; and based on the ranking, surfacing one or more subsets of the social media content in a graphical user interface for the social media platform.

* * * * *